United States Patent [19]

Nounin et al.

[11] Patent Number: 5,802,469
[45] Date of Patent: Sep. 1, 1998

[54] RADIO COMMUNICATION SYSTEM SELECTABLE LOW SPEED BI-DIRECTIONAL COMMUNICATION AND HIGH-SPEED DOWN LINK COMMUNICATION

[75] Inventors: Katsuya Nounin, Kawasaki; Takashi Wakutsu; Nobuyasu Nakajima, both of Yokohama; Koji Ogura, Kawasaki; Mutsumu Serizawa, Tokyo; Osamu Moriya, Kawasaki; Tsutomu Sugawara, Yokosuka; Eiji Kamagata; Yoshinari Kumaki, both of Kawasaki, all of Japan

[73] Assignee: Kabushiki Kaisha Toshiba, Kawasaki, Japan

[21] Appl. No.: 623,012

[22] Filed: Mar. 28, 1996

[30] Foreign Application Priority Data

Mar. 29, 1995 [JP] Japan ................................ 7-071838
Mar. 30, 1995 [JP] Japan ................................ 7-073967
Mar. 31, 1995 [JP] Japan ................................ 7-100346

[51] Int. Cl.$^6$ ................................ H04Q 7/38
[52] U.S. Cl. ................ 455/422; 455/445; 455/553; 370/493
[58] Field of Search ........................... 455/445, 422, 455/66, 454, 466, 434, 503, 435, 552, 553, 557, 403, 3.1, 3.2, 4.1, 4.2, 6.3, 5.1; 370/493, 338, 490, 494–495, 486; 375/200, 222; 348/16

[56] References Cited

U.S. PATENT DOCUMENTS 4,816,826 3/1989 Munter et al. ................ 340/825.52
5,321,542 6/1994 Freitas et al. ..................... 359/172
5,600,707 2/1997 Miller ................................. 370/281

OTHER PUBLICATIONS

IEEE 802.3, Research & Development Center for Radio System, "Personal Handy Phone System RCR STD–28".

Primary Examiner—Nguyen Vo
Assistant Examiner—Lee Nguyen
Attorney, Agent, or Firm—Oblon, Spivak, McClelland, Maier & Neustadt, P.C.

[57] ABSTRACT

A portable terminal includes a first store for storing a first physical address including a serial number of the terminal, a second store for storing a first logical address including a subscriber's telephone number, a third store for storing a second physical address of a hardware used for computer communication, a fourth store for storing a second logical address corresponding to the second physical address, an interface for radio LAN, and an interface for PHS system. When a call is originated, a first channel is connected by using the first physical address and the first logical address. The second physical address and the second logical address are transmitted to the network from the call originator's terminal through the first channel, thereby setting in a state enabling communication between computers, and necessary data is transmitted to the call originator's terminal through a second channel by communication between computers.

6 Claims, 30 Drawing Sheets

201 : PHYSICAL ADD 1 + CHANNEL REQUEST (+LOGICAL ADD 1)

202 : PHYSICAL ADD 1 + CHANNEL ASSIGNMENT

204 : PHYSICAL ADD 2 + LOGICAL ADD 2 + SERVICE REQUEST

205 : PHYSICAL ADD 2 + LOGICAL ADD 2 + SERVICE REQUEST

206 : PHYSICAL ADD 2 + LOGICAL ADD 2 + DATA

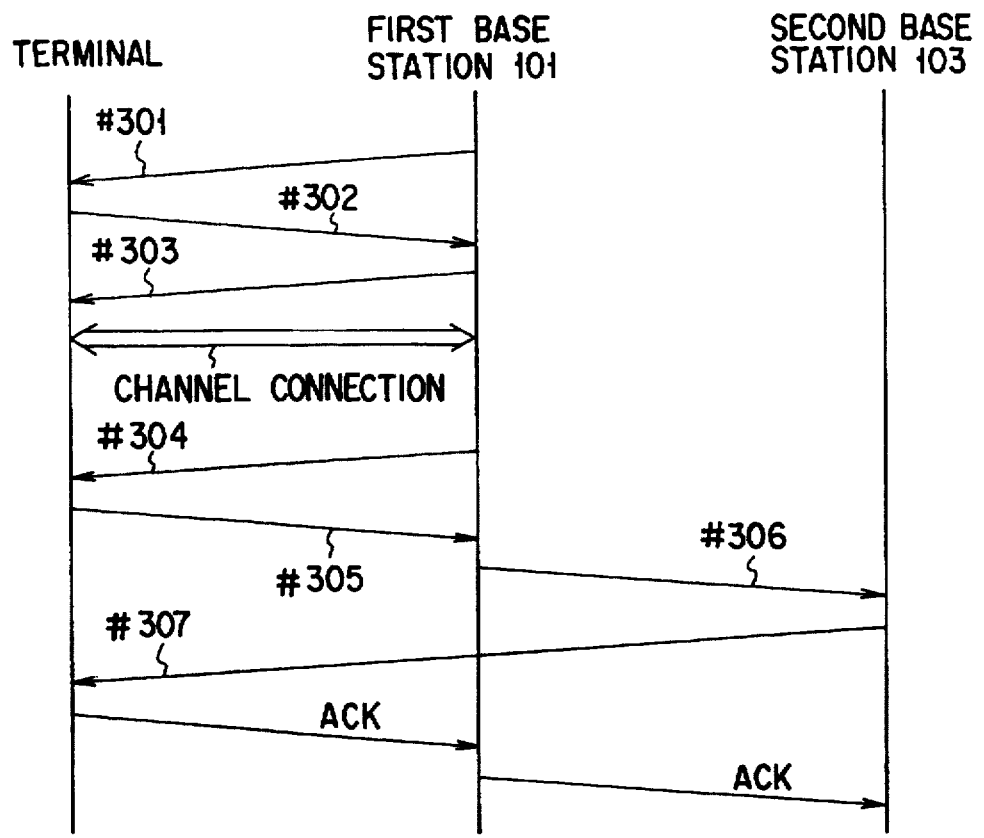
301: PHYSICAL ADD 1 + LOGICAL ADD 1
302: INCOMING CALL RESPONSE + PHYSICAL ADD 1 + LOGICAL ADD 1
303: PHYSICAL ADD 1 + CHANNEL ASSIGNMENT
304: ADDRESS (PHYSICAL ADD 2 + LOGICAL ADD 2) REQUEST
305: PHYSICAL ADD 2 + LOGICAL ADD 2 + SERVICE REQUEST
306: PHYSICAL ADD 2 + LOGICAL ADD 2 + SERVICE REQUEST
307: PHYSICAL ADD 2 + LOGICAL ADD 2 + DATA
F I G. 5

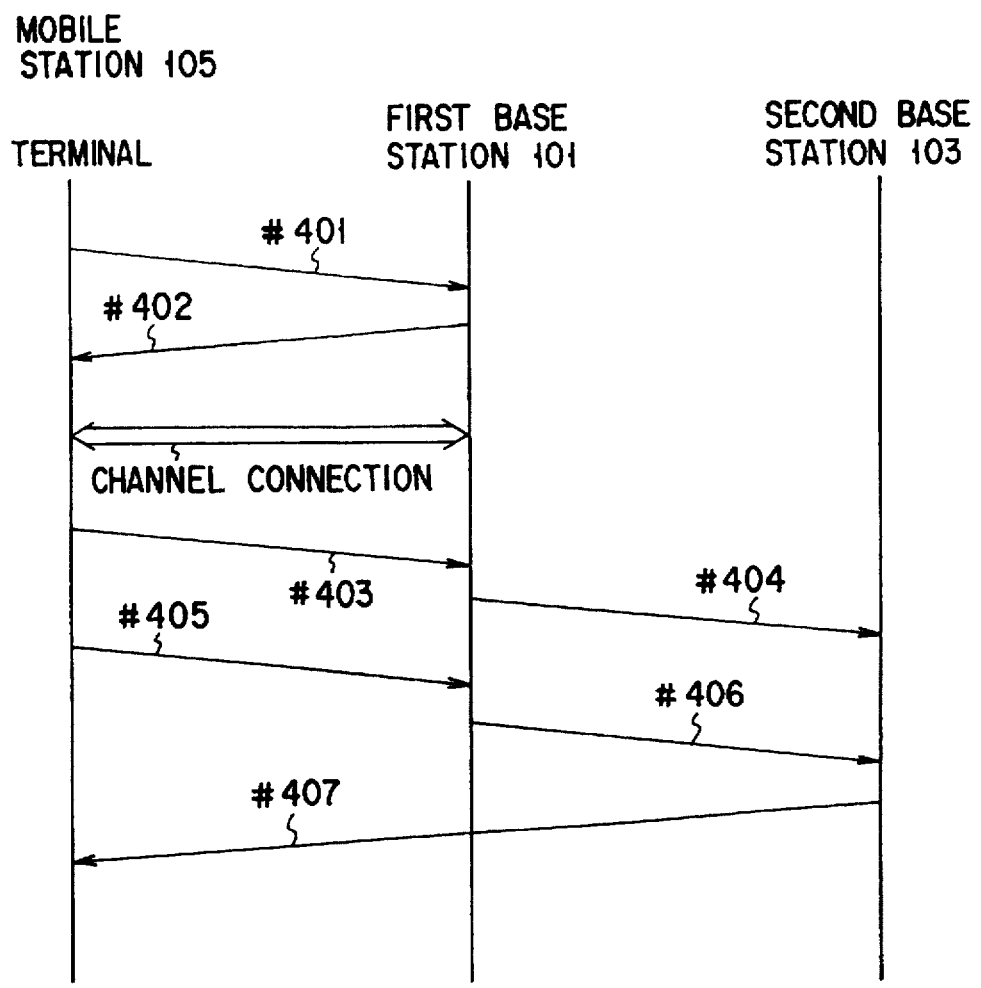
\# 401: PHYSICAL ADD 1 + CHANNEL REQUEST (+ LOGICAL ADD 1)
\# 402: PHYSICAL ADD 1 + CHANNEL ASSIGNMENT
\# 403: PHYSICAL ADD 2 + LOGICAL ADD 2 + LOCATION REGISTRATION REQUEST
\# 404: PHYSICAL ADD 2 + LOGICAL ADD 2
\# 405: PHYSICAL ADD 2 + LOGICAL ADD 2 + SERVICE REQUEST
\# 406: PHYSICAL ADD 2 + LOGICAL ADD 2 + SERVICE REQUEST
\# 407: PHYSICAL ADD 2 + LOGICAL ADD 2 + DATA
F I G. 6

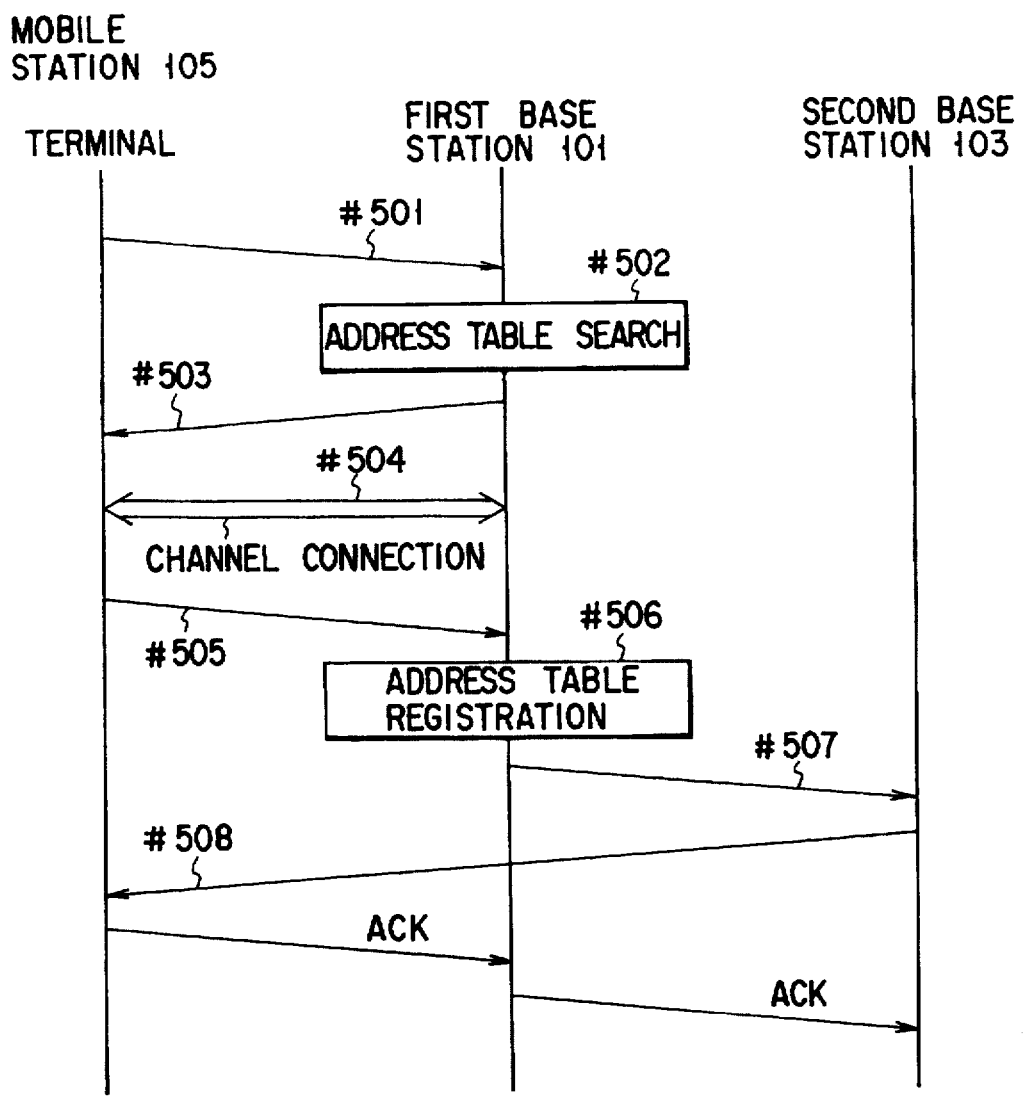
501: PHYSICAL ADD 1 + CHANNEL REQUEST
503: PHYSICAL ADD 1 + CHANNEL ASSIGNMENT + PHYSICAL ADD 2 + LOGICAL ADD 2 REQUEST
505: PHYSICAL ADD 2 + LOGICAL ADD 2 + SERVICE REQUEST
507: PHYSICAL ADD 2 + LOGICAL ADD 2 + SERVICE REQUEST
508: PHYSICAL ADD 2 + LOGICAL ADD 2 + DATA
F I G. 7

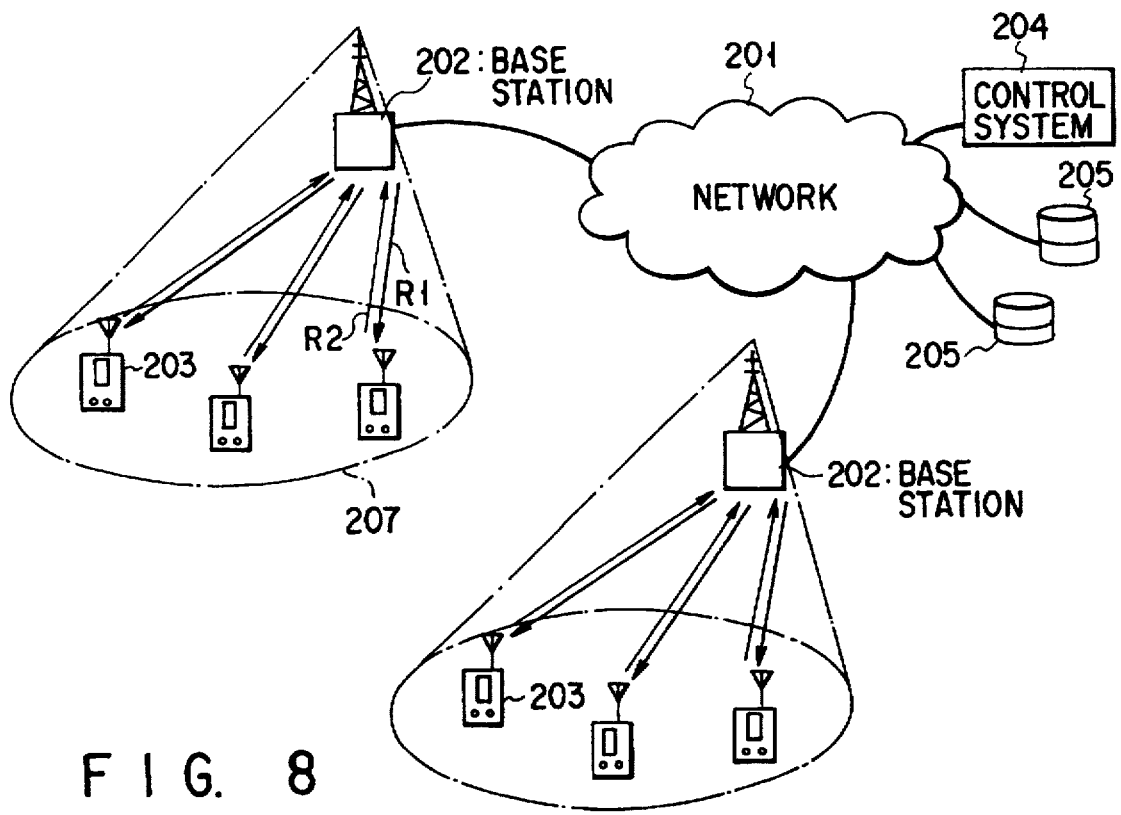
F I G. 8
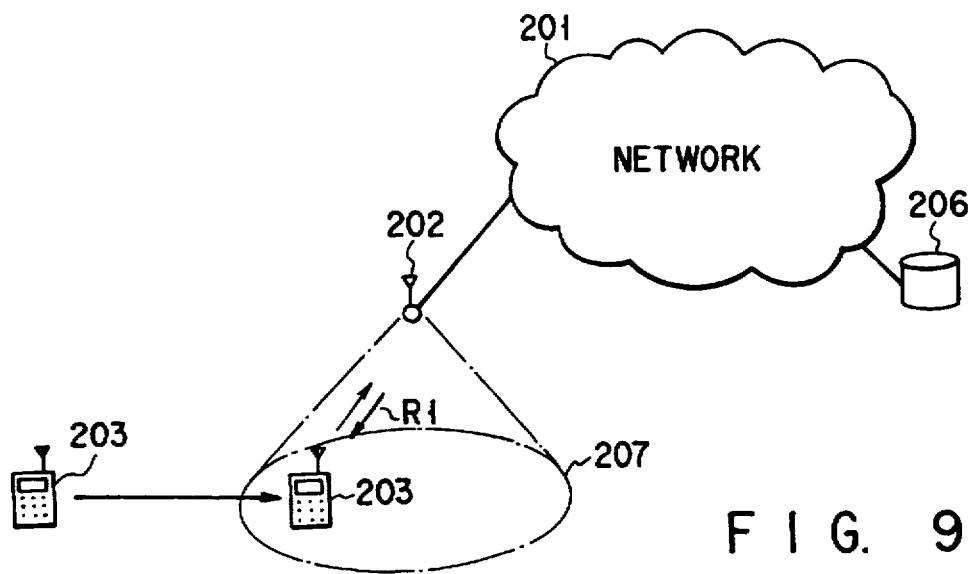
F I G. 9

WAITING

MEDIUM BAND COMMUNICATION

WIDE & MEDIUM BAND COMMUNICATION

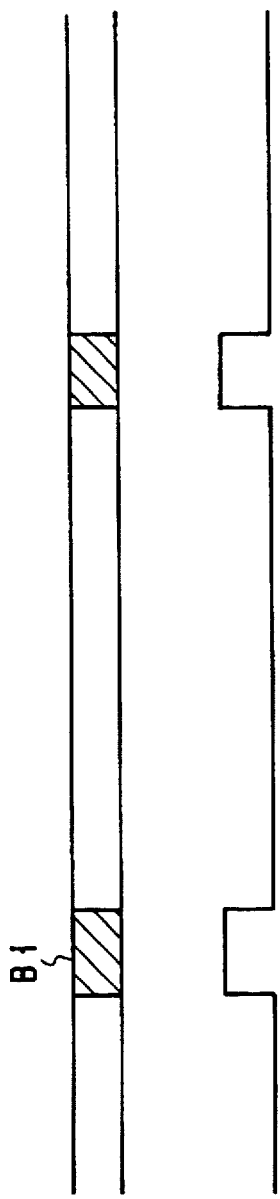
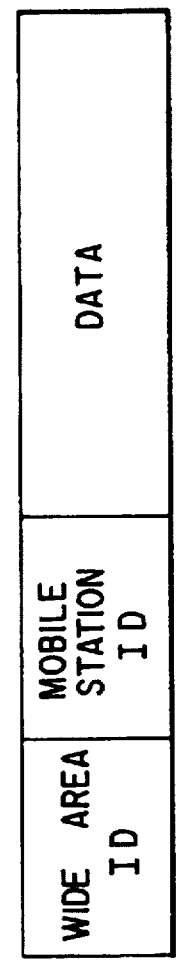
FIG. 20A (TRANSMISSION DATA)
FIG. 20B (POWER OF NARROW BAND CIRCUIT)
FIG. 21

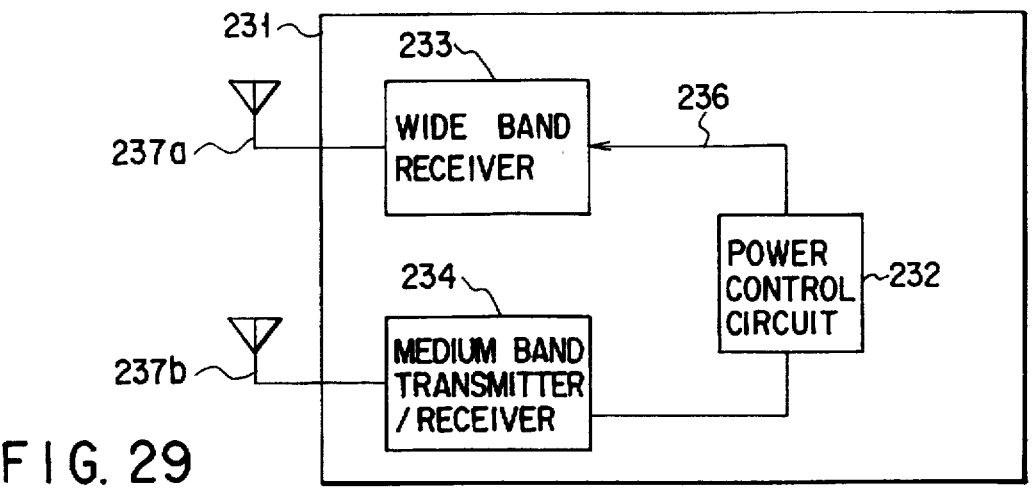
FIG. 29
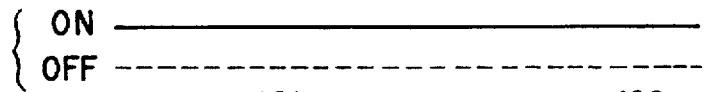
FIG. 30A (MEDIUM BAND POWER)
FIG. 30B (MEDIUM BAND DATA)
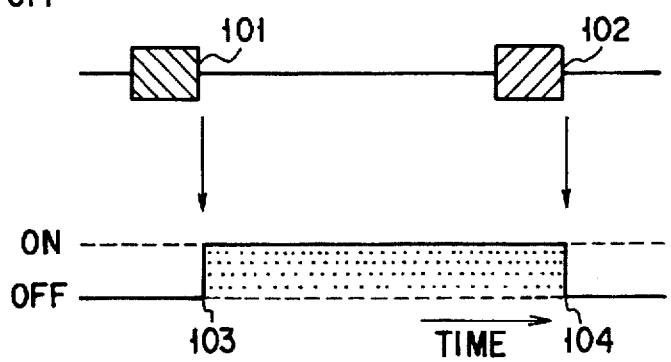
FIG. 30C (WIDE BAND POWER)
FIG. 31A (MEDIUM BAND DATA)
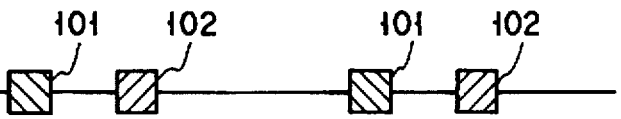
FIG. 31B (WIDE BAND POWER)
FIG. 31C (WIDE BAND DATA)
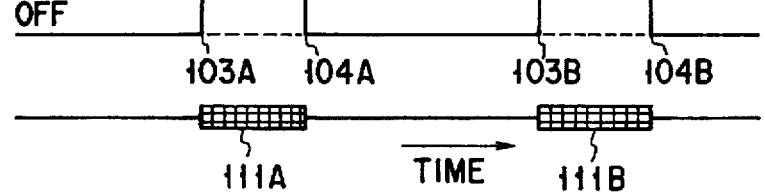

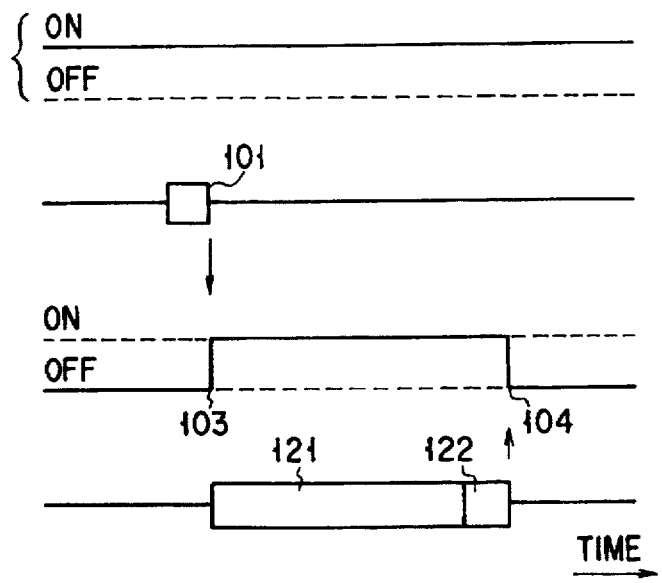
FIG. 32A (MEDIUM BAND POWER)
FIG. 32B (MEDIUM BAND DATA)
FIG. 32C (WIDE BAND POWER)
FIG. 32D (WIDE BAND DATA)
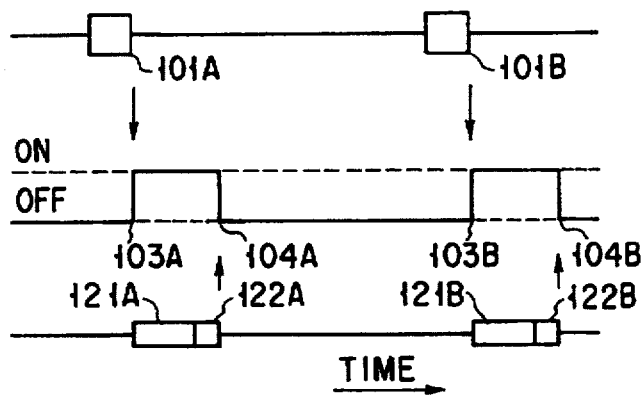
FIG. 33A (MEDIUM BAND DATA)
FIG. 33B (WIDE BAND POWER)
FIG. 33C (WIDE BAND DATA)
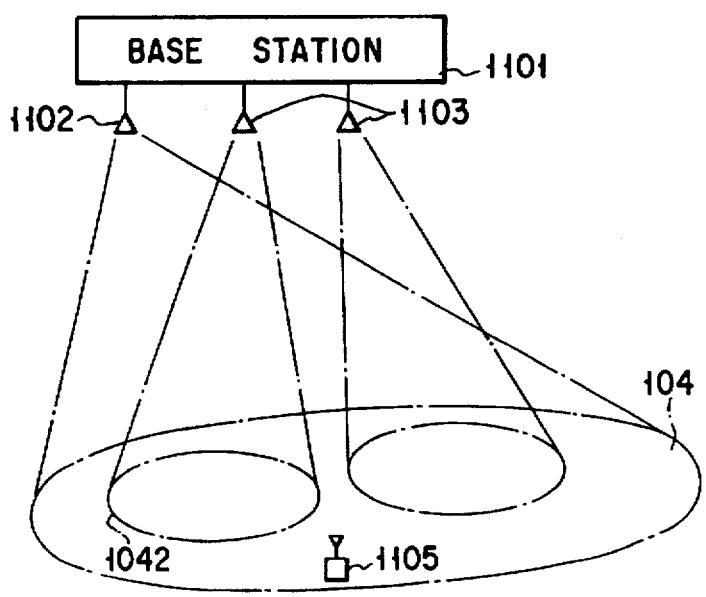
FIG. 34

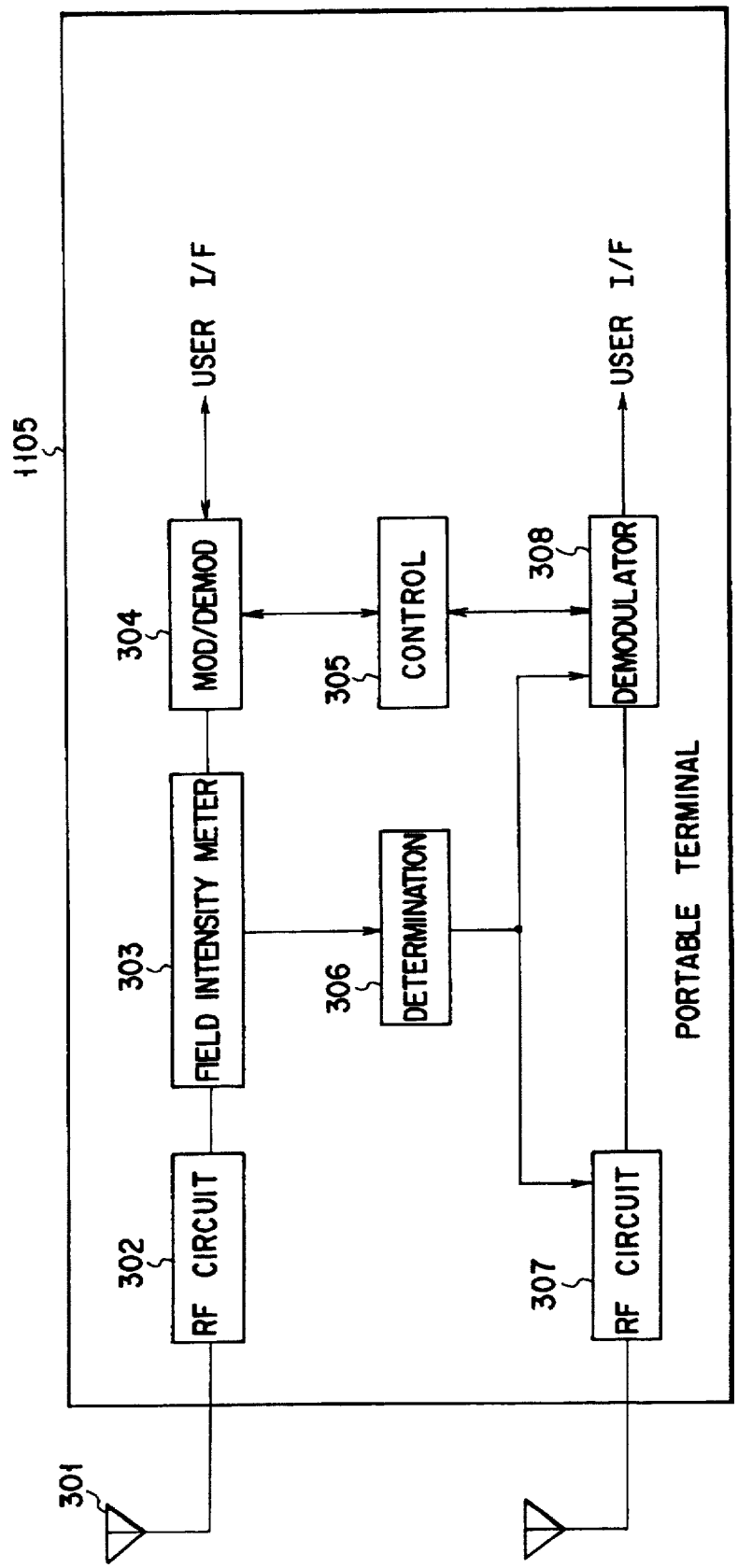
F I G. 35

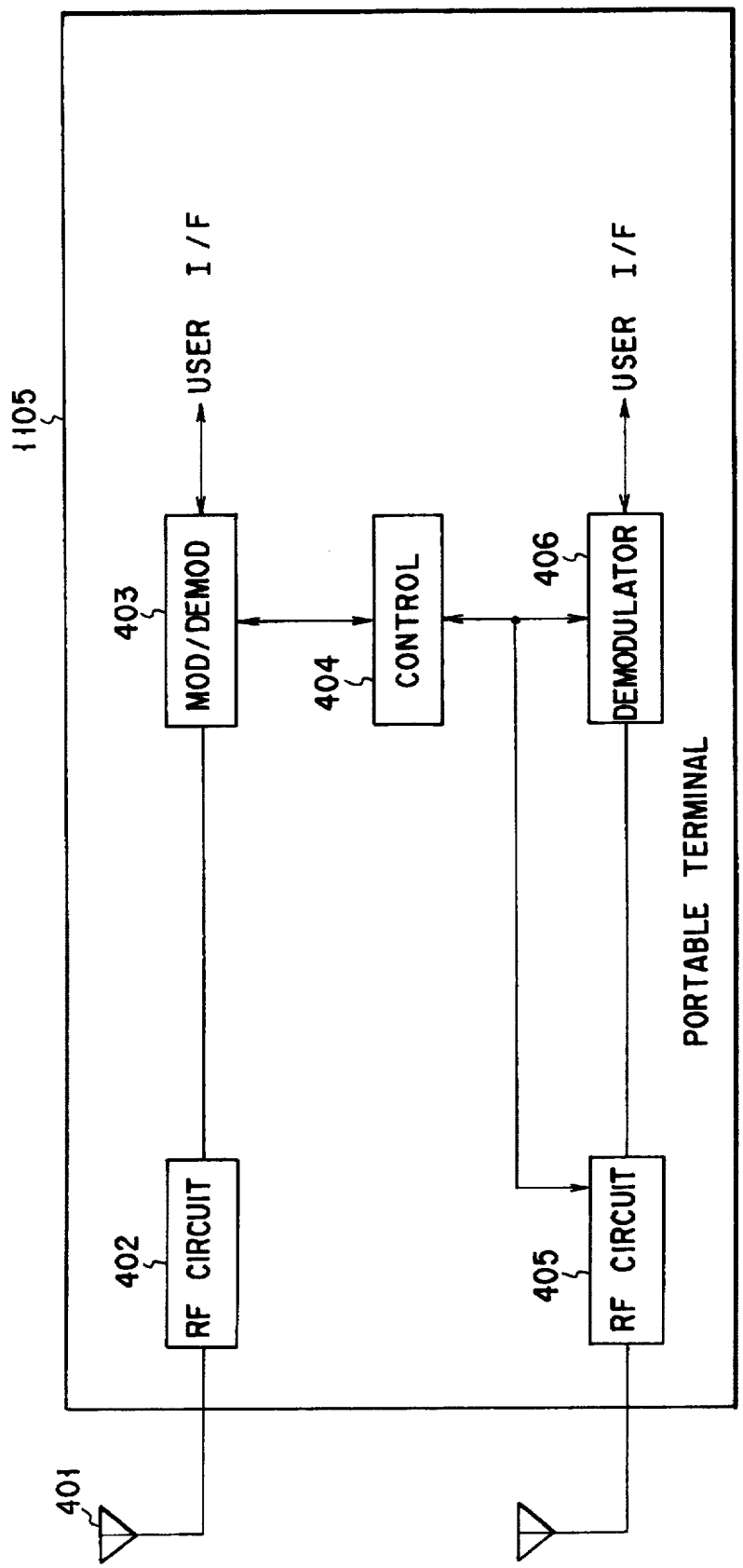
F I G. 36

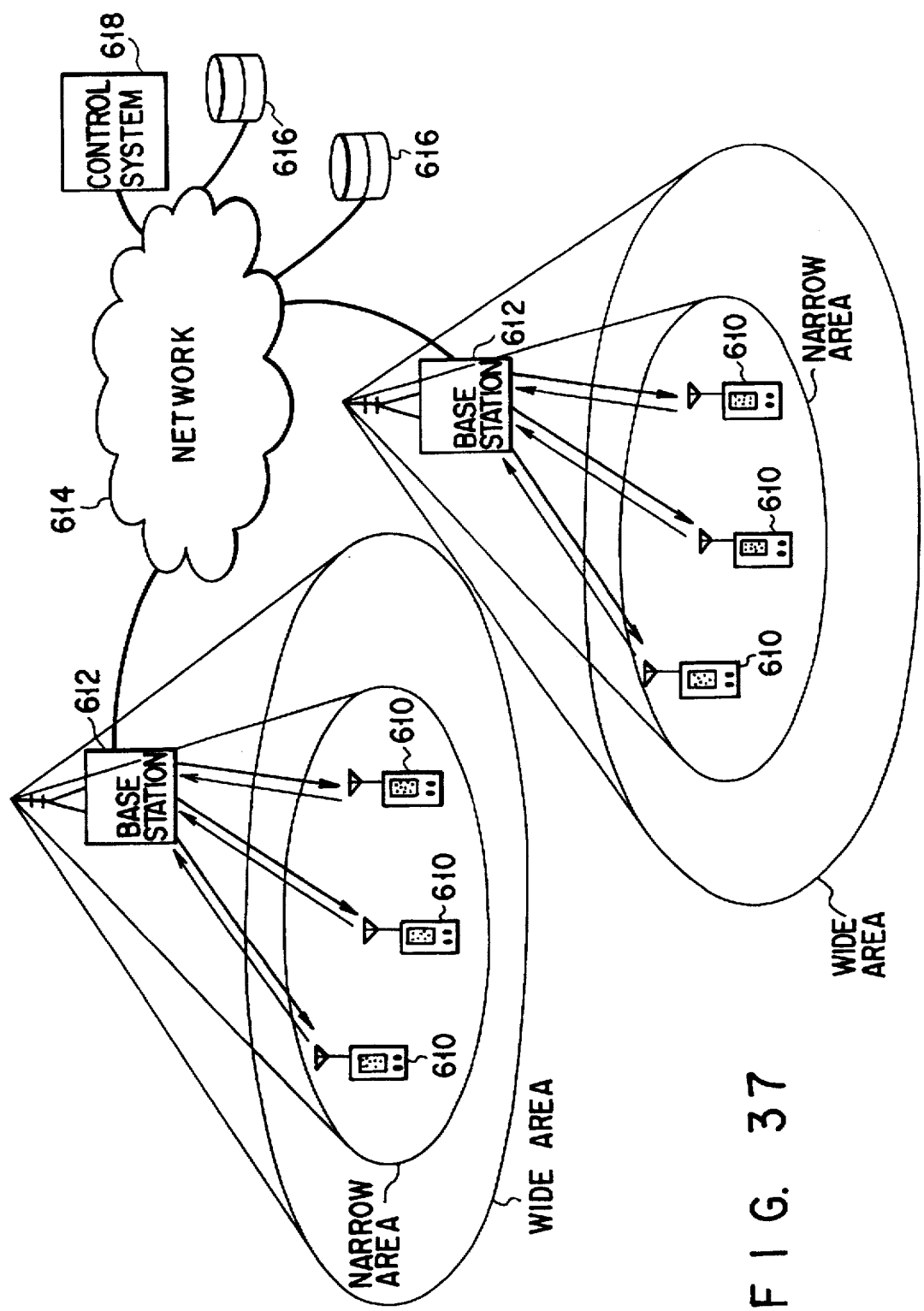
F I G. 37

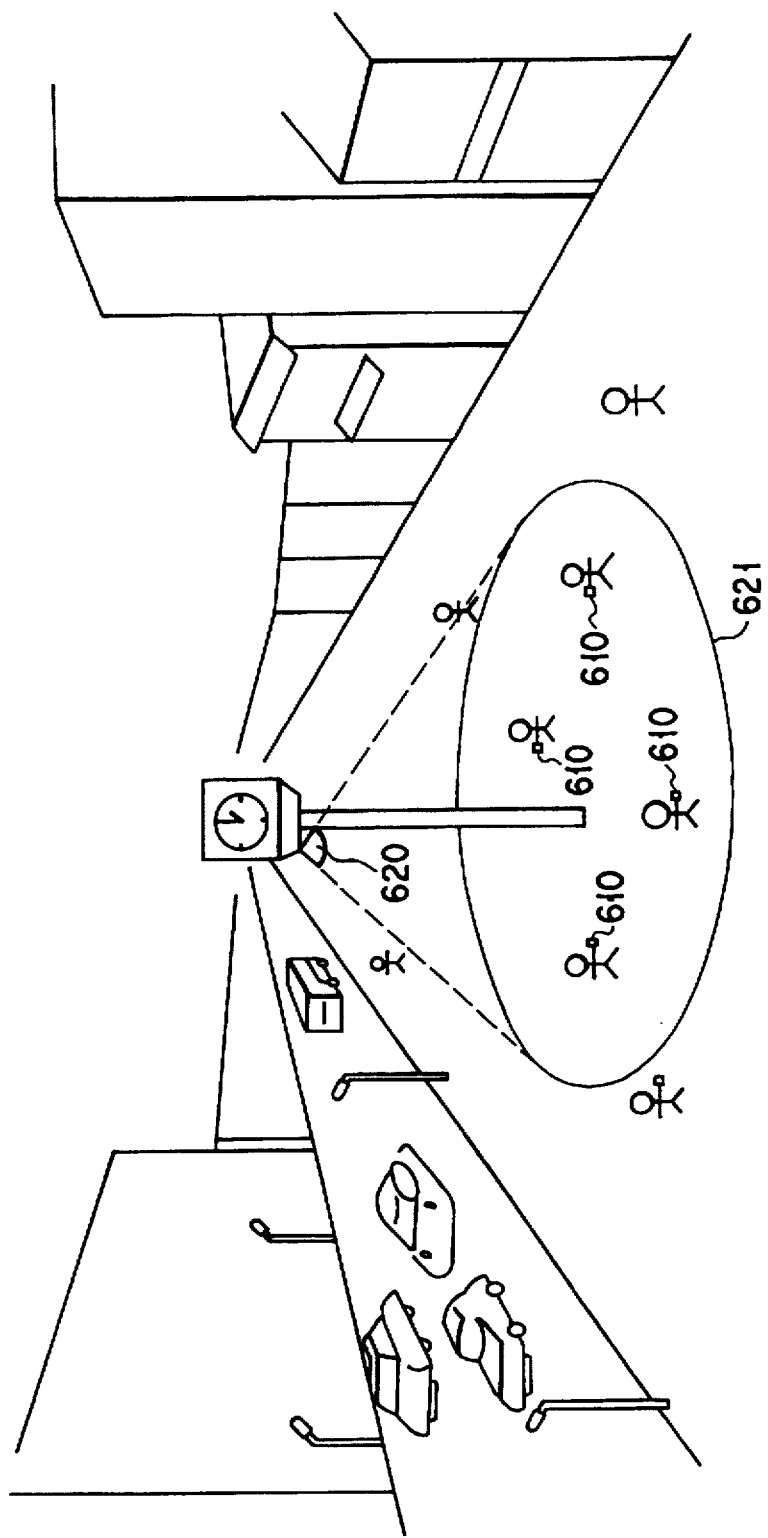
F I G. 38

RADIO COMMUNICATION SYSTEM SELECTABLE LOW SPEED BI-DIRECTIONAL COMMUNICATION AND HIGH-SPEED DOWN LINK COMMUNICATION

BACKGROUND OF THE INVENTION

1. Field of the invention

The present invention relates to a radio communication system for communicating various forms of information, such as moving picture, still picture, text, and voice, by radio channels.

2. Description of the Related Art

One of the protocols for communicating between computers by wired lines, CSMA/CD (Carrier Sense Multiple Access/Collision Detection) standardized in IEEE802.3 is known. This is widely used in communication at terminals of end points. As the radio communication method between computers considering compatibility with this protocol, a method standardized in IEEE802.11 is known. This radio communication system between computers is a method in which the data generated at terminals is burst-like data. Accordingly, this method is not suited to communication of continuous data such as voice and moving picture.

In this method, the radio communication channel is used by all mobile stations or portable terminals as shared medium. In other words, unlike the automobile telephone system or cordless telephone (as this standard, RCR STD-28 (Japan) is known), radio bands are not assigned preliminarily to make communications, but this is the discrete type communication in which each terminal controls by random access. This is because the system is intended to operate on the principle in which data transmitted by each terminal can be received by all terminals. Therefore, the range of composing radio communication network is limited.

On the other hand, as the system realizing wide-range radio communication network, the portable telephone or automobile telephone system is known. Or, as a simple portable telephone system, PHS (Personal Handyphone System) is known. However, the transmission speed is only a little more than 10 Kbps in the portable telephone system or 32 Kbps even in the PHS, and the transmission speed is insufficient for transmitting pictures.

Besides, in the information providing service by the conventional radio communication (for example, database retrieval system), it is intended to provide real-time service whenever and wherever. To receive this service, for example, a portable telephone and a personal computer are necessary.

In the conventional service system for receiving information provision through radio channels by combining the portable telephone and personal computer, a base station (radio base station) of portable telephone service system is connected to a communication network, for example, a wired communication network. The data terminal, for example, the personal computer is a terminal capable of communicating data by incorporating the portable telephone terminal and modem, and is capable of communicating within the service area of a base station capable of making radio communications.

The service area of the portable telephone is a very vast range, but there is a region out of the service area depending on the geography or configuration condition of base stations. A service area is covered by a radio base station connected to a communication network. A terminal is located outside the service area, and to receive information presentation by this terminal, it must first move into the service area.

Suppose the user having the terminal moves while observing the reception field intensity display of the portable telephone. By moving, the terminal gets inside of the service area. Here it is first allowed to communicate with the base station, and the user accesses the information database through the network, and starts to acquire the information.

At the present, assuming what the user of the mobile portable terminal wants is the real-time information at this time, communication operators are endeavoring to expand the communicable zone.

However, the information wanted by the user is not always the real-time information, and some are urgent and others are not. At the present, however, the operating procedure for acquiring data is not changed depending on the degree of urgency, and to acquire even information of low urgency, the user must move to the service area for radio communication, or when thinking of acquiring information, one must operate for the acquisition with consciousness, which is somewhat troublesome.

Thus, hitherto, when the user wants to acquire information, the terminal must be moved, consciously, to the radio communication supported area.

Meanwhile, the quantity of information that can be provided by the information providing system by radio communication currently in service is not so large, and it is enough to cope with by the service using low speed channel, but as the multimedia is drawing attention, there is an increasing demand for exchange of abundant data at high speed. For example, terminals capable of handling moving picture information which amounts to a colossal quantity of data, or handling information of a full magazine size are developed, such as multifunctional, multimedia-applicable portable type information terminals, and transmission of large quantity is required accordingly. It is difficult to transmit a large quantity in a wide service area of the present portable telephone system because the frequency resources are limited and multiple base stations for high speed communication must be installed.

The terminal is carried by each use, and smaller size and lighter weight are essential, and for this purpose, therefore, it is required to promote saving of power consumption which is an important factor for determining them. That is, for the portable terminal, the power source is mainly the battery, which occupies a major portion in both volume and weight.

SUMMARY OF THE INVENTION

It is hence an object of the present invention to provide a radio communication system of large capacity and wide range that can be applied to both systems of portable radio telephone system and radio communication system between computers (radio LAN).

It is another object of the present invention to provide a radio communication system capable of acquiring necessary information, without particular consciousness, by automatically receiving transmission of information and acquiring information, when moving to an information obtainable area, only by presetting request of desired information.

It is a further object of the present invention to provide a radio communication system capable of saving power consumption, and reducing in size and weight.

It is still another object of the present invention to provide a radio communication system capable of receiving information service securely through radio communication by positioning a portable terminal device in a simple structure in an area of high reception field intensity.

According to the present invention, a radio communication system comprises a base station connected to a network, and a radio terminal connected to the base station through a radio channel, wherein the radio channel comprises a first channel making bi-directional communication, and a second channel making only down-link communication at higher speed than in the first channel, and the radio terminal comprises a first interface for the first channel, a second interface for the second channel, and communication control means for setting the fist channel by using the first interface, transmitting a protocol necessary for the second interface to the network through the first channel, and receiving data from the network through the second channel.

According to the present invention, a communication method for a radio communication system comprising a base station connected to a network, and a radio terminal connected to the base station through a radio channel comprising a first channel for making bi-directional communication and a second channel for making only down-link communication at higher speed than the first channel, and having a first interface for the first channel and a second interface for the second channel, the method comprises the following steps of connecting the first channel by using the first interface; transmitting a protocol necessary for the second interface to the network through the first channel; and receiving data from the network through the second channel.

According to the present invention, a radio communication system comprising a base station and a data provider both connected to a network, and a mobile terminal connected to the network through the base station by a radio channel, comprises means for determining if the mobile terminal can communicate by the radio channel with the base station; means for generating data acquisition request of the mobile terminal wishing to receive data provided from the data provider; and means for controlling the radio channel to provide the data from the data provider to the mobile terminal, when the determining means determines that the mobile terminal can communicate with the base station, while the data acquisition request is being generated.

According to the present invention, a radio communication system comprising a base station and a data provider both connected to a network, and a mobile terminal connected to the network through the base station by a radio channel, the radio channel having a first down-link channel of first transmission speed, a second down-link channel of second transmission speed faster than the first transmission speed, and an up-link channel of first transmission speed, in which the communicable area of the first down-link channel and up-link channel is wider than the communicable area of the down-link channel, the system comprises means for determining if the mobile terminal is located in the communicable area of the second down-link channel or not; means for generating data acquisition request of the mobile terminal wishing to receive the data provided from the data provider; and means for controlling the radio channel by using the second down-link channel so as to provide the data from the data provider to the mobile terminal, when the determining means detects that the mobile station is located in the communicable area, while the data acquisition request is being generated.

According to the present invention, a radio communication terminal apparatus connected by a radio channel to a base station connected to a network, the apparatus comprises first receiving means for receiving a radio transmission wave of a first transmission speed and of a first service area; transmitting and receiving means for transmitting and receiving a radio transmission wave of a second transmission speed slower than the fist transmission speed and of a second service area including the first service area; second receiving means for receiving a radio transmission wave of a third transmission speed slower than the second transmission speed and of a third service area including the second service area; and control means for turning off a power source of the first receiving means and transmitting and receiving means and turning on a power source of the second receiving means while waiting, and turning on the power source of the first receiving means and transmitting and receiving means depending on the type of the signal received by the second receiving means.

According to the present invention, a radio communication terminal apparatus connected by a radio channel to a base station connected to a network, the apparatus comprises means for receiving a radio transmission wave; means for determining if it is ready to receive the radio transmission wave or not; and control means for turning off a power source of the receiving means when the determining means determines it is impossible to receive, and turning off the power source of the receiving means when judged possible to receive.

According to the present invention, a radio communication system comprises a base station; a radio terminal connected to the base station through a radio channel; and means for indicating service area of the base station.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a sequence diagram showing an incoming call procedure at a terminal device of a second embodiment according to the present invention;

FIG. 6 is a sequence diagram showing a communication procedure for location registration at a terminal device of a third embodiment according to the present invention;

FIG. 7 is a sequence diagram showing a communication procedure for terminal identification at a terminal device of a fourth embodiment;

FIG. 8 is a diagram shows a super high speed down link (SDL) system to which a radio communication system of a fifth embodiment according to the present invention is applied;

FIG. 9 is a conceptual diagram showing an entire system of the fifth embodiment;

FIGS. 20A and 20B is timing charts for explaining an operation of the thirteenth embodiment;

FIG. 21 shows a data format of transmission data of the thirteenth embodiment;

FIG. 29 is a block diagram showing a terminal device of the seventeenth embodiment;

FIGS. 30A to 30C are conceptual diagrams explaining a battery saving operation of the seventeenth embodiment;

FIGS. 31A to 31C are conceptual diagrams explaining a battery saving operation of an eighteenth embodiment;

FIGS. 32A to 32D are conceptual diagrams explaining a battery saving operation of a nineteenth embodiment;

FIGS. 33A to 33C are conceptual diagrams explaining a battery saving operation of a twentieth embodiment;

FIG. 34 is a conceptual diagram showing an entire system of the twentieth embodiment;

FIG. 35 is a block diagram showing a terminal device of the twentieth embodiment;

FIG. 36 is a block diagram showing a terminal device of a twenty-first embodiment according to the present invention;

FIG. 37 is a conceptual diagram showing an entire system of a twenty-third embodiment according to the present invention;

FIG. 38 is a conceptual diagram showing a main feature of the twenty-third embodiment;

DETAILED DESCRIPTION OF THE PREFERRED EMBODIMENTS

A preferred embodiment of a communication system according to the present invention will now be described with reference to the accompanying drawings.

(First embodiment)

Figure 1:
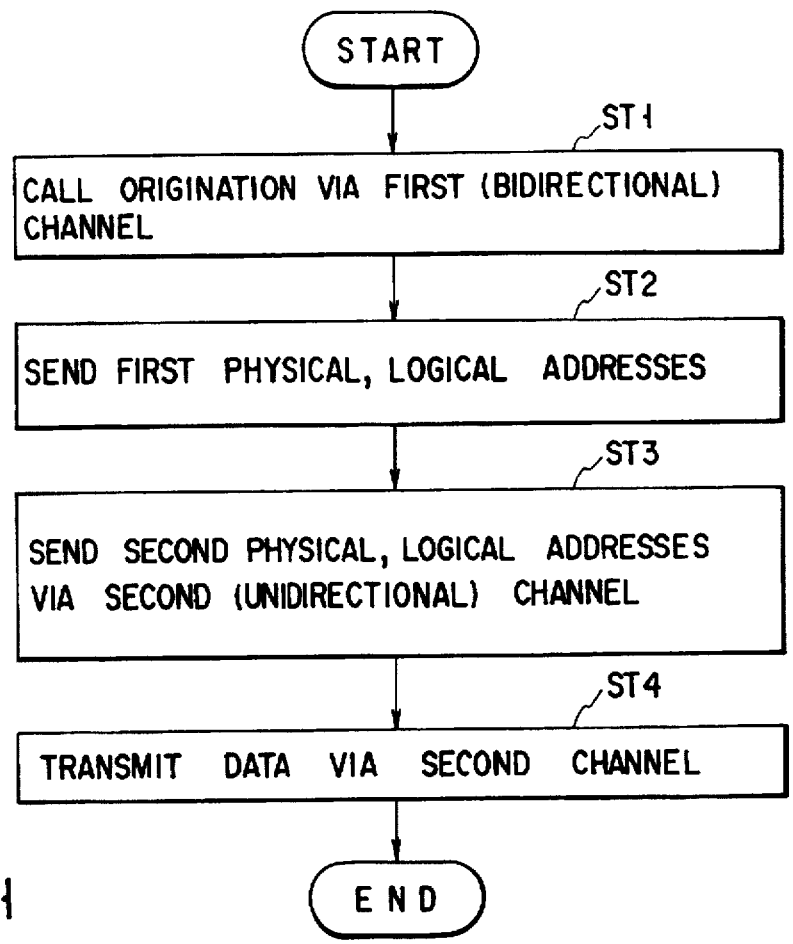
FIG. 1 is a flowchart showing a conceptual operation of a first embodiment of a radio communication system according to the present invention.

FIG. 1 is a conceptual diagram showing the operation of a first embodiment.

Prior to a detailed description of the embodiment, a basic concept of a radio communication system of the embodiment is explained first. This embodiment is a combined system of radio LAN (Local Area Network) system which is an example of a discrete type communication system in which data is communicated between a one terminal and plural terminals and PHS (Personal Handyphone system) which is an example of one-to-one communication system such as a telephone system in which a communication is performed after a communication resource is assigned. A mobile station (portable terminal) has two interfaces for radio LAN and PHS, and makes transmission by radio LAN and transmission by PHS simultaneously when high speed radio transmission of image data or the like is needed. To realize low power consumption at the terminal device, radio transmission in high frequency band is not effected, and the interface for radio LAN of the terminal is used for reception only, and only the PHS interface is used for transmission at the terminal. By using such a terminal, a multimedia terminal excellent in portability is realized.

Such a terminal having the interface for bi-directional radio communication of relatively low speed and the interface for high speed reception only comes to have four addresses. That is, the four addresses consist of the telephone number and serial number of the PHS or portable telephone, and an MAC (Media Access Control) address and an IP (Internet Protocol) address of the radio LAN. In the LAN for computer communication, when communicating with the other party, an ARP (Address Resolution Protocol) is used for discrete control of the correspondence of the MAC address and IP address. In this system, however, since bi-directional radio transmission is not done through the radio LAN interface, ARP through radio LAN interface cannot be executed.

In this embodiment, accordingly, as shown in the flowchart in FIG. 1, at step ST1, a call origination is requested to a first base station through a first radio channel for enabling bi-directional radio communication in a specific terminal out of plural terminals having four addresses, that is, a first physical address including the serial number of each terminal, a first logical address including the subscriber's telephone number, a second physical address as hardware protocol of communication between computers, and a second logical address as software protocol of communication between computers. The first physical address is used for a radio communication system such as the PHS and includes the serial number of each terminal. The first logical address is also used for the radio communication system such as the PHS and includes the subscriber's telephone number. The second physical address is used for radio communication between computers and is stored in a communication hardware which is installed in the terminal. The second logical address is also used for radio communication between computers and is converted into the second physical address by using an address table. Therefore, it is not necessary to physically present the second logical address and the second logical address may be called as a virtual address.

Since there are provided plural interfaces at the terminal, the terminal must have plural addresses. The high speed interface cannot transmit the address relating to the high speed transmission since it is of reception only type. However, this problem can be solved by transmitting the address relating to the high speed transmission through a low speed radio channel of transmission and reception type before an actual data transmission. Thus, the terminal can have a high speed interface of reception only type and a low speed interface of transmission and reception type. Due to this terminal device, it is possible to reduce the size and the power consumption of the terminal.

At step ST2, the first physical address and first logical address are transmitted from the specific terminal (call originator's terminal) via a first radio channel through the first base station and the network, thereby setting a communicable state.

At step ST3, via the first radio channel, the call originator's terminal transmits the second physical address and second logical address to the network through the first base station, and from a second base station connected to the network for setting a second radio channel for enabling unidirectional radio communication from the base station side to the terminal side, the second physical address and second logical address are transmitted through the second radio channel, thereby setting a communicable state between computers.

At step ST4, necessary data is transmitted by communication between computers from the second base station to the specific terminal through the second radio channel.

Figure 2:
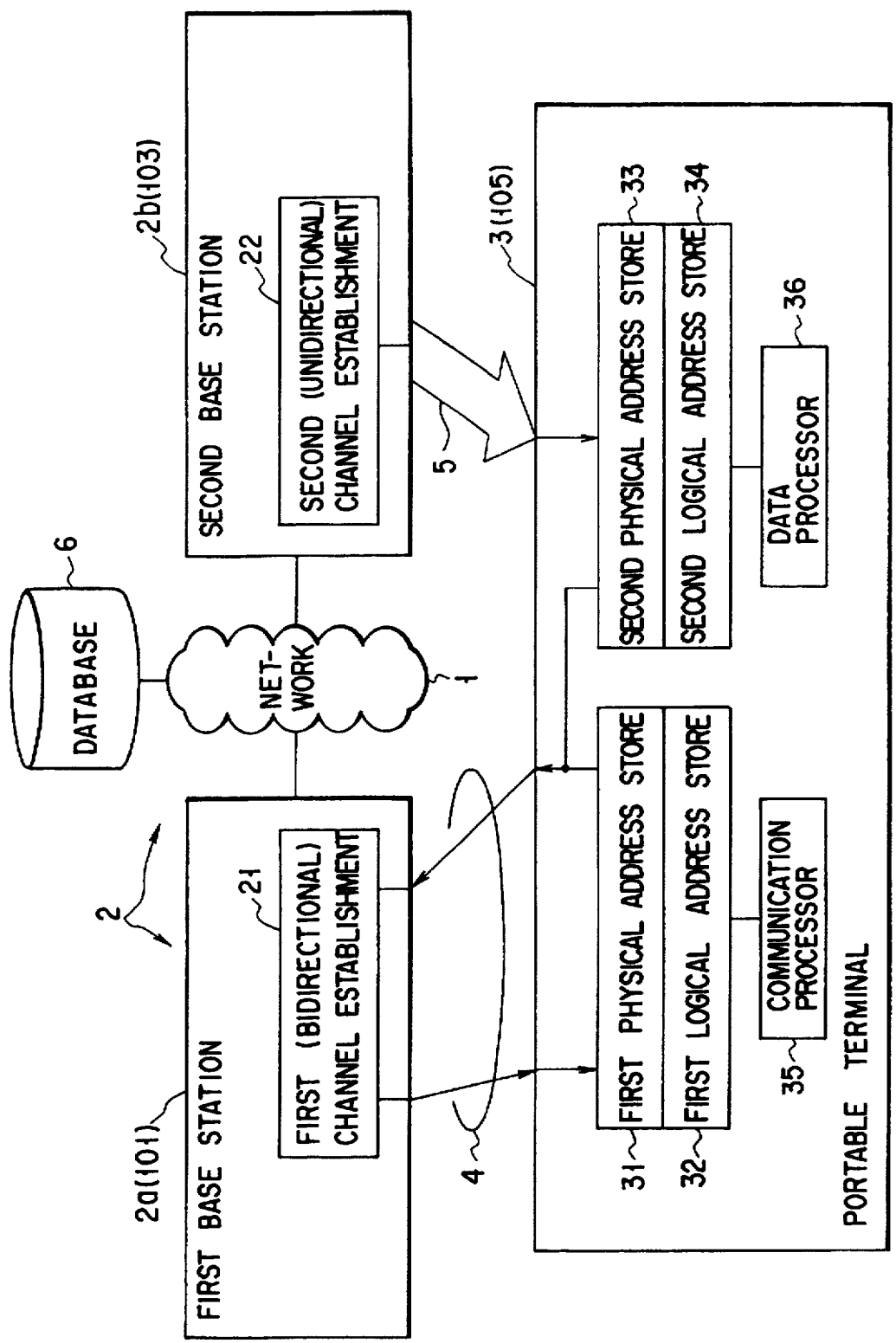
FIG. 2 is a block diagram showing an entire radio communication system of the first embodiment.

To execute such communication procedure, the radio communication system of the embodiment is mainly composed of, as shown in FIG. 2, a network 1, plural types of base stations 2a, 2b, . . . communicating mutually through the network (each type of base station is provided in a plurality), and plural mobile stations (portable terminals) 3, . . . for making continuous data communications and computer communications with these base stations 2a, 2b, . . . Each terminal 3 comprises a first physical address store 31 for storing the first physical address including the serial number of the terminal, a first logical address store 32 for storing the first logical address including the subscriber's telephone number of the terminal, a second physical address store 33 for storing the second physical address, a second logical address store 34 for storing the second logical address, a network processor 35 to cope with the PHS or the like, and a data processor 36 to cope with the radio LAN system or the like. The first base station 2a comprises a first channel (bi-directional channel) establishment 21 for identifying a specific terminal by using the first physical address and first logical address and establishing a bi-directional communicable state with the specific terminal. The second base station 2b comprises a second channel establishment 22 for communicating the second physical address and second logical address between the second base station 2b and the specific terminal 3 through the first base station 2a and network 1 via a bi-directional channel 4 established by the first channel establishment 21, and establishing a unidirectional channel 5 for the specific terminal 3 from the second base station 2b.

The network 1 is connected also with a database 6 for providing necessary data to the terminal 3, aside from the first base station 2a and second base station 2b.

Figure 3:
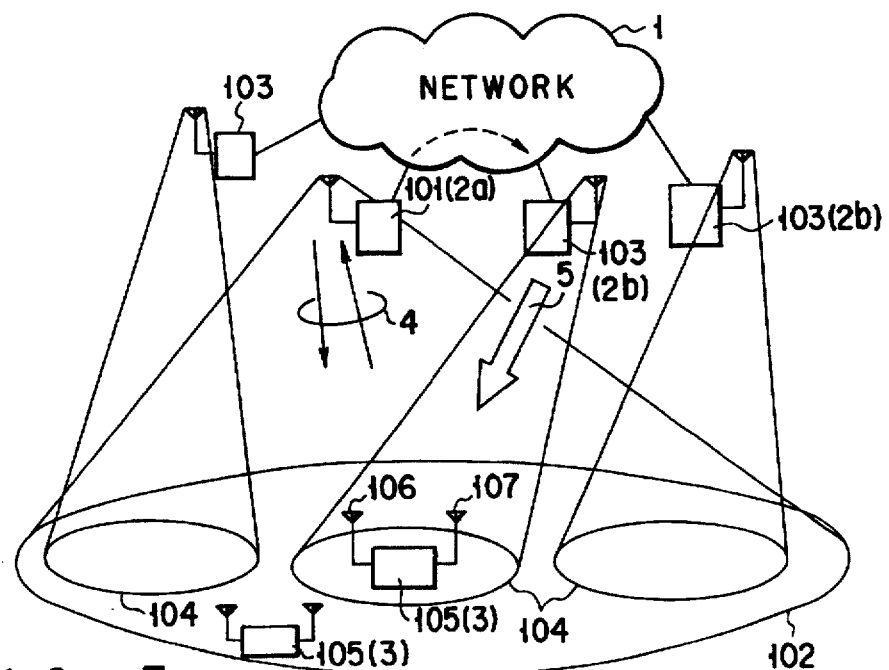
FIG. 3 is a conceptual diagram showing an entire system of the first embodiment.

FIG. 3 shows a specific example of system configuration of this embodiment. This system is composed of a first base station 101 (first base station 2a) connected to the network for providing bi-directional channel at low transmission speed, a second base station 103 (second base station 2b) connected to the network for providing a high speed downlink channel, and a terminal device (mobile station) 105. A cell 102 formed by the first base station 101 is formed in a wide area, including a (narrow) cell 104 formed by the second base station 103. The terminal 105 comprises an interface 106 for communicating with the first base station 101 and an interface 107 for communicating with the second base station 103. The terminal 104 has the first physical address and first logical address for communicating with the first base station 101, and also has the second physical address and second logical address for communicating with the second base station 103.

The operation of this embodiment is described below.

Figure 4:
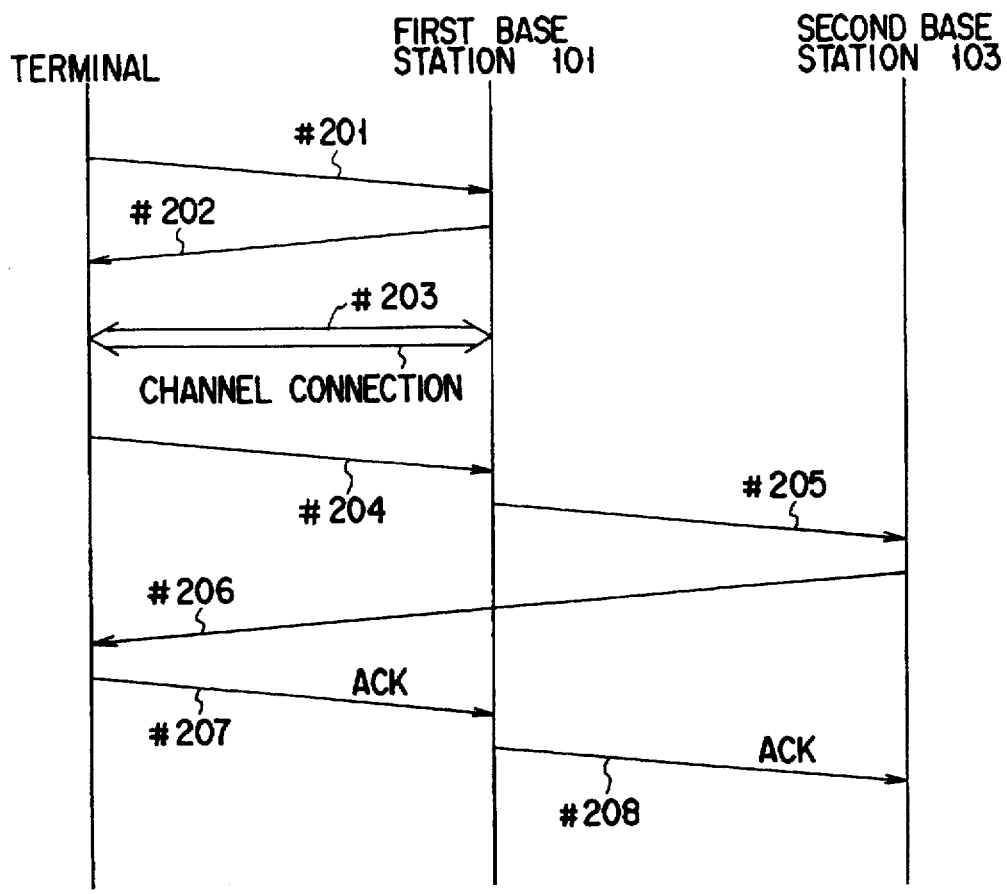
FIG. 4 is a sequence diagram showing a call origination procedure at a terminal device of the first embodiment.

First, the communication procedure for the terminal 105 to request wide-band information such as video information and received from the network 1 is explained by reference to FIG. 4. Herein, the first base station 101 communicates in the bi-directional channel 4 of low transmission speed, and the second base station 103 communicates only in the down-link channel 5 of high transmission speed.

The terminal 105 transmits the first physical address of the own station and the channel connection request (also first logical address if necessary) to the first base station 101 through the bi-directional channel 4 (#210).

The first base station 101 transmits the first physical address of the terminal and the channel assignment information to the terminal 105 through the bi-directional channel 4 (#202).

The terminal 105 checks the physical address and determines that the information is addressed to the own station, and takes in the information, thereby connecting the channel with the first base station 101 by the bi-directional channel 4 (#203). Once the channel is connected, it is possible to communicate without adding the first physical address to the information for identifying the terminal.

The terminal 105, when the channel is connected, transmits the message of request service for requesting information of video picture or the like to the first base station 101, together with the second physical address and second logical address (#204). The first base station 101, when receiving the message of request service from the terminal 105, transmits the second physical address and second logical address of the terminal and the request service message to the second base station 103 through the network (#205).

The service requested by the terminal is provided from the network, and is transmitted to the terminal 105 through the unidirectional channel 5 from the second base station 103 (#206). At this time, the second physical address and second logical address for identifying the terminal are added to the information.

According to this embodiment, as described above, the terminal, prior to unidirectional (down-link channel) high speed communication, transmits the address (the second physical address and the second logical address) relating to high speed transmission to the network side through the bi-directional low speed transmission channel, and therefore it has the interface of bi-directional low speed channel and the interface of unidirectional high speed channel. Therefore, a system combining computer communication system such as radio LAN and portable telephone system such as PHS is realized, so that a multimedia terminal excellent in portability may be realized.

Other embodiments of the radio communication system according to the present invention will be described. The same portions as those of the first embodiment will be indicated in the same reference numerals and their detailed description will be omitted.

(Second embodiment)

A second embodiment, as shown in FIG. 5, relates to a procedure for distributing information from the second base station 103 as the terminal 105 is called from the first base station 101 in the system of the first embodiment.

As shown in FIG. 3, the cell formed by the down-link channel 5 of high transmission speed is an area of about 1 meter to 5 meters in diameter for realizing a spot service, and transmission of information may not be terminated within one cell. At this time, when the terminal comes again into a service area for transmission of information in high speed transmission down-link channel (other cell 104), it is called in the low speed bi-directional channel 4 of wide service area, and the information is transmitted again in the high speed down-link channel 5. Or, when service is requested in the bi-directional channel 4 of low transmission speed in advance, and coming into location for transmission of information in the down-link channel 5 of high transmission speed (getting into cell 104), it may be called in the bi-directional channel 4 of low transmission speed, and the information may be transmitted. The communication procedure of such case is explained in FIG. 5.

The first base station 101 calls the terminal 105 by transmitting the first physical address and first logical address of the terminal to be called through the bi-directional channel 4 (#301).

The terminal 105, when determining the physical address and logical address are its own addresses, transmits an incoming call response to the first base station 101 through the bi-directional channel 4 (#302). At this time, the first physical address and second logical address of the own terminal are transmitted at the same time.

The first base station 101, when receiving the incoming call response, transmits the first physical address of the terminal and the channel assignment message to the terminal 105 through the bi-directional channel 4 (#303).

The terminal 105, when receiving the message, connects the channel with the first base station 101 through the bi-directional channel 4. The first base station 101 transmits the information transmit request (request of second physical address and logical address) to the terminal 105 (#304).

The terminal 105, as its response, transmits the own second physical address and second logical address to the first base station 101 through the bi-directional channel 4 (#305).

The first base station 101 transmits the received second physical address and second logical address to a second base station 103 through a network 10 (#306). The second base station 103, when recognizing the second physical address and second logical address of the call designator's terminal, transmits the requested information through the down-link channel of high transmission speed (#307).

In this second embodiment, too, the same effects as in the first embodiment are obtained.

(Third embodiment)

A third embodiment of the present invention is described below.

In the first and second embodiments, when (immediately before) the terminal 105 requests distribution of information in the down-link channel 5 of high transmission speed, the second physical address and second logical address are transmitted to the first base station 101 in the bi-directional channel 4 of low transmission speed. However, the second physical address and logical address can be preliminarily transmitted to the network 10 side. As the third embodiment, such example is explained by referring to FIG. 6. FIG. 6 shows the procedure of the terminal 105 for transmitting the second physical address and second logical address at the same time when registering the location.

The terminal 105 transmits its own first physical address and channel connection request (and also first logical address if necessary) to the first base station 101 through the bi-directional channel 4 (#401).

The first base station 101 transmits the first physical address of the terminal 105 and channel assignment information to the terminal 105 through the bi-directional channel 4 (#402).

The terminal 105 checks the physical address and determines that the information is addressed to its own station, and takes in the information, and connects the channel with the first base station 101 through bi-directional channel 4. Once the channel is connected, it is possible to communicate without adding the first physical address to the information for identifying the terminal.

The terminal 105, when the channel is connected, transmits the location registration request to the first base station 101 together with the second physical address and second logical address (#403). The first base station 101, when receiving the location registration request from the terminal 105, transmits the second physical address and second logical address of the terminal to a second base station 103 through the network (#404).

The terminal 105, as its response, transmits the own second physical address and second logical address to the first base station 101 through the bi-directional channel 4 (#405).

The first base station 101 transmits the received second physical address and second logical address to the second base station 103 through the network 10 (#406). The second base station 101, when recognizing the second physical address and second logical address of the call designator's terminal, transmits the requested information in the down-link channel 5 of high transmission speed (#407).

In the third embodiment, too, the same effects as in the first embodiment are obtained.

(Fourth embodiment)

A fourth embodiment of the present invention is described below.

When the second physical address and second logical address of the terminal 104 are transmitted to the second base station 103, the second base station 103 (or the first base station 101) maintains the correspondence table of physical addresses and logical addresses for a certain time. While the second base station 103 (or the first base station 101) is maintaining the correspondence table of physical addresses and logical addresses, the terminal 105 is not required to transmit the own second logical address and second physical address. This is not preferable from the viewpoint of effective use of bi-directional channel. It is accordingly desired to transmit these addresses in the bi-directional channel only when the second physical address and second logical address of the terminal 105 for starting communication are not provided in the correspondence table of the physical addresses and logical addresses of the first base station 101 or second base station 103. The fourth embodiment operating in such communication procedure is described below while referring to FIG. 7.

At first, the terminal 105 transmits its own first physical address and channel connection request to the first base station 101 through the bi-directional channel 4 (#501).

The first base station 101 searches the address table on the basis of the received first physical address (#502).

As a result of searching, if the second physical address and second logical address corresponding to the first physical address are not found in the table, the first base station 101 transmits the channel assignment message, by adding the second physical address request and second logical address request, to the terminal 105 through the bi-directional channel 4 (#503).

The terminal 105, when receiving the channel assignment, connects the channel with the first base station 101 (#504).

The terminal 105, when receiving the second physical address request and second logical address request from the first base station 101, transmits the request service message, by adding the second physical address and second logical address, to the first base station 101 through the bi-directional channel 4 (#505). The first base station 101 writes the corresponding relation of the second physical address, second logical address and first physical address received from the terminal 105 into the address table (#506), and further transmits the second physical address and second logical address of the terminal and the request service message to a second base terminal 103 through the network (#507).

The service requested by the terminal 105 is provided from the network and transmitted through the unidirectional channel 5 from the second base station 103 (#508). At this time, the second physical address and second logical address for identifying the terminal is added to the information.

In this procedure, when the first base station 101 searches the address table (#502), if the second physical address and second logical address of the terminal 105 are still registered in the table, the second physical address request and second logical address request message is not transmitted at the time of channel assignment. The terminal 105 also, when the second physical address and second logical address are not requested, does not transmit the second physical address and second logical address when transmitting the request service.

In the fourth embodiment, too, the same effects as in the first embodiment are obtained, while wasteful communication traffic can be decreased.

According to the first to fourth embodiments described above, there is provided a low-power consumption multimedia communication terminal for transmitting first data requiring a high transmission speed such as still picture data or video image data and second data not requiring a high transmission speed such as text data, audio data, or control data in which the high speed unidirectional radio channel (down-link) is formed from the base station and the terminal and the low speed bi-directional radio channel is formed between the base station and the terminal.

(Fifth embodiment)

A fifth embodiment of the present invention is described below.

This embodiment is an example of radio communication system capable of receiving necessary information without requiring the user to be conscious of the service area. In the foregoing embodiments, the bi-directional channel is assumed to be identical in transmission speed between up-link and down-link, but in the following embodiments, being developed to be used in the modern multimedia communications, high speed communications are enabled and the frequency can be utilized efficiently, and moreover from the viewpoint of use of small-sized, multifunctional and portable radio communication terminals for the portable and practical convenience of the user, it is intended to use the radio communication system having asymmetrical transmission speeds, in which the transmission speed of the down-link channel from the base station to the terminal is more than one digit higher than the transmission speed of the up-link channel from the terminal to the base station (called SDL or super high speed down-link system). This SDL system was filed as a Japanese Patent Application (No. 6-137621).

An outline of the SDL system is shown in FIG. 8. Radio base stations 202 are connected to a public network 201, and each base station 202 has a down-link channel R1 having a wide frequency band, and an up-link channel R2 having a narrow frequency band. Each base station 202 can communicate with a communication terminal 203 within a service area capable of communicating through the down-link channel R1, by using the down-link channel R1 and up-link channel R2, and data can be exchanged between the communication terminal in each service area including the mobile communication terminal (mobile station) 203 and the control system 204 or database 205 connected to the public network 201.

Herein, communication terminals carried by individuals are generally exclusive personal devices for making input and output by each person. Therefore, the transmission capacity and method balanced with the quantity of data transmitted and received by each person are required. Being carried by individuals, moreover, the radio communication terminal for individual use is, of course, required to be small in size and light in weight, and also power saving is demanded so as not to require to carry an extra heavy battery.

Considering the applications of radio communication terminal to be carried by individuals, in this terminal, if assuming, for example, multimedia, they may include enjoying moving, enjoying music, shopping, use of database, communication, transfer of documents, transmission of sales data or reservation data, ticket reservation, and data acquisition from periodicals, newspapers and other mass media, and among them what must be transmitted from the terminal side to the base station includes the voice, document data, reservation data, command and others, and they can be suppressed to about several kilobits per second by employing the data compression technology, and extremely high transmission speed is not required.

On the other hand, what must be transmitted at the highest speed is the image data in the case of a movie (moving picture), and such high speed transmission of a huge quantity of data is required only in the down-link channel from the base station side to the terminal. Considering such circumstances, from the viewpoint of effective use of frequency band, a wide band (that is, high speed transmission) is needed only in the down-link from the base station side to the terminal, while the transmission channel may be a narrow band (that is, low speed transmission) in the up-link from the terminal side to the base station.

Accordingly, in the SDL system, as mentioned above, the basic configuration is set up to have asymmetrical transmission speeds between the down-link channel of wide band and the up-link channel of narrow band.

The relation between the radio communication base station 202 and the radio communication mobile terminal 203 in this SDL system is more specifically described below.

The radio communication base station 202 and the portable terminal 203 which is a communicable mobile terminal located within its service area 207 can communicate with each other through the down-link channel R1 of wide band from the base station 202 to the portable terminal 203, and the up-link channel R2 of narrow band from the portable terminal 203 to the base station 202, prepared as channels between them.

In the SDL system, data is transmitted in a wide band (for example, over 100 Mbps) in the down-link channel R1. Accordingly, to realize the SDL system by radio transmission using radio waves, the frequency bandwidth of over 100 MHz must be kept (when multiplex modulation is not performed). Radio waves hardly cause to disturb the communication, at lower frequency, in spite of presence of obstacle, and it is desired to use lower frequency band, but the low frequency band is assigned already for other applications and hence cannot be used.

As a next best measure, the microwave band should be used, but in the microwave band, it is a problem if such an extremely wide bandwidth of over 100 MHz is occupied by one user, and it is not realistic.

Therefore, to keep such bandwidth of over 100 MHz, it is required to use the quasi-millimeter wave band or millimeter wave band of high directivity, or infrared ray which is infinite in frequency bandwidth. When using the quasi-millimeter wave band, millimeter wave band, or infrared ray, it is required to communicate within a visible range, and the attenuation is large corresponding to the transmission distance, and various problems are left unsolved for its realization also from the viewpoint of low power consumption of the terminal device.

Thus, the wide-band down-link channel R1 is used within a visible range and the service area is narrow, and it is hard to develop the service area densely over a wide range. Accordingly, with the aim of covering a wide range, the down-link channel of narrow frequency band is extended. By narrowing the bandwidth, it is possible to use a band in which the attenuation of propagation wave is small and to make the service area large.

In this embodiment, therefore, when getting into the wide frequency band in a limited narrow region, the data demanded by the user is automatically transmitted from the data provider side, so that the user can receive the necessary data without being conscious thereof, and this fifth embodiment is further described below.

This embodiment is basically intended to communicate within a visible range, save power, keep freedom of terminal (mobility), and acquire necessary data automatically.

An outline of this embodiment is shown in FIG. 9. This radio communication system comprises a network 201, and a data provider 206, a base station 202 and a portable terminal 203 connected to the network 201. The user acquires the data from the data provider 206 through the radio channel by using the portable terminal 203. The data provider 206 may include the functional element for giving database services, and the system for providing movies, or distributing articles of periodicals, newspaper or other mass media to the subscribers. The terminal 203 can communicate with the base station 202 within the area 207 covered by the base station 202, but cannot communicate outside thereof.

Figure 10:
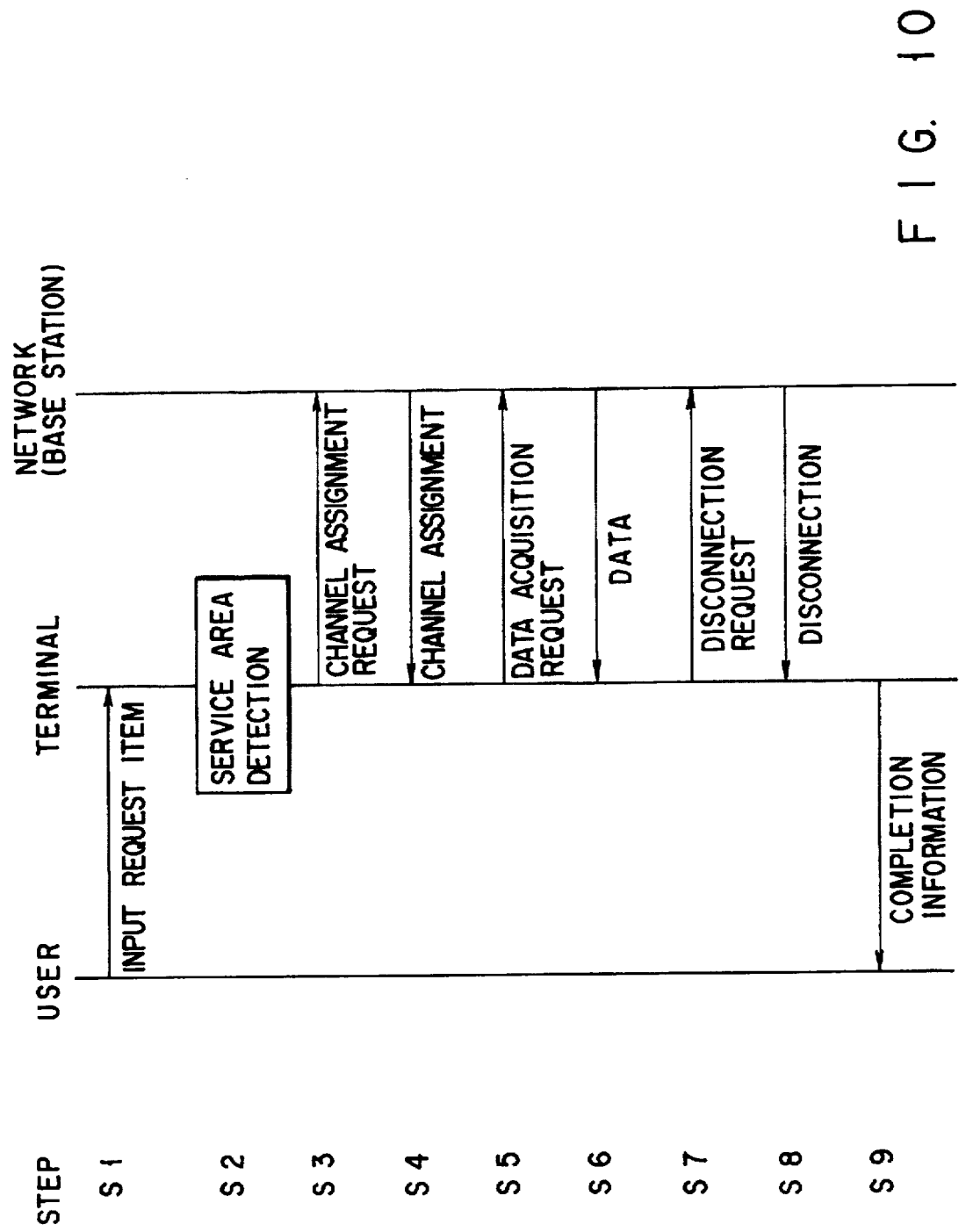
FIG. 10 is a sequence diagram for explaining a communication procedure of the fifth embodiment.

FIG. 10 shows the procedure from data acquisition request to actual data acquisition, in the user (the user of the terminal), terminal, and network.

Suppose the user wants data while staying outside the service area 207. In this state, the user enters the desired data items in the terminal 203 (step S1).

The terminal 203 stores the user input items in its own memory. After finishing the input, the user puts the terminal 203 into pocket, briefcase or the like, and continues the routine work. The terminal 203 is always sensing the carrier of the predetermined frequency, and determining if it is getting into the service area 207 covered by the base station 202. When the user moves together with the terminal 203, for example, when going to work or when going out, the terminal 203 gets into the service area 207 covered by the base station 202. As a result, it is detected that the terminal 203 has entered the communication area (step S2).

The terminal 203 automatically originates a call to the base station 202, and requests assignment of radio channel (step S3).

The base station 202 assigns radio channel (step S4), and the radio channel is established. Herein, however, many other procedures for establishing the radio channel in various radio protocols (validation of terminal, fee charging, location registration, etc.), but they are omitted herein because they are not directly related with the nature of the present invention.

The terminal 203 reads out the data acquisition request items entered by the user from the own memory, and transmits to the data provider 206 through the network 201 (step S5).

The data provider 206 transmits the replies and retrieval results to the questions and retrieval items requested from the user to the terminal 203 through the network 201 and base station 202 (step S6).

The terminal 203, confirming the data acquisition, makes a procedure for disconnecting the radio channel to the network 201 (step S7, step S8).

The terminal 203 informs the user that the data acquisition is complete (step S9). This is noticed by means of a buzzer or LED lighting.

In this way, the user enters the request to the terminal at an arbitrary moment when wishing data, the terminal writes the requested items into the memory, and when the terminal detects entry in the communicable service area, it automatically originates a call to acquire the data, so that the use can automatically acquire the data without knowing the service area.

(Sixth embodiment)

A sixth embodiment is an improved version of the fifth embodiment, so that the desired data acquisition date and time can be specified. That is, when the user enters the data items in the fifth embodiment, the data of the "date," "time," "duration" and others specifying the data should be acquired by when (in other words, the request may be canceled if not obtained by that moment) should be also stored in the terminal 203.

The data requested by the user differs in variety, from that data becoming meaningless if delayed very much, to the data not significantly changed in value if delayed somewhat. For example, the stock market data is meaningless if delayed and requires spontaneity, while the shop guide and introduction data are not changed in a short period, or magazine data may be acceptable if delayed for several hours.

Therefore, when entering the data items, the user specifies the time until data acquisition, or the terminal 203 has a function for distinguishing the type of data, so that the time can be set automatically depending on the type. To realize this function, of course, the terminal 203 must have such function and a clock and calendar function.

The terminal 203, if impossible to enter the communicable area (service area 207) within the specified time and data cannot be acquired, informs the user of this failure by using a buzzer or display, and informs the user it is necessary to take other measures to obtain the desired data by the specified time. In this case, the user sets the desired time again, extends the time, gives up the acquisition, or moves to the communicable service area to obtain data.

In this way, by setting the time until acquisition in the terminal 203, the terminal 203 manages the time, and it is effective to prevent the irrationality of obtaining obsolete data due to delay, and to acquire only necessary data by the required time.

(Seventh embodiment)

A seventh embodiment is an example relating to connection method of a portable telephone. With a conventional portable telephone, one can dial only when the terminal is ready to receive, getting into the communicable area. In other words, when staying outside the communicable area, neither the channel can be connected nor dialing can be made. Accordingly, the user wishing to communicate must first move to a communicable area by monitoring the reception field intensity measurement displayed in the portable telephone, and then dial. This is very inconvenient.

To eliminate this inconvenience, it is intended to dial preliminarily in this embodiment. If the channel cannot be connected when dialing, the dial data is reserved in the portable telephone, and the portable telephone originates a call automatically when the channel is connected.

To realize this function, the portable telephone used as the terminal 203 has a memory for storing the dial data. When the user dials, if staying within the service area of the radio communication, the portable telephone (terminal 203) makes a procedure of originating a call, and ordinary communication is made. If out of the service area when dialing, the dialed number is stored in the memory built in the portable telephone, and the dial is reserved. The portable telephone is always determining if it is getting into the service area or not by its own carrier sensing function or measurement of reception field intensity. When detecting to be in the communication area (service area), call originating procedure is done automatically according to the reserved dial. When executing the automatic call origination, a function is provided to inform the user of the call origination upon start of this automatic incoming call operation.

In this embodiment, as described herein, the user possessing the portable telephone as the terminal 203 has only to dial whenever necessary to communicate. It does not matter whether the present location is inside or outside the service area of radio communication. At this time, if inside of the service area, the terminal 203 originates a call, and ordinary communication is made. If outside the service are, the dialed number is once stored in the memory built in the terminal 203, and dial reservation is noticed.

The user finishing the dialing operation moves by carrying the terminal 203. It is not necessary to monitor the field intensity while moving. The terminal 203 determines whether or not it is getting inside the area by the carrier sensing or measurement of reception field intensity. When the carrier is sensed or when exceeding a predetermined field intensity, it is noticed that the terminal has entered the communication area (service area). When entry in communication area is detected, the terminal 203 originates a call automatically and informs the user of call origination.

Hence, the user can dial without minding if staying within the communicable area or not, and can communicate immediately when getting into the communication area. It is not necessary to check if communication is enabled or not, and the convenience of use is enhanced dramatically.

(Eighth embodiment)

In the fifth embodiment to the seventh embodiment, when the user preliminarily specifies the desired data in the terminal, the data provider side automatically transmits data when the terminal gets into the communicable area, but in other cases, for example, the data desired by the user may not be available at the data provider, or the data may occur after the data is desired. For example, in the stock market data, the user may want to know the value changes when the price of a certain stock has exceeded a specific value. In this way, the data requested by the user may not be obtained even after getting into the communicable area. Hence, an eighth embodiment is explained below with the purpose of acquiring the desired data by the data without knowing the communication area, and acquiring the data immediately after occurrence of the desired data.

Figure 11:
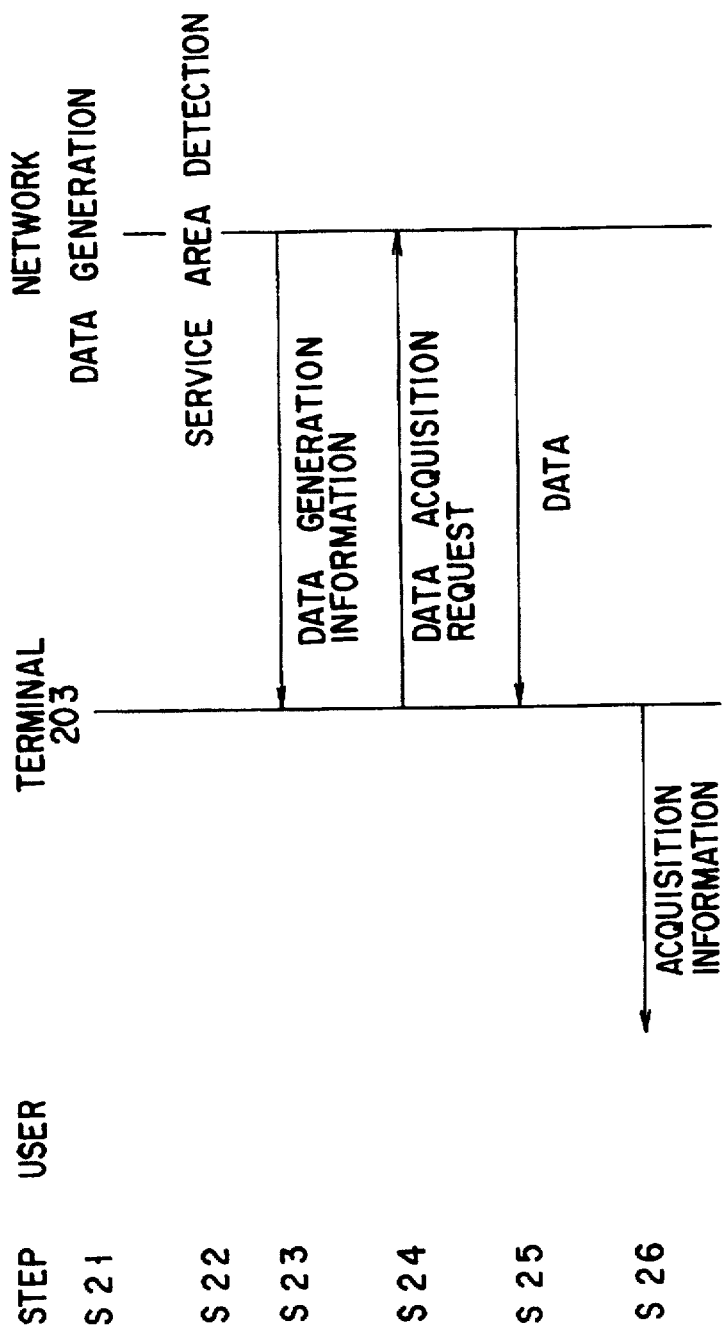
FIG. 11 is a sequence diagram for explaining a communication procedure of an eighth embodiment of the present invention.

The operation of the eighth embodiment is described while referring to the communication procedure shown in FIG. 11.

The network (data provider) determines if the terminal 230 is present within the communication area (service area 207) when the data to be provided to the user occurs (step S21). Herein, the network has means for determining if the terminal 203 is located within the communication area or not. For example, by sensing the carrier at the terminal side, it is noticed to the network side when the terminal 203 is getting into the communicable area, so that it is judged at the network side.

When it is detected that the terminal 203 has entered the communication area (step S22), it is reported to the terminal 203 that the data to be provided has occurred (step S23). In this embodiment, for the convenience of explanation, the procedure for assigning the frequency, validating the terminal and establishing the radio channel is omitted, but, of course, the channel is established after such procedure.

The terminal 203, being informed of occurrence of data, transmits the detailed items of data request to the network side (step S24), and receives the data from the network side (step S25). The terminal 203 having completed the data acquisition informs the user of acquisition of data by a buzzer or LED.

In this embodiment, too, the user can obtain the data without knowing the communication area same as in the fifth embodiment, and the data can be acquired right after data occurrence.

(Ninth embodiment)

Figure 12:
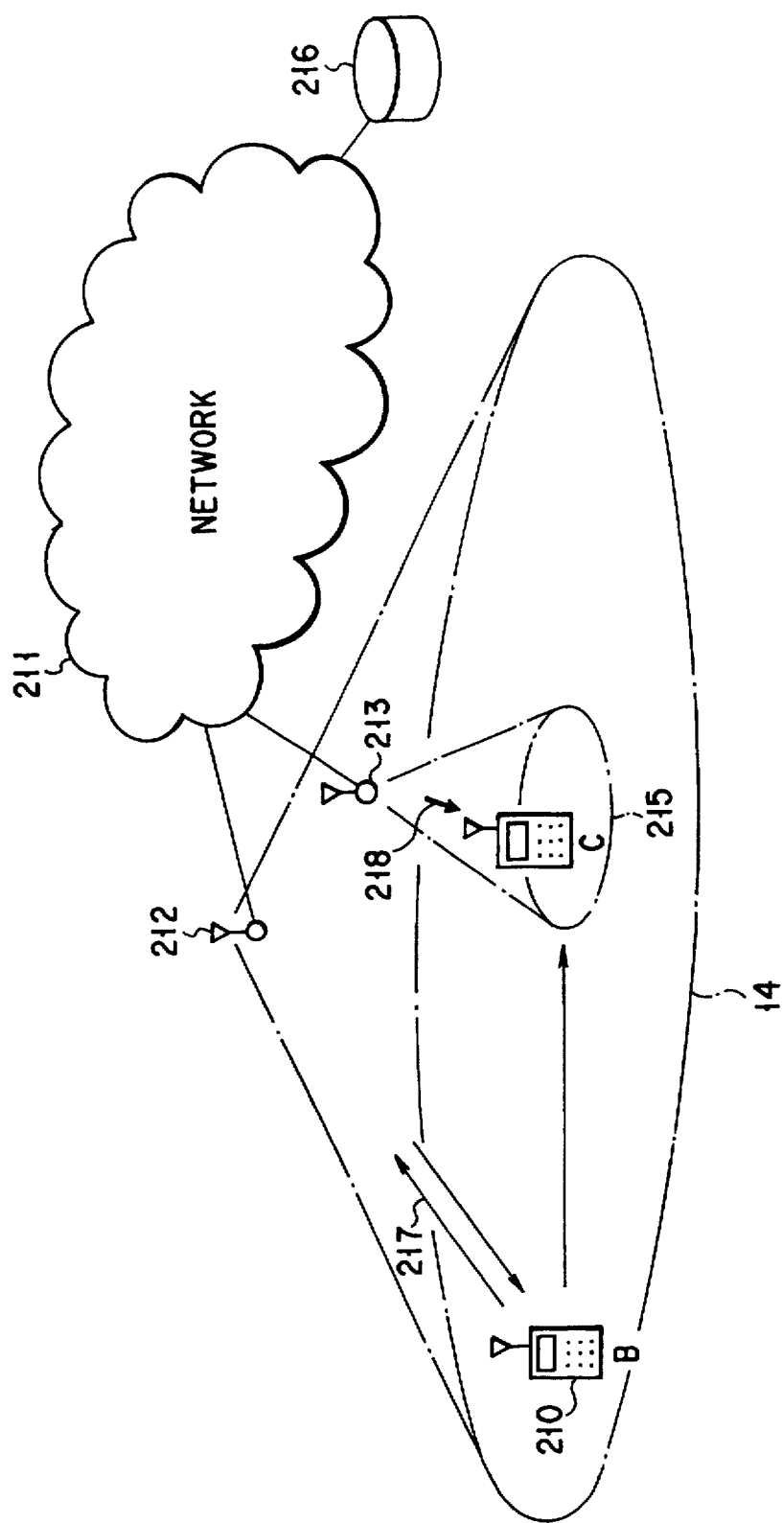
FIG. 12 is a conceptual diagram for explaining an entire system of a ninth embodiment of the present invention.

A ninth embodiment is shown in FIG. 12. In the fifth embodiment to eighth embodiment, the service area is a single stratum, but in this embodiment, plural areas of narrow zone and wide zone are disposed hierarchically.

A data provider 216 for providing necessary data to the user is connected to a network 211, and data is provided through the network 211 and radio channel according to the request for data presentation from the user. A base station 212 covers a wide area 214 (having a wide service area), and makes radio transmission with a terminal 210 through up-link channel and down-link channel 217 of low transmission speed. As an example of such a channel 217, PHS (second-generation cordless telephone system: Personal Handyphone System). This system has up-link and down-link channels at a transmission speed of 32 Kbps, and the service area is about 200 to 500 m wide. The wide and low speed channel is explained as PHS system in this embodiment below.

A base station 213 covers a spot area 215, and transmits through a down-link channel 218 of high transmission speed. In the data providing system as in this embodiment, the quantity of data transmitted from base station (network) side to the terminal is very large, whereas the quantity of data transmitted from the terminal to the base station (network) side is very small, being limited to requested data items and the like. Accordingly, the SDL system mentioned earlier is used as the radio communication system having a high speed down-link channel used in transmission of such huge quantity of data. Herein, the high speed down-link channel has a transmission speed of about tens of Mbps to 155 Mbps. Hereinafter, the spot high speed down-link channel is described as SDL system in this embodiment.

Figure 13:
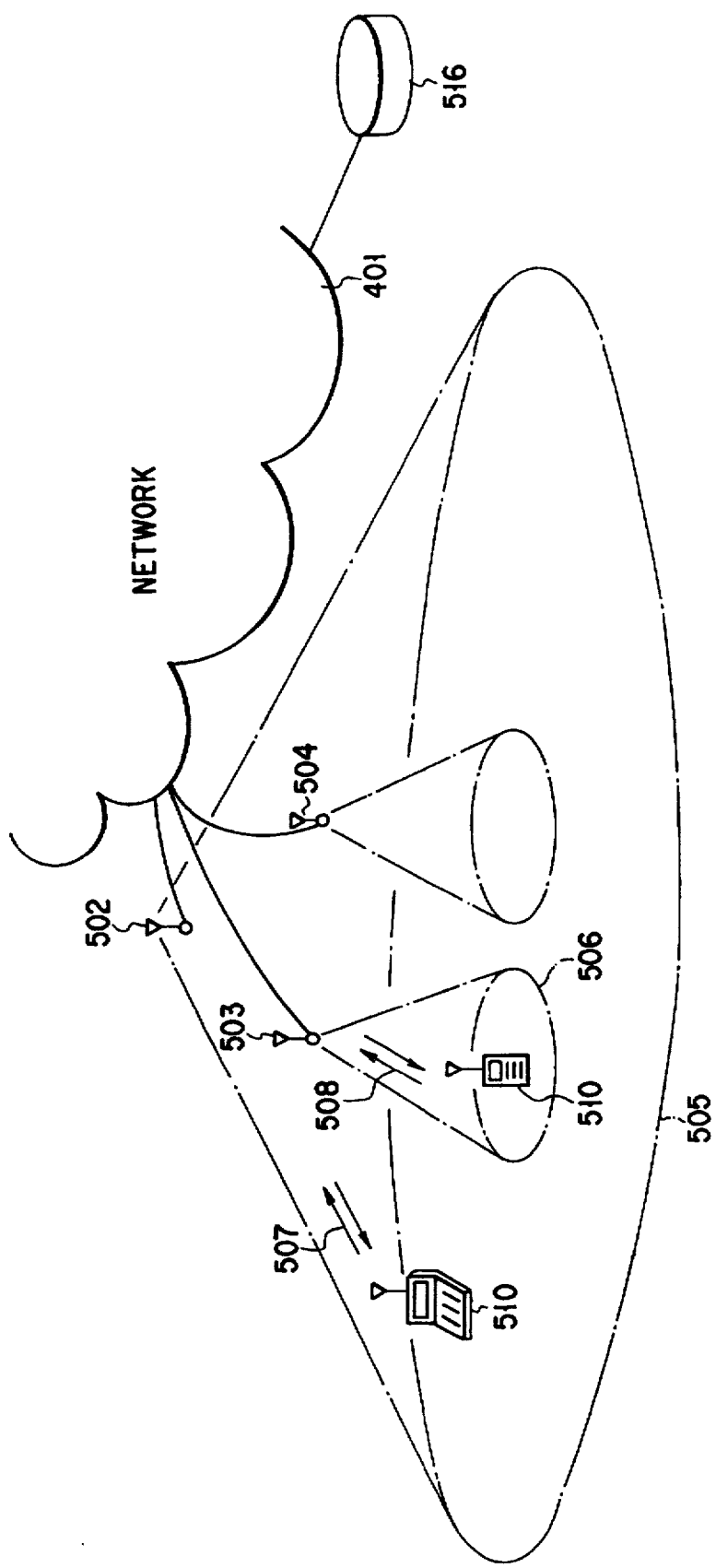
FIG. 13 is a conceptual diagram showing an SDL system to which a radio communication system of the ninth embodiment is applied.

In the SDL system, as shown in FIG. 13, a first base station 502 covers a wide area 505 with up-link and down-link channels 507 of low speed (low transmission speed). A second base station 503 covers a spot area 506 with a down-link channel (SDL) 508 of high speed (high transmission speed). When a portable terminal 510 is at a position capable of using only the low speed channel, it is connected to the network 501 through the base station 205 by using the low speed channel 507. When the terminal 510 is located at a position capable of communicating not only with the low speed channel but also with the high speed down-link channel, data is acquired by using the SDL channel 508, in the case of down-loading a large quantity of data when accessing the database or the like.

Figure 14:
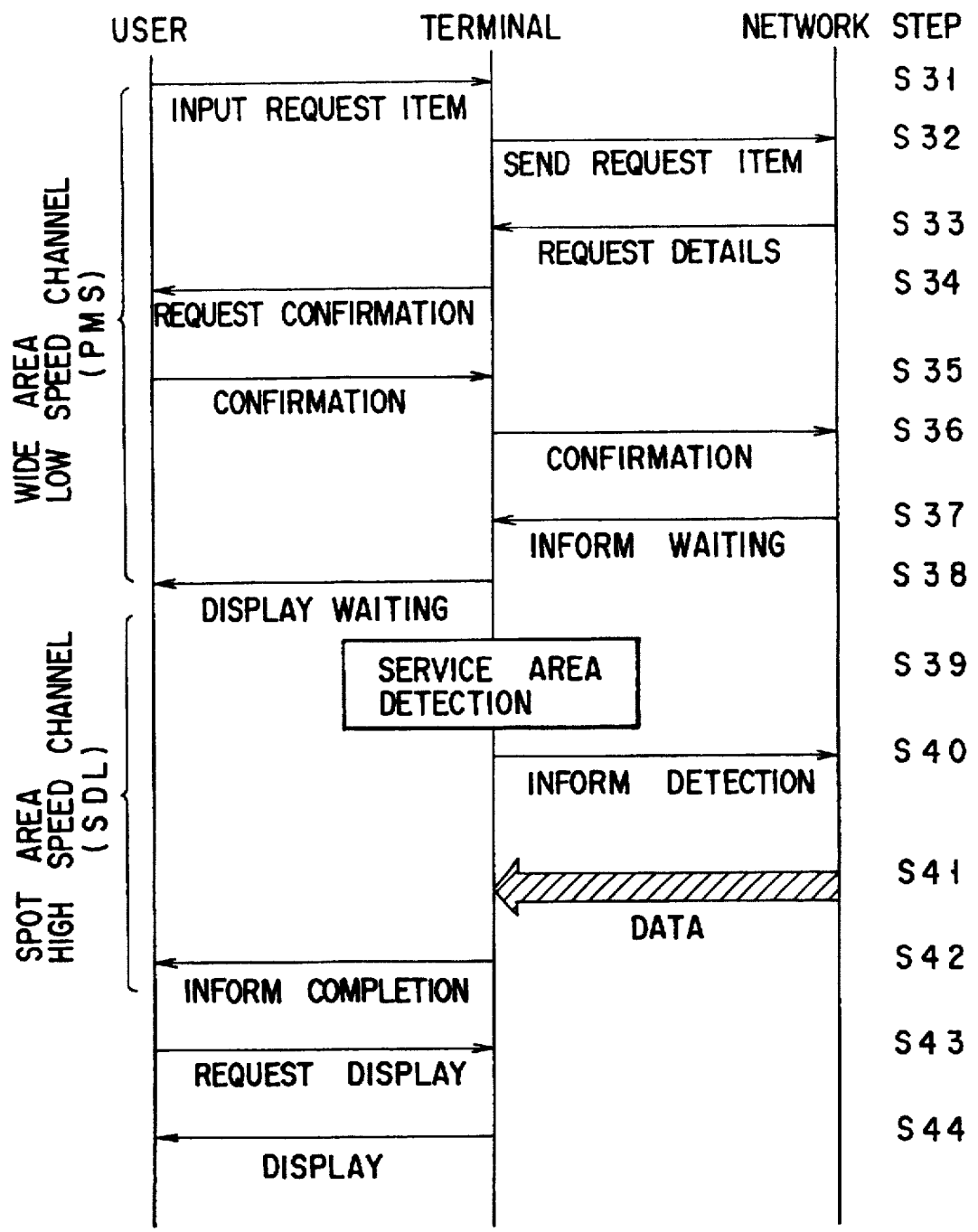
FIG. 14 is a sequence diagram for explaining a communication procedure of the ninth embodiment.

In this ninth embodiment using the SDL system, the data acquisition procedure is explained below by reference to FIG. 14.

The user, when wanting data, enters the data request and request items in the terminal 510. When the terminal 510 is located within the spot area 506 capable of using the SDL channel 508, the communication channel is connected immediately and data can be acquired, but it is impossible if staying outside the spot area 506.

As mentioned above, the up-link and down-link channels of low speed provided by the first base station 502 are realized by the PHS system, while the high speed channels provided by the second base stations 503, 504 are channels by the SDL system.

When the terminal 510 is outside the spot area 506 of the SDL system (but within the wide area 505 of the PHS system), the operation is as follows.

The user enters request items to the terminal 510 (step S31).

The terminal 510 transfers the request items to the first base station 502 of the PHS by using the PHS channel (step S32).

The first base station 502 reports the request items to the data provider 516 through the network 401.

At the data provider 516, the reported request items are verified if matched with the content of the data that can be provided, and reports the items of the data to be provided to the terminal 510, the table of contents, summary, and others to the terminal 510 (step S33). At this time, the ID code of the data provider, the serial numbers of the data to be provided to the user, and others are noticed at the same time.

The terminal 510 shows the content shown from the data provider 516 to the user by the terminal display, and requests confirmation (step S34).

The user, if agreeing with the content to be provided, confirms the content and enters an approval in a terminal 510 (step S35).

The terminal 510 notices the confirmation to the data provider 516 through the network 401 (step S36).

The network 401 notices the terminal 510 to wait for data acquisition (step S37).

The terminal 510 informs the user that it is ready to acquire data (step S38).

In the waiting state, the user can put the terminal 510 in the briefcase or pocket, and continues routine work. The terminal 510 is put in waiting state to detect if it is getting in the SDL area 506 or not. The means for determining if the SDL area 506 or not is realized by a method of determining by sensing the carrier by the terminal by sending out exclusive pilot carriers from the base stations 503 and 504, a method of receiving the specific signals transmitted out by the base stations 503 and 504 by the terminal, or other method.

As the user moves, suppose the terminal 510 has entered the SDL area 506. The terminal 510 detects entry in the SDL area 506 by carrier sensing (step S39).

The terminal 510 automatically notices to the network 140 by using the PHS channel that it has entered the high speed area (SDL area) 506 (step S40). At the same time, the own terminal ID, the ID of the data provider going to provide data, the serial data of the data desired, and others are noticed to the network 401.

The network 401 transmits them to the data provider 516. From the data provider 516, the preliminarily reserved request data is transmitted to the terminal 510 from the SDL channel 508 through the network 401 (step S41).

The terminal 510 stores the received data in the memory incorporated in the terminal. After completing the data reception, the terminal 510 informs the user of completion of data acquisition by a buzzer or LED display or the like (step S42).

The user enters the data display request in the terminal 510 whenever wanting to see the data (step S43).

When the display request is entered, the terminal 510 displays the data stored in its own memory (step S44).

Since the quantity of data provided from the data provider 516 is very large, it takes a very long time when attempted to transmit by the PHS channel 507. Herein, the ratio of transmission speed of the SDL channel 508 and PHS channel 507 is assumed to be 100:1. If the transmission data is in such quantity to be transmitted in 10 seconds by using the SDL channel 508, it takes 10,000 seconds (nearly 3 hours) by using the PHS channel 507. Therefore, it is not realistic to transmit data by using the PHS channel 507 only.

Accordingly, in this embodiment, the PHS channel 507 is used for reserving data acquisition, and when the terminal 510 gets into the SDL area 506, the data is automatically transmitted to the terminal 510 via the SDL channel 508. Hence, mixed data such as image and voice can be provided, and the user can acquire the data without knowing the SDL area 506.

(Tenth embodiment)

A tenth embodiment is described below.

In the ninth embodiment, regardless of the type of data, all data are transmitted by using the SDL channel 508. However, the data obtained from the data provider 516 may include data of relatively small quantity depending on the type. In this embodiment, therefore, at the data provider 516 side, data are divided into two classes depending on the data quantity. One is the primary data in the quantity sufficiently transmitted by the PHS channel 507, and the other is the secondary data that takes a very long time unless transmitted by the SDL channel 508. The primary data is text data showing the outline of data or the like, and the secondary data includes specific drawings and moving pictures.

In the data provider 516 and network 410, of the data requested from the terminal 510, only the primary data is immediately transmitted to the terminal 510 through the PHS channel 507. The terminal 510 displays the received data to the user. The user, if the desired data is obtained by the primary data only, reports it to the network/data provider, and terminates the communication. If the user wants further data, it is reported to the network/data provider, and the secondary data is acquired through the SDL channel 508.

As the provided data, it is satisfied by the primary data in most cases, and if data is provided through the SDL channel 508 in such cases, it means wasteful communication, and efficient use of the SDL channel is disturbed, and the terminal consumes power wastefully.

By providing the primary data through the PHS channel 507, the user can acquire the data quickly, and by providing the secondary data through the SDL channel 508, data of moving picture or high definition images can be also provided effectively.

In this case, the terminal displays the primary data on the screen, and it is questioned whether or not to obtain detailed secondary data by using the SDL channel 508 (the button in the window system), and by clicking the button, the terminal is automatically set in the waiting state for receiving the SDL area, so that the user's operation will be much simplified by such setting.

The ninth and tenth embodiments may be modified as follows.

Figure 15:
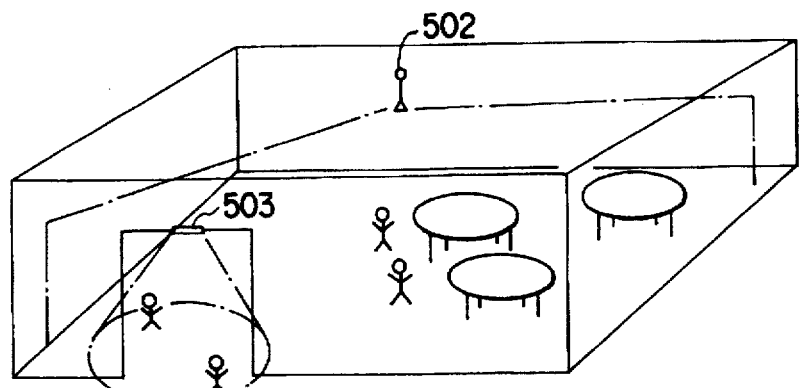
FIG. 15 is a diagram showing an application example of an eleventh embodiment of the present invention.
Figure 16:
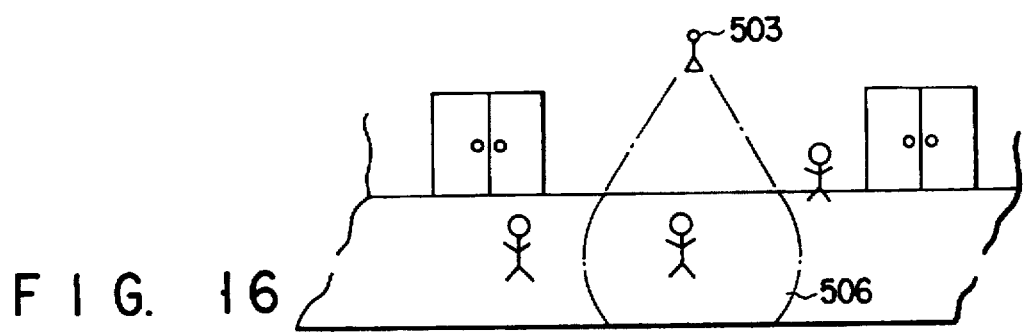
FIG. 16 is a diagram showing another application example of the eleventh embodiment.

FIG. 15 and FIG. 16 show examples of place of installation of SDL spot area 506 (the service area by SDL channel 508). In the ninth and tenth embodiments, it is assumed that the user of the portable terminal moves, and unless the user gets into the SDL spot area 506 while moving, data cannot be provided. This problem is solved by setting the SDL spot area 506 in a place of high probability of the user getting in or passing along with moving.

For example, when the SDL spot area 506 is set at the entrance of a company or entrance of an office room, the user crosses this area 506 at least several times a day and the data can be received. In FIG. 15, an entire room is covered by the PHS base station 502, and the SDL base station 503 is installed near the entrance, and the spot area 506 is disposed to cover all the people passing the entrance.

In such a configuration, when a certain time passes after data acquisition request is issued, the user is certain to pass the SDL spot area 506 and can acquire the data.

In FIG. 16, it is installed in the corridor of an office. When the SDL spot area 506 is set so that the people using the corridor are certain to pass, secure data transmission is realized.

In the same concept, the data acquisition rate can be enhanced by installing the SDL area in the highly probable passing zone of the users, such as the railway station entrance and exit, a toll gate of an expressway, specific positions of a highway, before an elevator, before an escalator, and a toilet, among others.

(Eleventh embodiment)

An eleventh embodiment is described below.

In the tenth embodiment, the primary data to be transmitted through the PHS channel 507 and the secondary data to be transmitted through the SDL channel 508 are fixed and determined at the data provider side. Accordingly, unless entering the SDL area 506, the secondary data can not be received forever. In this embodiment, alternatively, the time, PHS and SDL channel service charges and other conditions are all converted to the cost, and the data is transmitted through PHS or SDL channel so as to minimize the cost. For example, the secondary data is divided into various degrees of importance depending on the type of data. The image data, if a very high definition is not demanded, can be transmitted through the PHS channel in a certain duration of time.

When the user desires to acquire secondary data, the data provider sequentially calculates the cost, and presents the data by selectively using the PHS channel and SDL channel so that the cost may be minimum. Herein, the cost is determined such that the cost for important data increases with the passing of the time and the service charge of the PHS channel is slightly lowered with the passing of the time.

Hence, if the terminal does not get into the SDL area 506 after passing a certain time, and secondary data cannot be transmitted in the ninth and tenth embodiments, the highly important portion of the secondary data is transmitted to the terminal 510 through the PHS channel 507 and displayed to the user.

In this embodiment, by calculating the cost and dividing the data to be transmitted through the PHS channel and SDL channel, the user can always acquire the effective data at the minimum cost.

As explained herein, in the fifth embodiment to the eleventh embodiment, the user enters the data request preliminarily in the terminal, and the required items are automatically presented from the network when it is detected that the terminal gets into the communication area. By registering request items for the data issued periodically such as newspapers and periodicals, the data can be acquired without input of data request by the user every time. For example, when subscribing to a specific newspaper for three months by using the portable terminal, the user contracts with the newspaper data provider and is registered. The user does not have to enter the acquisition request of the newspaper every time into the terminal. The user goes to work with the portable terminal. An SDL area is provided at the local railway station entrance. As the user passes the entrance, the day's newspaper data is automatically transmitted to the terminal. The procedure of transmission is same as in the foregoing embodiments. The terminal informs the user of completion of data acquisition by sound, light or vibration. As a result, the user can read the newspaper articles through the portable terminal while waiting for a train on the platform or in the commuter train. Thus, by registering and reserving preliminarily, the labor of input to the terminal can be saved.

Incidentally it is attempted to realize electric newspaper delivery service by connecting high speed wired network to every home. It aims at providing various services by connecting optical fibers to homes and using the high speed channel. It requires, however, a colossal cost for installation of optical fibers to every home, and it is beyond acceptance for general homes generally using only telephone or facsimile services.

According to the present invention, since the SDL area is provided at specific points only, and particular infrastructure relating to individual homes is not necessary. The user has only to buy the terminal, and the network side requires only installation of base stations at railway stations and other several specific points. Thus, by installing the SDL area in specific points, advanced data presentation service is realized without excessive capital investment.

The user accessing the data provider does not always wish to obtain the data in real time. For example, if the user wants to know the content of the day's morning paper when going to work, the data is not necessary on one's way from home to the railway station, but is needed while waiting for the train at the station or in the train.

According to this system, the user enters desired data in the own terminal at an arbitrary time when wishing to have data. In the terminal, the types of data that can be acquired are stored preliminarily, and it is judged if the requested data is accessible or not, and if possible, it is noticed to the user. The user ends the terminal operation by knowing the registration is complete.

The terminal monitors whether it is located in an area enabling radio communication or not. As means of monitoring, for example, a specific frequency carrier is transmitted out from the base station side, and this carrier frequency is monitored, and the carrier is sensed to see if the carrier is above a specific field intensity or not.

The terminal, when detecting the entry in the radio communication area, originates a call automatically, and establishes a radio communication channel. The terminal notices the network that data acquisition is requested, and transmits the request item. The network transmits the request item to the data provider, and transmits the requested data from the data provider to the terminal by the radio channel. The terminal informs the user of completion of data acquisition by lamp or buzzer.

In this way, when it is detected that the terminal gets in the radio communication area, it automatically originates a call, establishes a radio communication channel, notices to the network that the data acquisition is requested, and transmits the request item to the network side, while the network transmits the request item to the data provider, and transmits the data provided from the data provider according to the request to the terminal by radio channel, and therefore, in this radio communication system, the user can receive necessary data without thinking of radio service area.

Therefore, according to the present invention, detecting that the terminal gets into the radio communication area and acquiring data automatically, the user receives advanced data presentation service without thinking of the radio communication area at all.

The fifth embodiment to the eleventh embodiment may be summarized as follows.

First, this is a radio communication system, being a system composed of a communication network, radio base stations connected to the communication network, and data providers and portable terminals connected to the communication network, in which the communication network and portable terminals are connected by radio channels through radio base stations, and by issuing data acquisition request, the data corresponding to the request can be received from the data provider, further comprising means for detecting when the portable terminal gets into an area radio communicable with the radio base station, wherein when acquiring data from the data provider by using the portable data terminal, the user of the terminal requests data acquisition to the terminal at an arbitrary time, and the portable terminal acquires the requested data automatically when getting into an area communicable with the radio base station.

In this constitution, the user of the terminal can request data acquisition to the terminal at an arbitrary time. When moving by carrying the terminal, the terminal, when detecting entry in radio communicable area, automatically originates a call, establishes radio communication channel, and notices to the network that the data acquisition is requested and transmits the request item to the network side, while the network side transmits the request item to the data provider, and transmits the data provided from the data provider according to the request to the terminal by radio channel.

This realizes the radio communication system in which the user can receive necessary data without thinking of the radio service area.

Second is a radio communication system, being a system composed of a communication network, radio base stations connected to the communication network, and data providers and portable terminals connected to the communication network, in which the communication network and portable terminal are connected by radio channel through one or plural base stations, and the base stations and portable terminal has at least radio transmission channels of a first down-link channel for transmitting at first transmission speed, a second down-link channel for transmitting at second transmission speed faster than the first transmission speed, and an up-link channel for transmitting at same transmission speed as the first transmission speed, and the communicable area of the first down-link channel and up-link channel is wider than the communicable area of the second down-link channel, further comprising means for detecting when the portable terminal gets into the region communicable with the second down-link channel, wherein when acquiring data from the data provider by using the portable terminal, the user requests data acquisition in the terminal at an arbitrary time, and the portable terminal automatically acquires the requested data through the second down-link channel when getting into the area communicable with the down-link channel.

In this constitution, in addition to the first effect, it brings about a second effect of acquiring data by high speed transmission when getting into the area of the second down-link channel having a narrow service area capable of transmitting at high speed.

As a result, the user can receive necessary data without thinking of the radio service area, and massive data can be acquired in a short time according to this radio communication system.

Thirdly, relating to the second constitution, the portable terminal can report the data acquisition request by the user to the network by using the up-link channel and the first down-link channel, whether located in a communicable area of the second down-link channel or not.

As a result, in addition to the first and second effects, it brings about a third effect capable of requesting data acquisition whenever desired.

Fourth, relating to the second constitution, the portable terminal can acquire data also through the first down-link channel.

As a result, in addition to the first and second effects, it brings about a fourth effect capable of acquiring data whenever desired.

The fifth to eleventh embodiments are examples relating to the radio communication system capable of acquiring data rationally. In the radio communication system, as the communication transmission speed becomes faster, a receiver for high speed transmission is needed also at the terminal. The receiver for high speed transmission requires a high power consumption in operation, and from the viewpoint of maintaining the battery capacity, the problem of battery is significant for the terminal (mobile station) carried by an individual. Moreover, as in the foregoing embodiments, in order to acquire data without having consciousness of the radio channel zone, the terminal must be always kept in an active state, and the battery is spent wastefully, and hence power-saving measures should be required.

From the viewpoint of power-saving, other embodiments are described.

First, the battery-saving method of radio communication system is explained.

In the case the terminal (mobile station) is portable as in the case of mobile communication system, it is hard to use by always connecting a wired power source, and generally the battery is used as the power source. To originate a call from the terminal device, it is enough to turn on the switch on every occasion, but when receiving a call, it is not known when a call is received, and hence the receiver must be always kept active. The power consumed for this purpose exhausts the battery, and therefore the incoming call waiting time is limited to a short time.

To solve this problem, intermittent reception is known as prior art. The receiver is not always kept in active state, but the receiver is started up at certain time intervals to sense the carrier, and the power source of the receiver is kept off until next rise time unless receiving wave is detected. In this way, the battery is saved, but if intermittent, the power consumption is significant in an apparatus of a large operating power.

Besides, since intermittent reception is done also outside the radio communication effective zone, even in the case of spot service zone covering a local area, intermittent reception is done merely without determining whether inside or outside the area, and the receiver is started even if communication is invalid, and the power is consumed wastefully.

To save the battery, the power consumption of each device may be lowered, but it is difficult to reduce the power consumption substantially by this method alone. Or in the communication system by micro cell such as PHS, along with the move of the location registration area, the packet for location registration must be transmitted to the base station, and the power consumption for this purpose also causes to shorten the duration time of the battery. Recently, there is an increasing demand for communication at high transmission speed along with development of mobile communication system, but transmission and reception at high transmission speed consume a large power. Even intermittent reception consumes a significant power in the receiver, and it is demanded to start the receiver as rarely as possible in order to save the battery. If, however, the starting interval of the receiver is too long, when communication service over a wide area is done in a spot, it is highly possible to pass through the reception area while the power source is kept off, or the waiting time until the communication designates the call becomes long, and troubles in service occur.

It is hence an object of the present invention to enable use of terminal apparatus small in power consumption in reception in high speed transmission. In the battery saving method of the terminal apparatus of the present invention, by minimizing the operation of the wide-band receiver which consumes a large power, the battery is saved without sacrificing the service quality. To realize this, in the terminal apparatus, aside from the wide-band receiver, reception detecting means of much smaller power consumption by narrow-band or the like is provided, and while wide-band waves are not received, service in wide band is detected by the reception detecting means of low power consumption, and the receiving part of wide-band waves is operated from the power source control unit to receive. When it is not necessary to perform reception operation of wide-band, the wide-band receiver is stopped to save the battery. The detail follows.

(Twelfth embodiment)

Figure 17:
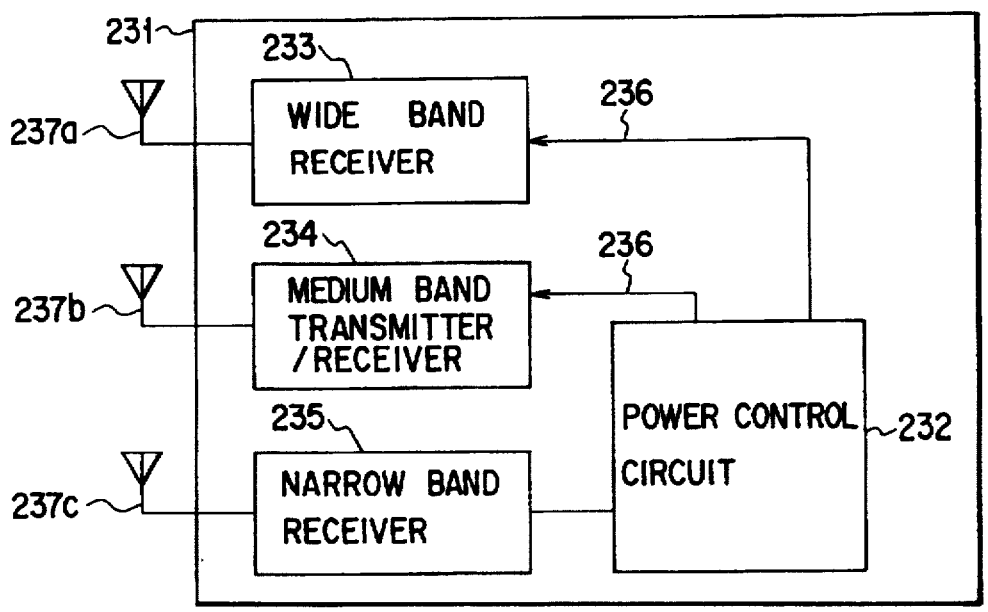
FIG. 17 is a diagram showing a terminal device of a twelfth embodiment of the present invention.
Figure 18A:
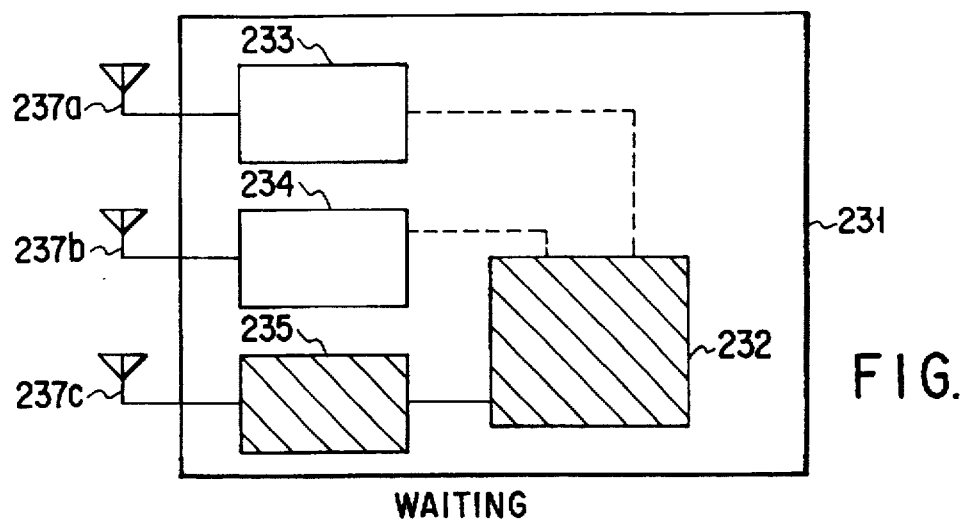
FIGS. 18A to 18C are diagrams explaining a battery saving operation of the terminal apparatus of the twelfth embodiment.
Figure 18B:
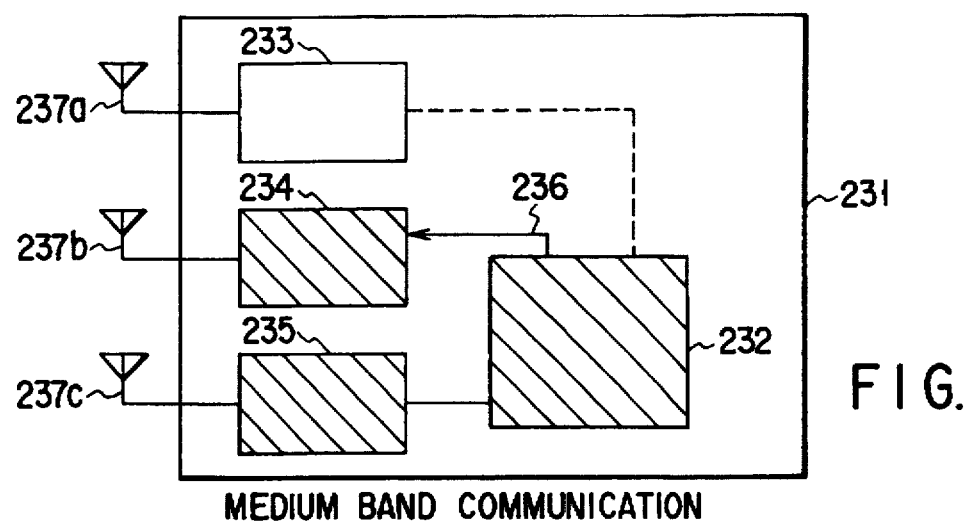
Figure 18C:
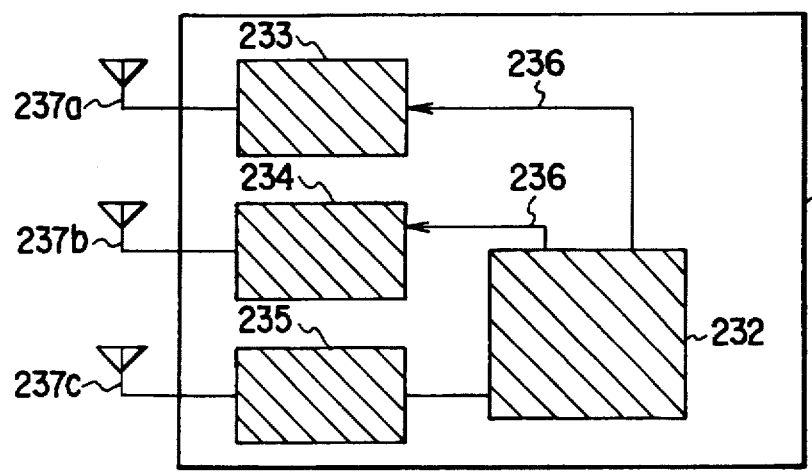

FIG. 17 is a block diagram showing the constitution of the battery-saving method in this embodiment, and FIG. 18A to FIG. 18C are diagrams for explaining its operation.

A terminal apparatus 231 is composed of a power source control unit 232, a wide-band receiver 233 for operating to receive corresponding to wide-band waves of radio transmission waves, a medium-band transmitter/receiver 234 for operating to transmit and receive corresponding to medium-band waves, a narrow-band receiver 235 for operating to receive corresponding to narrow-band waves, and antennas 237a to 237c corresponding to either one or both of transmission and reception. The power source control unit 232 supplies a power source control signal to the receivers 233, 234 for operating them. The wide-band receiver 233 and medium-band transmitter/receiver 234 receive the power source control signal 236 addressed to their own output out from the power source control unit 232, and put the circuits in operation by receiving power feed from the power source unit not shown in the drawing. Besides, depending on the circumstance, the power source control unit 232 controls generation of power source control signal 236 for the wide-band receiver 233 and medium-band transmitter/receiver 234, and hence controls their operation. The antenna 237a is for receiving of the wide-band receiver 233, the antenna 237b is for transmitting and receiving of the medium-band transmitter/receiver 234, and the antenna 237c is for receiving of the narrow-band receiver 235.

Referring next to FIG. 18A to FIG. 18C, the operation of the twelfth embodiment is described. In FIG. 18A to FIG. 18C, same reference numerals as in FIG. 17 show the same constitution as in FIG. 17. The shaded block indicates an active state.

When the power source of the terminal apparatus 231 is turned on, the power source control unit 232 is put in an active state. Consequently, the operation is controlled by feeding power to the medium-band transmitter/receiver 234, wide-band receiver 233, and narrow-band receiver 235 from the power source control unit 232.

Usually, while waiting without making communications, as shown in FIG. 18A, the narrow-band receiver 235 and power source control unit 232 are active, while the wide-band receiver 233 and medium-band transmitter/receiver 234 are inactive. Since the narrow-band receiver 235 and power source control unit 232 are operating, if the wide-band receiver 233 and medium-band transmitter/receiver 234 are not operating, the terminal apparatus 231 can respond to an incoming call.

That is, the incoming call is processed as follows. First, the terminal apparatus 231 is called by a signal of narrow-band wave. Hence, through the narrow-band receiver 235, the terminal apparatus 231 and power source control unit 232 know what kind of call is designated. When the medium-band communication is called by the signal of narrow-band signal, as shown in FIG. 18B, the power source control unit 232 transmits a power source control signal of the medium-band transmitter/receiver 234, and hence the power source of the medium-band transmitter/receiver 234 is turned on to start operation, thereby transmitting and receiving by using medium-band waves.

FIG. 18C shows a second active mode in this embodiment, showing an example of starting both the wide-band receiver 233 and medium-band transmitter/receiver 234, by the call by the signal of narrow-band wave.

By the call by the signal of narrow-band wave, the power source control unit 232 transmits the control signal to the wide-band receiver 233 and medium-band transmitter/receiver 234. The wide-band receiver 233 and medium-band transmitter/receiver 234 operate by using the antennas 237a, 273b, respectively.

Generally, the power consumption in the radio devices composing the terminal apparatus increases as the bandwidth becomes broader. If the power per bandwidth is the same, a larger power is consumed when the bandwidth is broader. The loss of devices and channel becomes larger as the frequency is higher, and a larger power is consumed when the frequency is higher in order to compensate for it.

A narrow-band signal can be transmitted at low frequency, but a wide-band signal is transmitted at high frequency. It is assumed that the transmission speed of a narrow-band signal is 1 to 2 Kbps, that of medium-band signal is 32 Kbps, and that of a wide-band signal is 155 Mbps. Although narrow-band signals can be transmitted in a band of hundreds of MHz, but it cannot be transmitted in this band since the other bands signal cannot be transmitted, and hence a millimeter wave band such as 20 to 60 GHz band must be used for transmitting the narrow-band signals. From this relation between bandwidth and frequency, narrow-band signals can be received by a very small power, while a larger power is needed for reception of wide-band signals.

Therefore, as in this embodiment, by using the narrow-band signal in monitoring for incoming call in waiting state to stop the power source of the wide-band receiver 233 and medium-band transmitter/receiver 234 in waiting state, and operating the narrow-band receiver 335 in power feed state, monitoring for incoming call in waiting state is enabled, and only when called, power feed is started to either required one of the wide-band receiver 333 and medium-wave band receiver 334 to put in operation, so that the battery can be saved effectively.

(Thirteenth embodiment)

Figure 19:
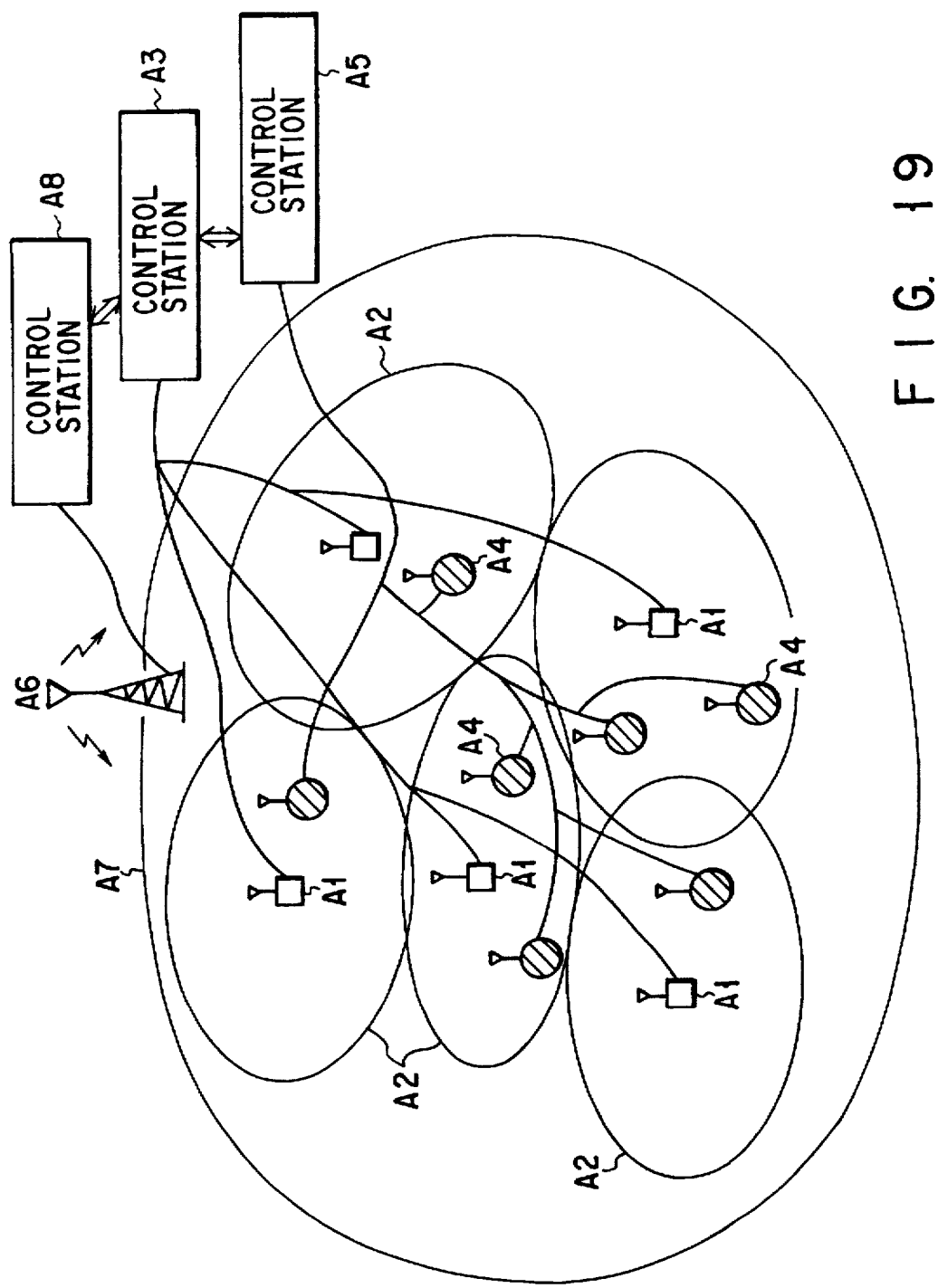
FIG. 19 is a conceptual diagram showing an entire system of a thirteenth embodiment of the present invention.

In the SDL system, having a narrow-band channel of low transmission speed and wide-band channel of high transmission speed, as shown in FIG. 19, data transmission using narrow-band channel is conducted in a wide area A7, and data transmission using narrow-band channel is conducted in a narrow area A2. Suppose a base station A6 is a paging-only narrow-band channel having the wide area A7 as service area. A pager may be known as an example thereof. The service area of the pager is very wide, such as a whole state, but since the users existing in the area must be accommodated in a limited frequency resource, it is possible to transmit only at a low transmission speed (hundreds of bps to several Kbps).

Transmission in medium band is communicated in a limited area, and this area consists of plural portions arranged continuously by overlapping partially, and the user can communicate at arbitrary positions while moving. This is realized by the technology called location registration. Plural base stations A1 are disposed, and each has a narrow area A2, and these areas are designed to overlap. Such examples include the portable telephone and second-generation cordless telephone (PHS). In the PHS, the terminal getting into a certain area notices to the base station that it is in this area, and the location is registered in the control station A3, so that it can be called from the network. The radius of the area is hundreds of meters to several kilometers, and to support the users existing in this area, the pager can communicate at high speed, so that transmission at tens of Kbps to hundreds of Kbps may be enabled.

Transmission in wide band is an exclusive down-link channel disposed in spots, and the cells A4 are spots and are not continuous, and data is transmitted only when the user passes the area. This area is located at the positions the users are likely to pass by, such as railway station and highway, and the covering range is several meters to tens of meters. This is data transmission in a limited range, and since the areas are remote from each other, communication at high speed is possible, and data transmission at high speed of about tens of Mbps to 150 Mbps is enabled. As a example of such wide-range spot-area data transmission, the SDL system mentioned above may be known.

In the conventional PHS system, location registration in a relatively narrow area is necessary. This is because the radius of the area is about hundreds of meters to several kilometers, and the area changes occurs very frequency as the terminal moves, and the location must be registered each time. Alternatively, by dividing the area into several groups, it may be considered to register location only when moved to other group. In this method, however, the PHS must be always kept in ON state in order to judge the area groups, and the reception signal must be demodulated.

In this embodiment, whether in the PHS or in the SDL system, the power source can be turned off completely in waiting state. When turning on the power, the location is registered by using the PHS system. Usually, the location registration data is stored in the control station A3 for controlling the PHS system, and when paging by using the PHS system, the area is specified by using the location registration data. In this embodiment, the location registration data is noticed to the control station responsible for paging by the pager, and the pager pages. At the terminal, after registering the location by using the PHS system when turning on the power, the power source of the PHS system is turned off, and the pager receives. The pager has the function of turning on the power source only for the possible time when any signal addressed to itself may be transmitted as shown in FIG. 20A and FIG. 20B. This is called the intermittent reception technology, and is widely employed generally.

The paging range by the pager is very wide, and once the location is registered, one does not go out of the range so often unless driving on an expressway or moving on a bullet train. Once going out of the range, however, a call is not received. Usually, the pager is for incoming call only, and the paging area is limited at the time of making a contract, and it cannot be used in another area.

In this embodiment, such a problem is solved by registering the location by the PHS system. For this purpose, the signal at timing B1 highly possible to have a signal addressed to itself in FIG. 20A may be composed as shown in FIG. 21. In this signal, a wide area ID showing the paging area of the pager is added, and it is utilized. At the terminal, receiving by using the pager, the wide area ID in the reception data is checked to compare with the ID of the own prior location registration, and when it is judged that the terminal is obviously out of the expected area, the function element of the PHS system as the terminal is controlled to turn on the power, and location is registered again.

This solves the problem in the prior art that the pager registered in New York area could not be used in California or other places.

As the waiting state in the pager, the power source is kept in OFF state in the function elements of PHS system and SDL system as terminals.

On the other hand, suppose data transmission is requested to the terminal by the SDL system at the network side. At the network side, first the terminal is called by the pager. The called terminal turns on the PHS system, and the location of the PHS area is registered. At the network side, from the previous location registration, there is certain terminal location data enough to specify the wide area of the pager, but there is no location data of enough accuracy for communicating with the PHS system.

After establishing the PHS channel by location registration of PHS area (service area for PHS system), the network side informs the terminal of the request for communication by using SDL system. Afterwards, when getting into the spot area (service area for using high speed channel of SDL system), high speed data transmission is done by using the SDL system.

Conventionally, in the waiting state at the terminal, the battery is saved by intermittent reception operation by the PHS system, whereas in this embodiment, by intermittent reception by the pager, a higher battery-saving effect is obtained.

Comparing the power consumption in the waiting state between the PHS system and pager, the pager consumes far smaller power. This is due to the transmission speed, frequency band, and intermittent reception interval. Put together, however, it is not so different from the extension of the intermittent reception interval of the PHS system, but the greatest difference is that the pager requires location registration only once when turning on the power and is very small in the number of times of location registration as compared with the PHS system which requires frequent location registrations. The location registration job is accompanied by transmission, and its power consumption is significant.

By the combination of pager system, PHS system, and SDL system, and exchange of data such as location registration data by each control station, a notable battery saving effect is obtained. Thus, in this embodiment, by receiving in waiting state intermittently only by a narrow-band signal, the power consumption in the waiting state can be substantially reduced, and a more effective battery saving is realized.

(Fourteenth embodiment)

Figure 22:
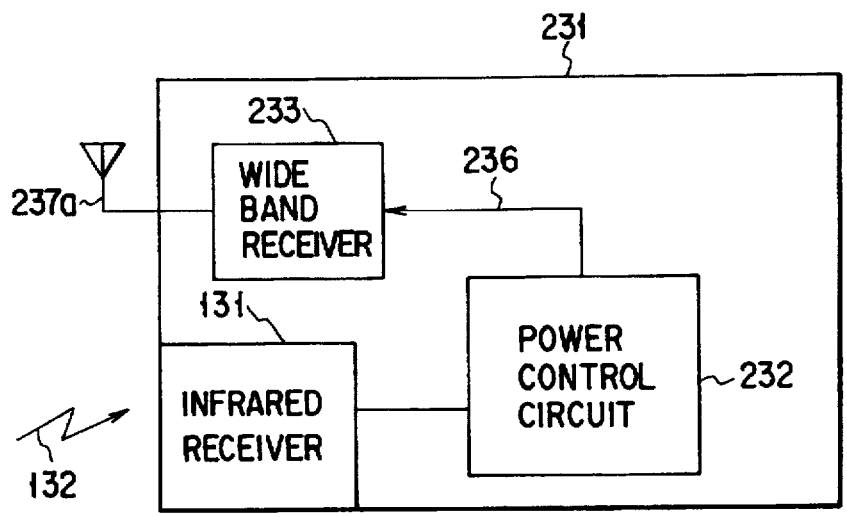
FIG. 22 is a block diagram showing a terminal device of a fourteenth embodiment of the present invention.
Figure 23A:
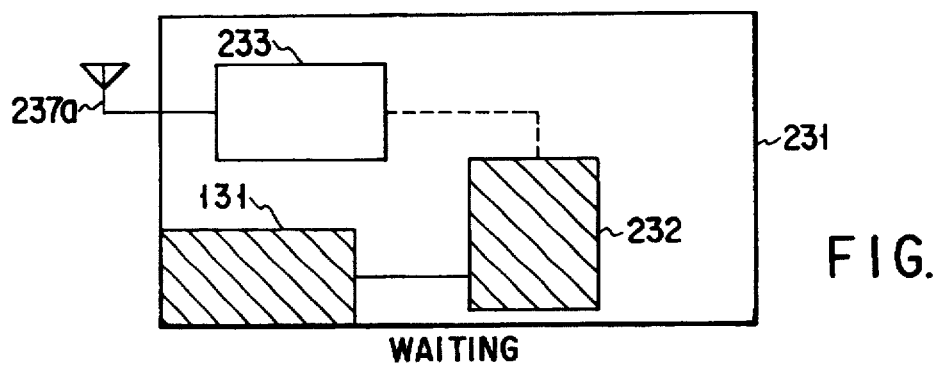
FIGS. 23A and 23B are conceptual diagrams explaining a battery saving operation of the fourteenth embodiment.
Figure 23B:
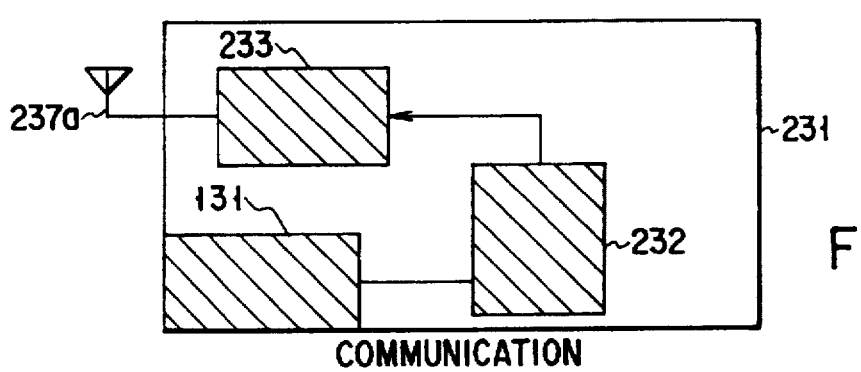

A fourteenth embodiment is an example relating to a second battery saving method, and a schematic structure is shown in FIG. 22, and its operation is illustrated in FIG. 23A and FIG. 23B.

In FIG. 22, same reference numerals as in FIG. 17 denote the same components. Reference numeral 131 is an infrared receiving unit for detecting an infrared ray, and 132 is an infrared signal showing the wide-band receiving area. In this embodiment, a power source control unit 232 and a wide-band receiver 233 are provided, and circuits for narrow band and medium band are not provided. The infrared receiving unit 131 for detecting an infrared ray is realized generally by an extremely low power consumption. In this embodiment, taking note of this point, it is designed to use infrared ray while waiting for an incoming call.

The operation of this embodiment is described below while referring to FIG. 22, FIG. 23A and FIG. 23B. The infrared ray receiving unit 131 of the terminal apparatus 231 operates at low power, and when waiting, the infrared ray receiving unit 131 and power source control unit 232 operate as shown in FIG. 23A, while the wide-band receiver 233 is stopped.

In operation, as shown in FIG. 23B, the infrared receiving unit 131 detects the infrared signal 132 and transmits out the output to the power source control unit 232, and the wide-band receiver 233 is put in operation by the power source control signal 236 from the power source control unit 232. The wide-band receiver 233 receives by using the antenna 237a.

The monitoring circuit using infrared ray can be composed in a circuit of an extremely low power consumption. Therefore, by employing such infrared receiving system realizing circuit composition of low power consumption in monitoring in waiting state, a more effective battery saving is realized.

Using infrared rays, an infrared sensor is required at the terminal side of radio communication apparatus 231, and this sensor may be attached to the sleeve or the pocket of the clothes of the user carrying the terminal, or to the outside of a briefcase or the like with a clip.

(Fifteenth embodiment)

A fifteenth embodiment is shown as a third battery saving method.

Figure 24:
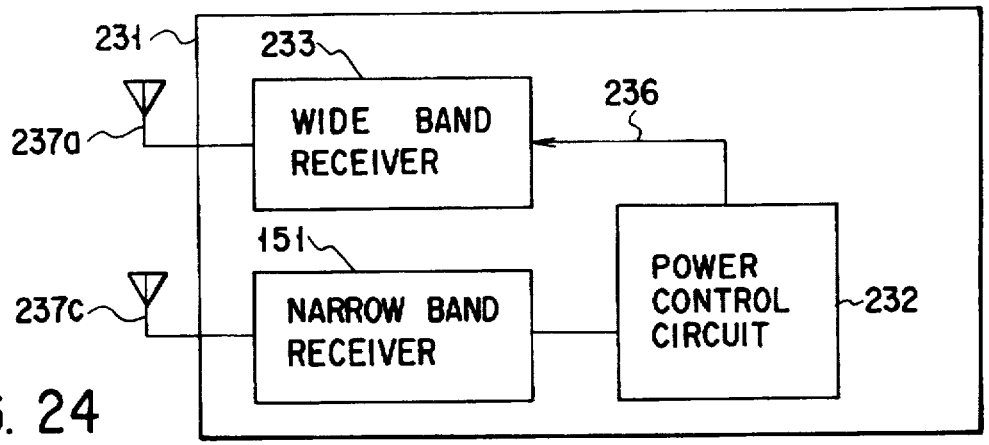
FIG. 24 is a block diagram showing a terminal device of a fifteenth embodiment of the present invention.
Figure 25A:
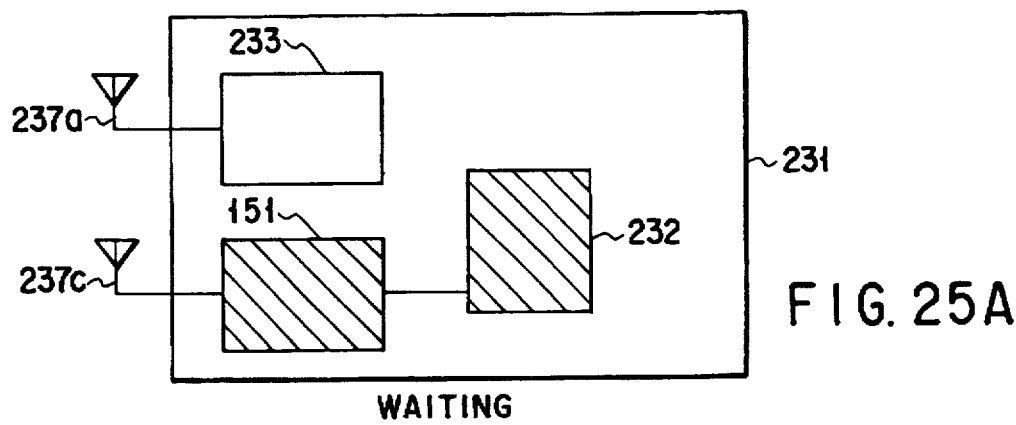
FIGS. 25A and 25B are conceptual diagrams explaining a battery saving operation of the fifteenth embodiment.
Figure 25B:
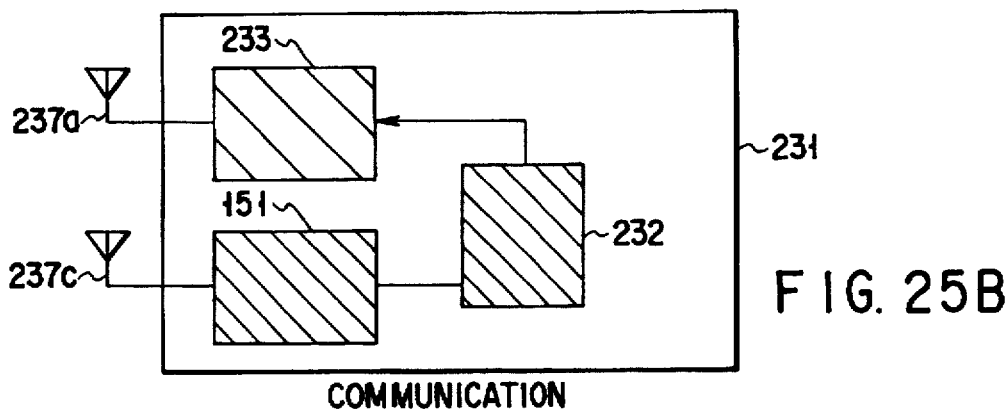

In FIG. 24 and FIG. 25A and FIG. 25B, same reference numerals as in FIG. 22 denote same components. In this embodiment, instead of the infrared receiving unit 133 in the constitution in FIG. 22, a narrow-band receiver 151 is provided as shown in FIG. 24. The narrow-band receiver 151 is a circuit for processing reception (receiving operation) of narrow-band waves.

The operation of this embodiment is described by referring to FIG. 25A and FIG. 25B. In the wide-band service area, a specific narrow-band wave showing the spot area is broadcast (transmitted). While waiting, as shown in FIG. 25A, only the narrow-band receiver 151 and power source control circuit 232 are operating, and the narrow-band receiver 151 operates at a smaller power than the wide-band receiver 233.

In a wide-band receiving place, narrow-band waves are received and processed by the narrow-band receiver 151, and the power source control unit 232 receives the output from the narrow-band receiver 233 to detect it, and gives a power source control signal to the wide-band receiver 233 in order to operate the wide-band receiver 233. Consequently, the wide-band receiver 233 receives the power supply and starts operation, thereby receiving wide-band waves.

Thus, in this embodiment, while waiting, the power source of the wide-band receiver 233 is turned off, and the power source of the narrow-band receiver 151 is turned on to put in operation, and the narrow-band waves are monitored by the narrow-band receiver 151, and when a call is received by using the narrow-band waves, the power source of the wide-band receiver 233 is turned on by the power source control unit 232 to start operation, and therefore the waiting operation is managed at low power consumption, so that a high battery saving effect is obtained.

(Sixteenth embodiment)

A sixteenth embodiment is an example of fourth battery saving method.

Figure 26:
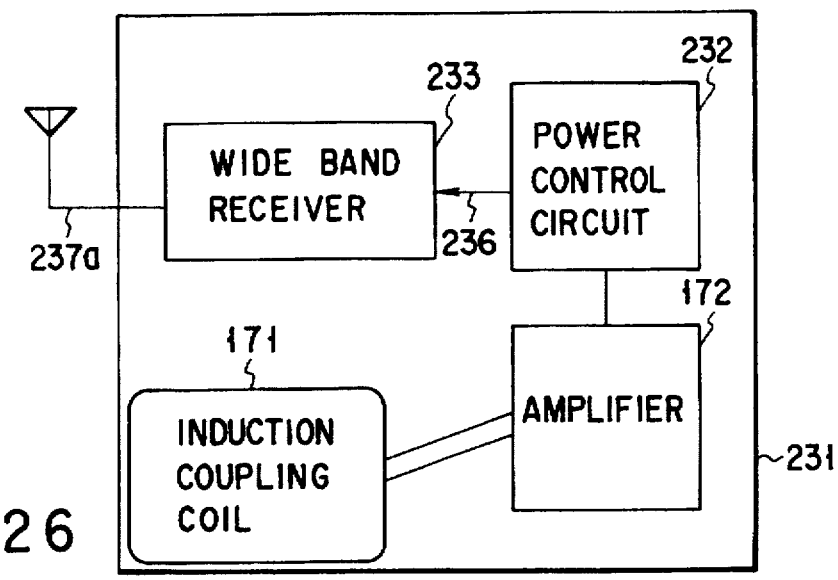
FIG. 26 is a block diagram showing a terminal device of a sixteenth embodiment of the present invention.
Figure 27:
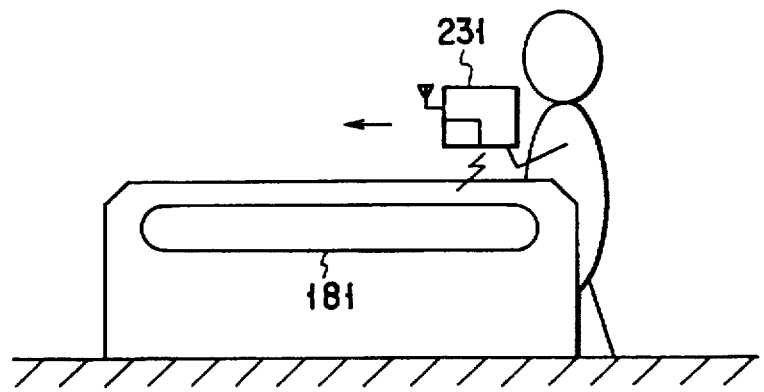
FIG. 27 is a conceptual diagram showing an entire system of the sixteenth embodiment.

FIG. 26 and FIG. 27 show a schematic structure and operation of this embodiment. In FIG. 26, same reference numerals as in FIG. 17 show same components, and reference numeral 171 is an induction coupling coil as a sensor, and 172 is an amplifier for amplifying the output of this induction coupling coil 171.

In FIG. 27, reference numeral 231 is a terminal apparatus, and 181 is an electromagnetic induction apparatus provided in a wide-band wave receiving area, and it is intended to generate a signal by electro-magnetic induction in the induction coupling coil 171 incorporated in the terminal apparatus 231. That is, the induction coupling coil 171 incorporated in the terminal apparatus 231 and the electromagnetic induction apparatus 181 are matched in the coupling characteristic, and the power source is always supplied to the electromagnetic induction apparatus 181, and therefore a signal by electromagnetic induction can be generated in the induction coupling coil 171.

The operation is described below. Outside the wide-band wave receiving area, the constituent elements in FIG. 26 are stopped. In the wide-band wave receiving area, the electromagnetic induction apparatus 181 as shown in FIG. 27 is provided, and the user of the terminal apparatus 231 moves the terminal apparatus 231 along the electromagnetic induction apparatus 181. An alternating-current power source is always supplied to the electromagnetic induction apparatus 181, and by the electromagnetic induction effect between the induction coupling coil 171 in the terminal apparatus 231 and electromagnetic induction apparatus 181, a current flows into the induction coupling coil 171. This current is immediately amplified by the amplifier 172, and is transmitted to the power source control unit 232. The power source control unit 232, by the signal from the amplifier 172, detects entry into wide-band wave receiving area, and transmits the power source control signal 236, as the control signal to turn on the power source of the wide-band wave receiving signal 233, to the wide-band receiver 233, so that the power source of the wide-band receiver 233 is turned on, thereby receiving wide-band waves through the antenna 237a.

Thus, outside the wide-band wave receiving area, the receiver or transmitter/receiver does not consume any power, and it is highly effective for battery saving. This embodiment is particularly effective when installed, for example, at the automatic ticket checking apparatus at a railway station.

(Seventeenth embodiment)

A seventeenth embodiment is an example of a fifth battery saving method, relating to a battery saving method of suppressing wasteful power consumption in the wide-band receiver, while monitoring in the medium-band waves.

Figure 28:
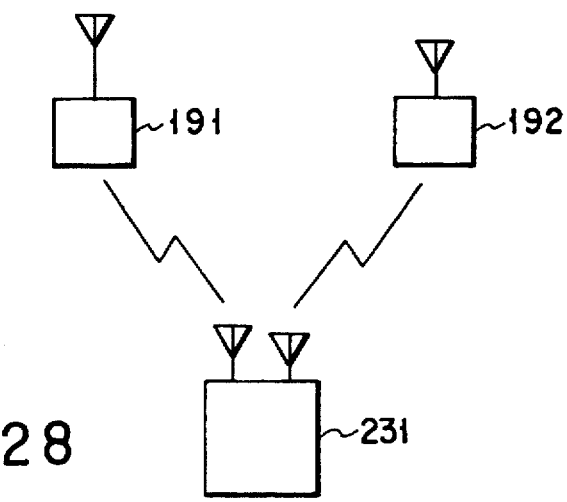
FIG. 28 is a block diagram showing an entire system of a seventeenth embodiment of the present invention.

FIG. 28 and FIG. 29 schematically show the constitution of the seventeenth embodiment. In FIG. 28 and FIG. 29, those having same reference numerals as in FIG. 17 show the same components as in FIG. 17. In the diagrams, reference numeral 191 is a base station apparatus for medium-band waves as a base station for communicating in medium-band waves, and 192 is a base station apparatus for wide-band waves as base station for communicating in wide-band waves.

FIG. 30A to FIG. 30C are explanatory diagrams of the operation of this embodiment. Reference numeral 101 is a wide-band reception start ID code, and 102 is a wide-band reception end ID code. The reception start ID code 101 and reception end ID code 102 are transmitted from the medium-band base station 191, and these codes are received and recognized in the medium-band receiver 34, and on the basis of the result of receiving and recognizing, the power source control signal 236 is controlled in the power source control unit 232, and the power on/off of the wide-band receiver 233 is controlled. Therefore, the medium-band transmitter/receiver 234 has the function of identifying the reception start ID code 101 and reception end ID code 102.

In FIG. 28, it is supposed that the terminal apparatus 231 can receive both of the waves of medium-band base station 191 and wide-band base station 192.

In FIG. 29, while waiting, the medium-band transmitter/receiver 234 and power source control unit 232 are operating, and when the medium-band transmitter/receiver 234 receives and recognizes the wide-band reception start ID code 101, the power source control unit 232 controls, as shown in FIG. 30C, to turn on the power source of the wide-band receiver 233, and this wide-band receiver 233 is put into operation.

Next, when the medium-band transmitter/receiver 234 receives and recognizes the wide-band reception end ID code 102, the power source control unit 232 controls, as shown in FIG. 30C, to turn off the power source of the wide-band receiver 233 to stop its operation.

Thus, while monitoring in medium-band waves, wasteful power consumption in the wide-band receiver can be suppressed, and an improved effect is obtained in battery saving.

(Eighteenth embodiment)

An eighteenth embodiment is intended to save the battery, in time sharing multiplexing in the wide band, by controlling the operation timing of the wide-band receiver by using medium-band wave, thereby stopping operation of the wide-band receiver in other than reception slot.

FIG. 31A to FIG. 31C are explanatory diagrams of operation of battery saving method of this embodiment, and the parts having same reference numerals as in FIG. 30A to FIG. 30C are same as in FIG. 30A to FIG. 30C. Reference numerals 111A and 111B are data transmitted in wide-band waves. The construction of the eighteenth embodiment is same as the construction explained in the seventeenth embodiment.

The operation of the eighteenth embodiment is explained by reference to FIG. 31A to FIG. 31C. Same as in the seventeenth embodiment, by receiving and recognizing the wide-band reception start ID code 101 in the medium-band wave transmitter/receiver 234, the power source control unit 232 controls to turn on the power source of the wide-band receiver 233 to put in operation, and by receiving and recognizing the wide-band reception end ID code 102 by the wide-band receiver 233, the power source of the wide-band receiver 233 is turned off to stop, which is executed in the following procedure.

The reception start ID code 101 and reception end ID code 102 are transmitted from the medium-band base station 191, and these codes are received and recognized in the medium-band receiver 234, and on the basis of the result of receiving and recognizing, the power source control signal 236 is controlled by the power source control unit 232, thereby controlling on/off of the power source of the wide-band receiver 233.

In this embodiment, since it is supposed that time sharing multiplexing be done in the wide band, the operations of the medium-band transmitter/receiver 234 and wide-band receiver 233 are synchronized, and the base station apparatus 191 side transmits the reception start ID code 191 just before the wide-band data 111 in the medium-band wave, and it is received by the medium-band transmitter/receiver 234 of the communication terminal apparatus 231, and the reception end ID code 102 is transmitted in medium-band wave from the base station apparatus 191 side just before end of transmission of wide-band data 111 from the base station apparatus 192, and consequently it is received by the medium-band transmitter/receiver 234 of the communication terminal apparatus 231, so that the wide-band receiver is operated only when there is data.

In the case of time sharing multiplexing in the wide band, by controlling the operation timing of the wide-band receiver by using medium-band waves, the operation of the wide-band receiver can be stopped in other than reception slot, which is highly effective for saving battery.

(Nineteenth embodiment)

In a nineteenth embodiment, in the case of packet transmission of the wide-band waves, a wide-band reception start ID code is transmitted in the medium band according to the transmission timing of packet, and the power source of the wide-band receiver 233 is turned on, and by sending a wide-band reception end ID code at the end of the packet, it is identified in the wide-band receiver 233, and its own power source is cut off and the battery is saved.

Or, by synchronizing the reception timing of medium band and wide band, by sending the wide-band reception start ID code 101 to be received in the medium band just before wide-band data, in the case of time sharing multiplexing in wide band, the operation of the wide-band receiver can be stopped in other than reception slot in wide band, so that the battery can be saved. FIG. 32A to FIG. 32D and FIG. 33A to FIG. 33C are diagram showing examples of battery saving method of the embodiment.

In FIG. 32A to FIG. 32D, same reference numerals as in FIG.30A to FIG. 30C refer to same functions as in FIG. 30A to FIG. 30C. In the diagrams, reference 121 shows data transmitted in wide band, and 122 denotes a data code indicating end of data transmission. In the example in FIG. 32A to FIG. 32D, the wide-band receiver 233 has functions for identifying the wide-band reception end ID code 122, and turning off the own power source.

In the example in FIG. 33A to FIG. 33C, reception timings of medium band and wide band are synchronized, and a wide-band reception start ID code 101 received in medium band is transmitted just before wide-band data, and a wide-band reception end ID code 102 is transmitted just after completion of wide-band data, and by distinguishing them in the medium-band transmitter/receiver 234, it is designed to control to turn on or off the power source of the wide-band receiver 233 through the power source control unit 232.

The example in FIG. 32A to FIG. 32D is explained. In waiting state, the medium-band transmitter/receiver 234 is operating, but the power source of the wide-band receiver 233 is turned off.

The operation of the medium-band transmitter/receiver 234 is not always continuous as shown in the diagram, and includes intermittent reception operation in terms of time to save power consumption.

The medium-band base station 191 transmits the wide-band reception start ID code 101 in medium band, and the wide-band base station 192 transmits a packet by adding wide-band reception end ID code to the end of the transmission data in wide band.

At the terminal apparatus 231 side, when the medium-band transmitter/receiver 234 detects the wide-band reception start ID code 101, this recognition output is given to the power source control unit 232, and from the power source control unit 232 receiving it, a signal is transmitted out to operate the wide-band receiver 233, and the wide-band receiver 233 starts to receive as indicated by reference numeral 103.

A packet having the wide-band reception end ID code 122 attached to the end of the transmission data in wide band is given, and when the wide-band receiver 233 detects it, as indicated by reference numeral 104, the wide-band receiver 233 immediately stops operation and turns off the power.

In the example in FIG. 33A to FIG. 33C, the reception timings of medium band and wide band are synchronized, and the medium-band base station 91 transmits the wide-band reception start ID code 101 just before the wide-band data. By recognizing it in the medium-band wave transmitter/receiver 234 of the terminal apparatus 231, the power source of the wide-band receiver 233 is turned on through the power source control unit 232.

The medium-band base station 191 transmits the wide-band reception end ID code 102 just after completion of wide-band data. By recognizing it in the medium-band transmitter/receiver 234 of the terminal apparatus 231, the power source of the wide-band receiver 233 is turned off through the power source control unit 232.

As a result, the reception timings of medium band and wide band are synchronized, and the wide-band reception start ID code 101 received in medium band is transmitted just before wide-band data, so that the operation of the wide-band receiver can be stopped in other than reception slot of wide band in the case of time sharing multiplexing in wide band, which is highly effective in battery saving.

The foregoing twelfth embodiment to nineteenth embodiment may be summarized as follows.

First, as the battery saving method of the terminal apparatus, the terminal apparatus comprises a receiver for receiving radio transmission waves at a first transmission speed, a transmitter/receiver for transmitting and receiving radio transmission waves at a second transmission speed slower than the first transmission speed, a receiver for receiving radio transmission waves at a third transmission speed slower than the second transmission speed, and a control unit having a function for turning on or off the power source of the receiver of the first transmission speed and transmitter/receiver of the second transmission speed based on the data of the signal received in the receiver of the third transmission speed, wherein in the waiting state for reception at the first and second transmission speed, only the receiver of third transmission speed is put in operation, while the power source of the transmitter and receiver of the first and second transmission speed turned off to prevent consumption of the battery.

In the battery saving method of the present invention, the terminal apparatus comprises a low power consumption receiver operating steadily, a power source on/off unit of the receiver operated in a wide band, a power source on/off unit of a transmitter operated in a medium band, and a power source control unit for controlling to turn on or off the power source of the wide band receiver or medium band transmitter/receiver on the basis of the data received in the low power consumption receiver, wherein the power source of the wide band receiver is turned on if the data from the narrow band receiver requires reception in wide band, and is turned off if not necessary.

Generally, the power consumption of radio devices composing the terminal apparatus increases as the bandwidth is broader. If the power by band is equal, a larger power is consumed when the bandwidth is broader. The loss of devices and lines also increases as the frequency is higher, and to compensate for it, when the frequency is higher, the power consumption is larger.

A narrow-band signal can be transmitted at low frequency, but a wide-band signal is transmitted at high frequency. The transmission speed of narrow-band signal is 1 to 2 Kbps, that of medium-band signal is 32 Kbps, and that of wide-band signal is 155 Mbps. Although narrow-band signals can be transmitted in a band of hundreds of MHz, wide-band signals cannot be transmitted in this band, and hence it is hard to use this band, and a millimeter wave band such as 20 to 60 GHz band must be used. From this relation between bandwidth and frequency, narrow-band signals can be received by a very small power, while a larger power is needed for reception of wide-band signals.

Moreover, in the battery saving method of the present invention, the narrow-band receiver is always kept in operation for an incoming call, and the power source of the wide-band and medium-band transmitter/receiver is turned off, and when a terminal call signal is detected in the narrow band receiver, the power source control unit turns on the power source of the wide-band receiver and medium-band transmitter/receiver, and thereby receiving operation is carried out in the wide-band, and transmitting and receiving operation in the medium band. When communication in wide band or medium band is over, the power source of the wide-band receiver or medium-band transmitter/receiver is turned off again.

In the present invention, by waiting only with a narrow band signal, only the narrow-band receiver is operated in the waiting mode, and the power consumption is suppressed and the battery is saved.

Secondly, in the battery saving method of the terminal apparatus of the present invention, the terminal apparatus comprises a receiver for receiving radio transmission waves at first transmission speed, a transmitter/receiver for transmitting and receiving radio transmission waves at second transmission speed slower than the first transmission speed, detecting means for recognizing that the terminal apparatus can receive radio transmission waves at first transmission speed, and a power source control unit having a function for turning on or off the power source of at least the radio transmission receiver at first transmission speed, wherein in the place not provided with communication service at first transmission speed, the power source of the radio transmission receiver of first transmission speed is turned off to prevent consumption of the battery, and in a place provided with communication service at first transmission speed, the service area is detected by the detecting means, and reception at first transmission speed is conducted.

In this battery saving method, the means for detecting if the wide band communication service can be utilized or not is always kept in operation, and the wide band receiving power source is turned off, and when it is detected by the detecting means that wide band reception is enabled, reception operation is conducted in wide band. When wide band reception is over, the power source control unit turns off the power source of at least the wide-band receiver. In the present invention, the power source of the wide-band receiver is turned off unless wide-band service is provided, and the detecting means of wide band consumes very small power, so that the battery can be saved without sacrificing the service quality.

Thirdly, according to the battery saving method of the terminal apparatus of the present invention, the terminal apparatus comprises a receiver for receiving radio transmission waves at a first transmission speed, a transmitter/receiver for transmitting and receiving radio transmission waves at a second transmission speed faster than the first transmission speed, and a power source control unit having a function of turning on or off the power source of the radio transmission receiver at a first transmission speed according to the reception data at the second transmission speed, wherein the power source control unit starts up the radio transmission receiver at the first transmission speed by the identification signal transmitted to the terminal apparatus at the second transmission speed just before start of reception service at the first transmission speed, and the radio transmission receiver at the first transmission speed is stopped just after completion of reception service at the first transmission speed.

In this battery saving method, the medium band receiver is always operating, while the wide-band receiver power source is cut off, and a code showing start of reception of wide band is inserted in the data received in medium band, and when the code showing start of reception of wide band is detected in the data received in medium band, the power source control unit starts up the power source of the wide-band receiver, thereby performing receiving operation in wide band. When reception in wide band is over, the power source control unit stops the power source of the wide-band receiver. In the present invention, when the wide band data is transmitted intermittently, the power source of the wide-band receiver is stopped while the wide band data is not transmitted, so that the battery saving is realized without sacrificing the service quality.

Therefore, according to the battery saving method of the terminal apparatus of the present invention disclosed in the twelfth to nineteenth embodiments, by minimizing the operation of the wide-band receiver which consumes much power, the battery can be saved without sacrificing the service quality.

These embodiments related to battery saving in a waiting state, but anyway using wide-band channel and narrow-band channel, the power source for wide-band receiver is controlled so as to transmit by using the wide-band channel only when necessary while using the narrow-band channel usually, and hence this method cannot be used directly in the existing system.

In the high speed radio communication using a spot cell not working in such system (a narrow service area), to save power consumption while waiting, intermittent reception is necessary in wide-band receiver.

However, if the period of intermittent reception is long, it is very effective for saving power consumption, but since the spot cell is narrow, the terminal may move out of the area before reception of high speed radio communication data is not completed, or data may not be received at all. Such problems can be avoided by shortening the period of intermittent reception, but the battery saving effect is not obtained sufficiently. Embodiments to solve these contradictory problems are described below.

The mobile communication terminal receives intermittently in order to save the battery, and the conventional intermittent reception is achieved by turning on and off the receiver power source at specific intervals.

Recently, in the trend of high transmission speed of LAN (Local Area Network), the radio LAN is also demanded to be higher in speed. Outdoors, too, high speed radio data communication in spot area is being studied. For example, transmission of terminal end of FTTC (fiber-to-the club) is expected to realize data communication by high speed radio communication in spot area, or high speed radio transmission of traffic data on road or expressway is considered to realized in spot area.

FIG. 34 shows an example of realization of such systems. A portable terminal 1105 communicates at high speed through existing spot cells (spot radio areas) 1042.

In such a mobile communication system, the receiver used in a wide area 1041, and the receiver used in a spot area 1042 are different because the transmission speeds of received data are different. In such a system, too, intermittent reception is required to save the battery.

In particular, the receiver used in the spot area must receive high speed data, and its power consumption is very large as compared with the receiver used in the wide cell. Hence, intermittent reception is effective for saving the battery.

In the conventional intermittent reception mentioned above, that is, by turning on and off the power source of the receiver at specific intervals, when the receiver used in the spot area is operated, the battery saving effect is not expected unless the period is long. On the other hand, in the spot area, since the region is small, if the period of intermittent reception is long, it passes through the spot area before the receiver power is turned on, and high speed data may not be received at all. If the receiver power is turned on the spot area, the terminal may move out of the spot area before the high speed data is received completely. To avoid such troubles, if the period of the intermittent reception is shortened, the battery saving effect is not obtained sufficiently.

Accordingly, the high speed data receiver consuming much power is turned on only when getting into the large cell including small cells, so that a very efficient battery saving is realized, and the above problems are solved by extending the waiting time of the portable terminal, of which detail is described below.

(Twentieth embodiment)

FIG. 34 is a system configuration diagram of this embodiment. A base station 1101 forms a wide cell 1041 by an antenna 1102. The wide cell 1041 transmits and receives with a portable terminal 1105 at transmission speed of hundreds of Kbps to several Mbps. Antennas 1103 form spot cells 1042 with a radius of one meter to more than ten meters within the wide cell 1041.

In the spot cells 1042, data is transmitted to the terminal 1104 at transmission speed of several tens of Mbps to more than hundred of Mbps.

In this way, the user obtains the desired data by using the portable terminal 1105 in the following manner.

When the portable terminal 1105 gets into the wide cell 1041, the data requested by the user is requested to the base station 1101 by using an up-link channel of the wide cell 1041. The data requested to the base station 1101 is transmitted to the terminal 1104 by using the spot cell 1042. At this time, the portable terminal 1105 reports the entry in the spot cell 1042 to the base station 1101. The base station 1101 transmits the data to the portable terminal 1105 through the reported spot cell 1042.

More specifically, the method of receiving the requested data through the spot cell 1042 by the portable terminal 1105 is described below. A terminal configuration diagram is shown in FIG. 35. A signal from the wide cell 1041 is received by an antenna 301. The received signal is limited in band, amplified, and down-converted in an RF circuit 302, and the field intensity is measured in a field intensity meter 303. The down-converted signal is demodulated in a mod/demod 304, and the control data is transferred to the control unit 304 and the user data to the user interface.

The result measured by the field intensity meter 303 is transferred to a determining circuit 306. The determining circuit 306 is to judge whether the portable terminal has entered the area of the wide cell 1041 by the intensity of the reception field, and determines by the intensity of the reception field of its own to see if the portable terminal is in the area of the wide cell 1041.

That is, measuring the intensity of the reception field, when the measured field intensity is within the area, it is judged that it has reached the intensity level. When the measured field intensity satisfies this condition, the determining circuit 306 commands to feed power to a demodulator 308 for high speed data reception and an RF circuit 307 for receiving in the spot cell 1042. The demodulator 308 and RF circuit 307 are designed to be put in active state by turning on the power by this command, and hence the power source is turned on by this command to be in active state. When the portable terminal ready for high speed data reception gets into the spot cell 1042, a signal is transmitted from the spot cell 1042 to the high speed data receiver, and it is recognized that the terminal has entered the spot cell.

Consequently, the portable terminal transmits the message of entry in the spot cell 1042 from the control unit 305 to the mod/demod 304, and the message is modulated in the mod/demod 304, and the modulated data is up-converted, amplified and limited in band in the RF circuit 302, and is transmitted to the base station 1101 by using an up-link channel of the wide cell 1041 from the antenna 301.

Thus, the base station 1101 distinguishes the spot cell 1042 to transmit the data to, and transmits the data. When the portable terminal leaves the wide cell, the value measured by the field intensity meter 303 becomes smaller. In the determining circuit 306 in which the measured value is fed, when it is judged that the value satisfies the turn-off condition of the power source of the high speed data receiver, it issues a control output for turning off the power source of the demodulator 308 to the RF circuit 307 for high speed data, and the power source of the RF circuit 307 for high speed data is turned off by the demodulator 308.

(Twenty-first embodiment)

A case of broadcasting the data showing whether a spot cell is present or not in the wide cell is explained below as a twenty-first embodiment.

A portable terminal 1105, when getting into the wide cell 1041, receives the broadcast data, and determines if there is a spot cell 1041 in the wide cell 1041 it is presently staying in.

The structure of the terminal 1104 in this embodiment is shown in FIG. 36. When the broadcast signal in the wide cell 1041 is received, this reception signal is down-converted in an RF circuit 402, and is demodulated in a mod/demod 403. When the demodulated signal is a control message, the message is interpreted in a control unit 404. The control unit 404 has a message interpreting function, and as a result of message interpretation, when a message telling that the spot cell is contained is detected, the control unit 404 functions to turn on the power source of the RF circuit 405 and demodulator 406. The subsequent operation is same as the method mentioned in the twentieth embodiment.

(Twenty-second embodiment)

A twenty-second embodiment is described. In this embodiment, same as the system mentioned in the twenty-first embodiment, when a system having a spot cell and a system not having coexist in the wide cell, the battery saving is more efficient than in the twenty-first embodiment.

When the portable terminal 1105 gets into the wide cell 1041, it first receives the broadcast message.

In a first case, when the spot cell 1042 is present in the wide cell 1041, the operation of the portable terminal 1105 is described below.

The portable terminal 1105, if wishing data, requests by random access through the up-link channel of the wide cell 1041. Then the power source of the receiver for the small cell (spot cell 1042) is turned on.

If there is no requesting message, the portable terminal transmits its own address, and registers the location.

In this case, the power source of the receiver in the small cell is kept in off state.

In a second case, where there is no spot cell 1042 in the wide cell 1041, the operation of the portable terminal is described.

The portable terminal 1105, if wishing data, requests to the base station 1101 by random access through the up-link channel of the wide cell 1041. Afterwards, the power source of the receiver for the small cell is kept in the off state, and location registration is not performed. However, incoming call is waited. The portable terminal 1105 transmitting data request in the wide cell 1041 not containing spot the cell 1042 receives the previously requested data in the spot cell 1042 by using the receiver for the small cell when the spot cell 1042 gets into the existing wide cell 1041.

The portable terminal 1105 gets into the wide cell 1041, and knows the existence of the spot cell 1042 by the broadcast message. However, since the data request has been issued already, only the location is registered at this time. The base station 1101 determines if there is any waiting data to be transmitted to the portable terminal 1105 registered of location, and if there is any, it is noticed to the portable terminal 1105 in the wide cell 1041. Receiving this, the portable terminal 1104 turns on the power source of the spot cell receiver (receiver for small cell).

As explained herein, according to the twentieth to twenty-second embodiments, the high speed receiver which consumes much power is turned on only when getting into the wide cell including small cells, so that the battery can be saved very efficiently. Hence, the waiting time of the portable terminal can be extended.

Therefore, in the cell configuration in which one or plural small cells exist to provide communication service to a mobile terminal and a large cell exists to provide communication service to a mobile terminal, the transmission speed of the data to be transmitted by the small cell is faster than the transmission speed of the data to be transmitted by the large cell, and the large cell covers the small cells, when the mobile terminal receives a signal from the large cell, the power source of the receiver for receiving the message from the large cell is turned on to save the battery, and therefore the high speed data receiver which consumes much power is turned on only when getting into the large cell including the small cells, so that a very efficient battery saving is realized. Hence, the waiting time of the portable terminal can be extended.

According to the fifth to twenty-second embodiments, the following effects are obtained.

The user accessing the database does not always wish to obtain the information in real time. For example, if wishing to know the contents of the day's morning paper before reaching company, the information is not needed on one's way from home to station, but is needed while waiting for a train at the station or in the train.

The user enters the demanding information in the terminal at an arbitrary time when thinking to want information. In the terminal, data showing which information can be acquired is stored preliminarily, and it is checked if the demanded information is accessible or not, and if accessible, it is noticed to the user. When the registration is over, the user terminates the terminal operation.

The terminal observes if located in a radio communication enable area or not. In a method of observation, for example, a specific frequency carrier is outputted from a base station side, and this carrier frequency is observed to perform carrier sensing to see if this carrier is above the specific field intensity or not.

When detecting entry into radio communication enable area, the terminal originates a call automatically and establishes a radio communication channel. The terminal notices to the communication network that the information acquisition is requested, and transmits the requested items. The communication network transmits the requested items to the information presenter, and the required information from the information provider is transmitted to the terminal by radio. The terminal informs the user of completion of information acquisition by a lamp or buzzer.

In this way, when detecting entry into radio communication enable area, the terminal originates a call automatically and establishes a radio communication channel, and notices the information network that the information acquisition is requested, and transmits the requested items to the communication network side, whereas the communication network transmits the requested items to the information provider, and the information provided from the information provider according to this request is transmitted to the terminal by radio, so that the user of this radio communication system can receive necessary information without being conscious of presence of radio service area.

According to the above battery saving system, the terminal apparatus comprises a receiving circuit of low power consumption which operates steadily, a power on/off unit of a receiving circuit operated in a wide band, a power on/off unit of a transmitting circuit operated in a medium band, and a power source control unit for on/off control of the power source of the wide-band receiving circuit or medium-band receiving circuit on the basis of the information received in the low power consumption receiving circuit, wherein the power source of the wide-band receiving circuit is turned on if the information from the narrow-band receiving circuit requires reception in a wide band, and is turned off otherwise.

Generally, the power consumption in each radio device for composing the terminal apparatus increases as the bandwidth becomes broader. When the power per band is equal, a larger power is consumed in a broader bandwidth. The quantity of loss of each device or line increases as the frequency is higher, and when the frequency is increased to compensate for it, a larger power is consumed.

Signals of narrow band can be transmitted at low frequency, but for transmission of wide-band signals, a high frequency is used. The transmission speed of narrow-band signal is 1 to 2 Kbps, that of medium-band signals is 32 Kbps, and that of wide-band signals is 155 Mbps. Narrow-band signals can be transmitted in a band of hundreds of MHz, but when wide-band signals are transmitted in this band, other communications are disabled, and it is forced to communicate in a millimeter waveband of 20 to 60 GHz. In consideration of this relation between bandwidth and frequency, reception of narrow-band signals can be done in a very low power, while reception of wide-band signals requires a larger power.

In the battery saving method of the terminal apparatus according to the above embodiments, the receiving circuit of narrow-band signals is operated usually for call origination, and the power source of the transmitting and receiving circuit of wide band and medium band is turned off, and when a call origination signal of a terminal is detected in the receiving circuit of narrow band, the power source control unit turns on the power source of the receiving circuit of wide-band waves and transmitting and receiving circuit of medium-band waves, thereby performing receiving operation in wide band and transmitting and receiving operation in medium band. When communication in wide band or medium band is over, the power source of the receiving circuit of wide band or transmitting and receiving circuit of medium band is turned off. In the present invention, by receiving in a waiting state only by narrow-band signals, only the receiving circuit of narrow band is operated in waiting mode, and power consumption is suppressed, and battery saving is realized.

According to the above embodiments, the means for detecting whether communication service in wide band can be utilized or not is always active, and the receiving power source of wide band is turned off, and when the detecting means detects that the reception of wide band is enabled, the power source control unit turns on at least the power source of the receiving circuit of wide band, and wide-band waves are received. When reception of wide-band waves is over, the power source control unit turns off at least the power source of the receiving circuit of wide-band waves. The power source of receiving circuit of wide-band waves is kept in off state unless wide-band wave service is active, and the detecting means of wide-band waves uses means of small power consumption, so that the battery can be saved without sacrificing the service quality.

The receiving circuit of medium-band waves is always active, and the receiving power source of wide-band waves is stopped, and a code instructing start of reception of wide-band waves is inserted in the information received in the medium-band waves, and when the code instructing start of reception of wide-band waves is detected in the information received in medium-band waves, the power source control unit starts up the power source of the receiving circuit of wide-band waves, thereby receiving wide-band waves. When wide-band reception is over, the power source control unit stops the power source of the receiving circuit of wide-band waves. In the present invention, when wide-band information is transmitted intermittently, while wide-band information is not transmitted, the power source of the wide-band receiving circuit is stopped, so that the battery can be saved without sacrificing the service quality.

The high speed data receiver consuming greater power is turned on only when getting into the large cell including small cells, and very efficient battery saving is realized. Hence, the waiting time of the portable terminal can be extended.

(Twenty-third embodiment)

FIG. 37 shows the constitution of data communication system using the radio communication system of the embodiment. This system is composed of portable electronic devices 610 having radio units, base stations 612 for receiving radio signals from the portable electronic devices 612 and transmitting data to the portable electronic devices 610 by radio channels, and environments comprising radio transmission system for realizing radio communication between the base stations 612 and the portable electronic devices 610.

In the radio transmission system for radio communication between the base station 612 and portable electronic device 610, the signal transmission speed are asymmetrical, that is, the down-link transmission speed for transmitting signal from the base station 612 to the portable electronic device 610 is faster than the up-link transmission speed for transmitting signal from the portable electronic device 610 to the base station 612. Herein, the high speed down-link channel is a narrow area, and the low speed up-link channel is a wide area. It may further possess a wide down-link channel having a same signal transmission speed as the low-speed up-link channel. That is, as compared with the area of high speed down-link channel for transmitting from the base station 612 to the portable electronic device 610, the area of low speed up-link channel for transmitting from the portable electronic device 612 to the base station 610 is wider.

For example, the base station 612 presents service (multimedia service) of communication including picture, voice, file editing, data distribution, publicity, broadcast and others to the portable electronic device 610, by using high speed down-link channel in down-link transmission. The portable electronic device 610 transmits the data for controlling down-link, channel selection, media selecting control signal in the case of multimedia, voice data and others to the base station 612, by using low speed up-link channel in up-link transmission.

If plural portable electronic devices 610 are present in the area covered by the base station (communicable with the portable electronic devices 610), up-link and down-link channels for each portable electronic device 610 are established as far as possible.

The base station 612 is connected to a network 614 (for example, public network), and depending on the request from the portable electronic device 610, the above-mentioned service is acquired through the network 614, and is provided to the portable electronic device 610. In the network 614, as shown in FIG. 37, aside from plural base stations 612, a database system 616, various control systems 618, and terminals (not shown) are connected, and mutually data can be received and transmitted. The portable electronic device 610 can utilize various data services through the network 614 by using radio transmission service with the base stations 612.

In this system, in the environments comprising the radio transmission system, the portable electronic device 610 indicates the area that can communicate with the base station 612 through down-link transmission, and therefore the user of the portable electronic device 610 is urged to move to the area capable of securely receiving data service.

The radio communication system of the embodiment is explained by reference to FIG. 38. The radio communication system of the embodiment is composed of the base stations 612 for transmitting data, portable electronic devices 610 used by plural users, and means for indicating the area 621 capable of receiving radio signals from the base stations 612 (receivable area) by color.

The data service area 621 covered by the antenna 620 of the base station 612 is the area in which the field intensity of the waves transmitted from the antenna 620 received by the portable electronic device 610 is above a specific value, and the ground of the area or the floor if inside of a building is indicated by a specific color representing the area.

Herein, supposing the lowest field intensity of the radio device (receiver) of the portable electronic device 610 to be "a" and the field intensity at arbitrary point "u" to be r(u), the floor of the area in which a<r(u) is distinguished by a specific color indicating the receivable area 621. In FIG. 38, the field intensity of the area 621 divided by color is the area higher than the lowest field intensity of the receiver (that is, a<r(u)).

However, depending on the installation of the building or the like, the receivable area 621 may not be set so as to completely express the service area. In such a case, as shown in FIG. 39A and FIG. 39B, the receivable area 621 indicated by color and actual data service area 622 may not coincide.

Figure 39A:
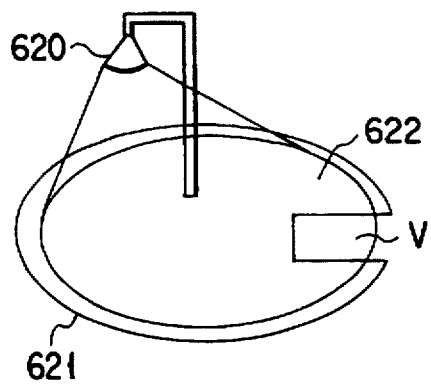
FIGS. 39A and 39B show exceptions of the twenty-third embodiment.
Figure 39B:
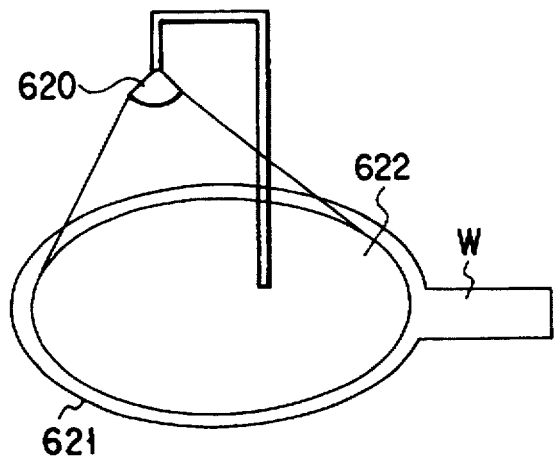

That is, in the case shown in FIG. 39A, there is a spot area "v" which is not indicated by color although the field intensity is in the relation of a<r(v). In FIG. 39B, there is a spot area "w" which is indicated by color although the field intensity is in the relation of a>r(w). If the receivable area 621 indicated by color and the area in which the field intensity is above the specific level may not always coincide, as far as the majority of the area is indicated, the area capable of receiving data at high quality can be indicated to the user of the portable electronic device 610, and hence the user of the portable electronic device 610 is urged to move, so that improvement of reception environments is expected.

In FIG. 38, meanwhile, only the narrow area is shown and the wide area is not given.

According to the twenty-third embodiment, in the environment comprising the radio transmission system, the area in which the portable electronic device 610 can communicate with the base station 612 by down-link transmission is indicated, so that the user of the portable electronic device 610 may urged to move to the area for securely receiving the data service.

(Twenty-fourth embodiment)

Figure 40:
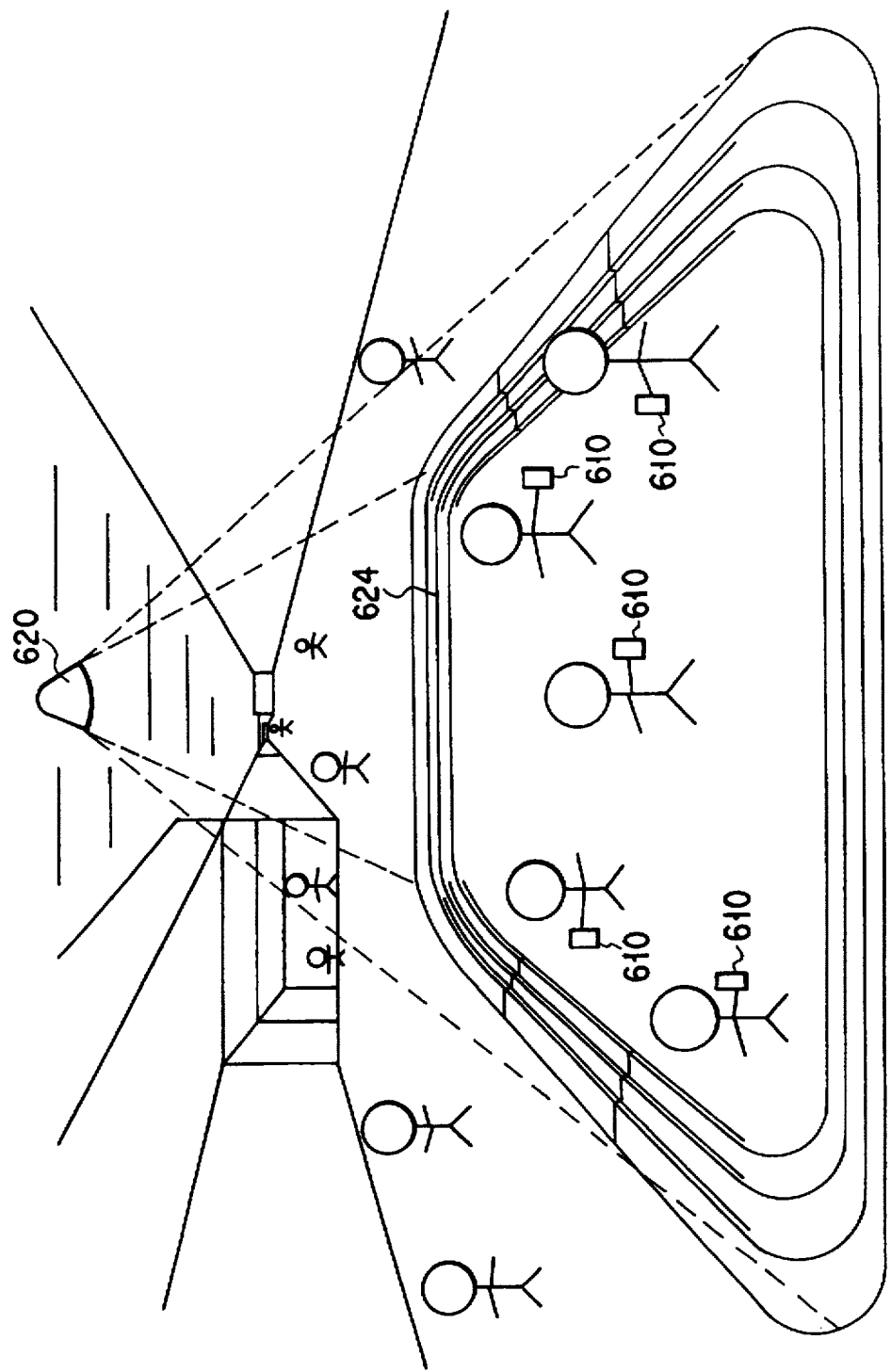
FIG. 40 is a conceptual diagram showing an entire system of a twenty-fourth embodiment according to the present invention.

A radio communication system according to a twenty-fourth embodiment is described below while referring to FIG. 40. The radio communication system of the twenty-fourth embodiment is composed of base stations 612 (antenna 620) for transmitting data, portable electronic devices 610 used by plural users, and means for indicating the area 624 in which the portable electronic device 610 can receive radio signals transmitted from the base station 612 by a specific shape of the floor.

The receivable area 624 shown in FIG. 24 is indicated by the step in the floor, and as explained in the twenty-third embodiment, this is the area in which the field intensity is over a certain threshold when the portable electronic device 610 receives the wave transmitted from the antenna 620 of the base station 612. As mentioned above, depending on the setting of steps, it does not matter much if a certain area may be less than the threshold.

Aside from the step shown in FIG. 24, the receivable area 624 may be also expressed by other specific shape so that the floor may be distinguished from the other area (floor material, fine undulations, etc.).

This embodiment brings about the same effects as the twenty-third embodiment.

(Twenty-fifth embodiment)

Figure 41:
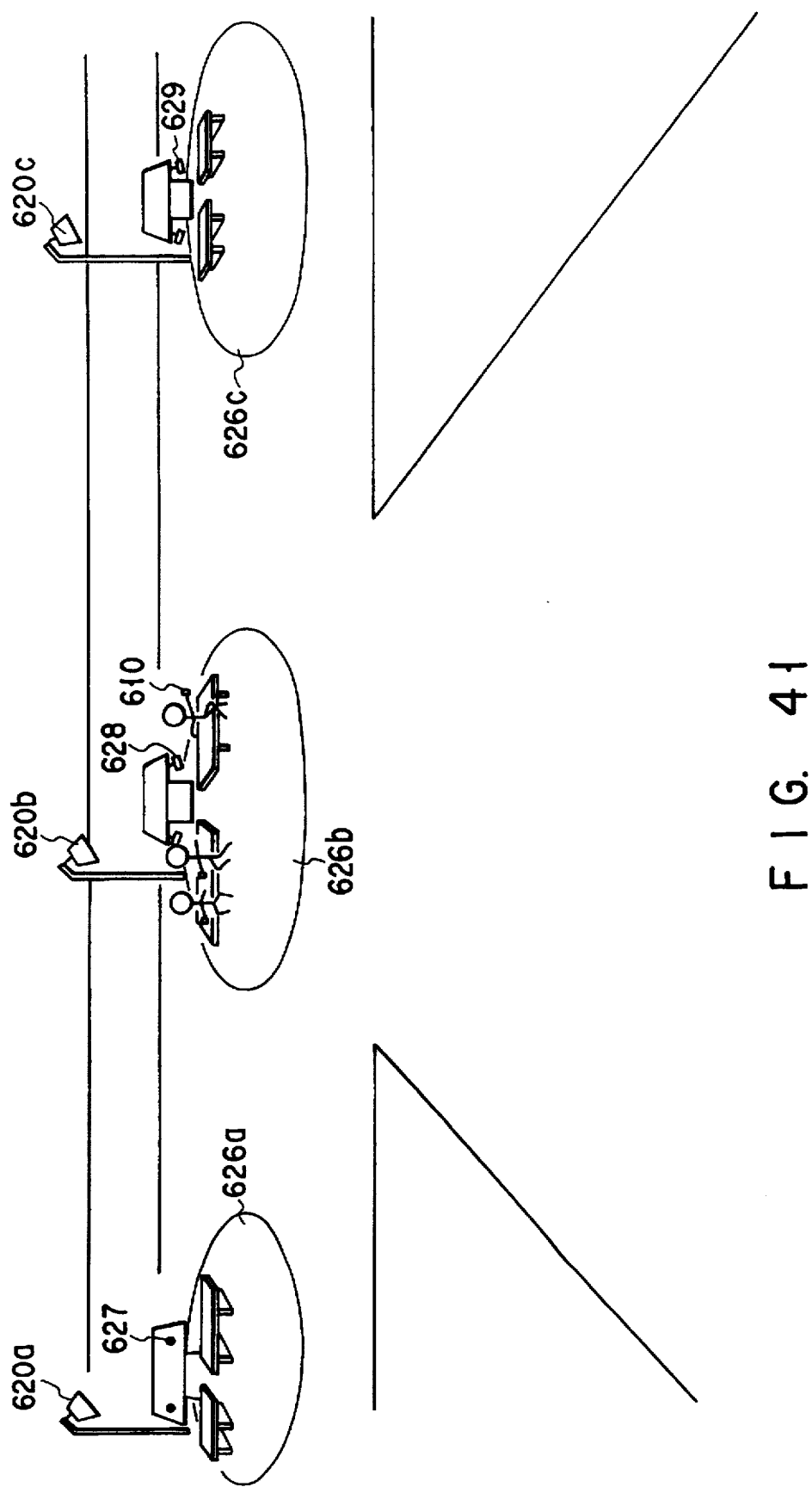
FIG. 41 is a conceptual diagram showing an entire system of a twenty-fifth embodiment according to the present invention.

A radio communication system according to a twenty-fifth embodiment of the present invention is described in FIG. 41. The radio communication system of the twenty-fifth embodiment is composed of base stations 612 (antennas 620a, 620b, and 620c) for transmitting data, portable electronic devices 610 used by plural users, and means for indicating areas 626a, 626b, and 626c capable of receiving radio signals transmitted from the base stations 612 by the portable electronic devices, by light or sound.

In FIG. 41, the receivable area 626a corresponding to the antenna 620a of the base station 612 indicated, for example, by the sound generated by a sound generator 627 installed within the receivable area 626a. The receivable area 626b corresponding to the antenna 620b of the base station 612 is indicated by the light (red) emitted by a light emitting device 628, and the receivable area 626c corresponding to the antenna 620c is indicated by the light (blue) emitted by a light emitting device 629.

In a mixed system of wide up-link and narrow down-link (or further comprising a wide up-link), when the portable electronic device 610 is positioned in an up-link enable area, it may be also instructed to indicate the down-link enable data service area (receivable area) from the user side. In this case, the sound generator 627 and light emitting devices 628, 629 shown in FIG. 41 are controlled in the generation sound tone or emission light luminance by the corresponding base stations (not shown), and the area color and luminance or sound tone indicated by light or sound can be changed depending on the request from the portable electronic device 610.

The portable electronic device 610, when operated by the user as specified, transmits "service area data request signal" for instructing the indication of the receivable area through the up-link channel, together with the recognition data (ID) for identifying the own portable electronic device. The base station 612, when receiving the "service area data request signal" from the portable electronic device 610, changes the color, luminance, tone or the like of the area indicated by light or sound, by the means for indicating the area (sound generator 627, light emitting devices 628, 629) under the control of the own base station depending on the request signal. That is, the user requests to indicate the data service area by using the portable electronic device 610, and corresponding to this request signal, the base station 612 responds by varying the indication (light, color, luminance, tone) of the data service area.

At this time, if users of plural portable electronic devices 610 are staying in the same data service area, it cannot be distinguished the reaction by the area indicating means (light, color, luminance, tone, etc.) corresponded to the indication of the user of which portable electronic device 610.

Accordingly, the base station 612, while changing the indication of the data service area according to the "service area data request signal," returns ACK or NACK as response signal to the demanding portable electronic device 610 on the basis of the recognition data (ID).

The portable electronic device 610 receiving the response signal from the base station 612 notices to the user of the portable electronic device 610 that it is responded from the base station 612, by the reception notice function provided in the portable electronic device 610, such as sound generator, light emitting device and vibrating element.

As a result, indication by the receivable area indicating means (sound generator 627, light emitting devices 628, 629), and indication by the portable electronic device 610 are simultaneously enabled, so that the user can distinguish the indication of the receivable area changed by transmission of "service area data request signal" from the own portable electronic device 610.

Also according to the embodiment, the corresponding receivable area can be selectively indicated so that the user of the portable electronic device 610 may know which receivable area is providing the desired data service.

The user of the portable electronic device 610 enters the request of the desired data type and service area data (indication of receivable area) in the portable electronic device 610. The portable electronic device 610, using a wide up-link channel, transmits the signal including the data showing the type of data requested by the user of the portable electronic device 610, to the base station 612, together with the recognition data (ID) and "service area data request signal."

The base station 612 receiving the signal from the portable electronic device 610 responds, when the data indicating the type of data in the signal can be provided from the own base station 612, by varying the indication of the data service area as mentioned above, depending on the "service area data request signal" (for example, the receivable area indicated by light). At the same time, the base station 612 transmits the data showing the data requested by the user of the portable electronic device 612 is provided from which data service area (for example, color data such as red), to the portable electronic device 610 through a narrow down-link channel. As a result, the use of the portable electronic device 610 easily knows, for example, that the required data can be obtained in the receivable area 626b indicated by light (red) in FIG. 41.

The receivable area indicating means (light, color, luminance, tone) is not always indicating, but indicates only when the terminal of the portable electronic device is present in the narrow down-link area. Hence, the power consumption by the area indicating means is reduced.

(Twenty-sixth embodiment)

Figure 42:
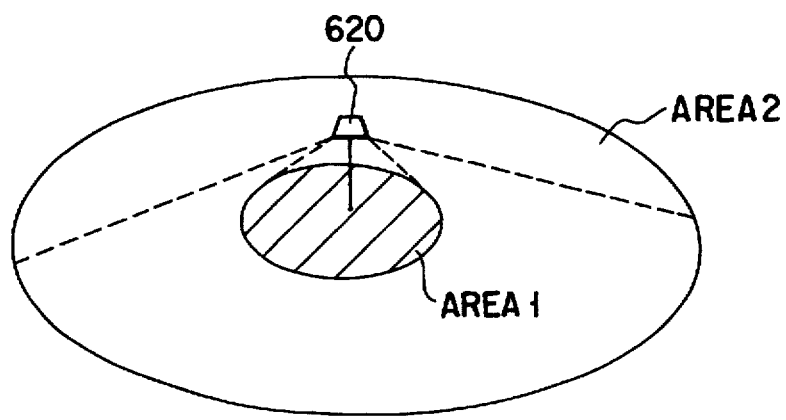
FIG. 42 is a conceptual diagram showing an entire system of a twenty-sixth embodiment according to the present invention.

A radio communication system of a twenty-sixth embodiment of the present invention is described below by reference to FIG. 42. FIG. 42 consists of a base station 612 (antenna 620) for transmitting data, and portable electronic devices 610 used by plural users.

In the twenty-sixth embodiment, the receivable area can be indicated by dividing it into plural sections. Herein, supposing the least reception field intensity (minimum value of field intensity) necessary for demodulating the signal transmitted from the antenna 620 of the base station 612 by the receiver of the portable electronic device 610 to be "a", and the field intensity at an arbitrary point "u1" to be r(u1), the area of u1 (area 1) of r(u1)>"a" is indicated by color, step, light or sound. Moreover, the area of u2 (area 2) of r(u2)>a−α or a>r(u2)>a−α is indicated by color, step, light or sound, different from the indication of area of u1.

That is, area 1 shows the area capable of securely receiving the signal transmitted from the base station 612, and area 2 shows the area in which some of the users may not receive (due to effects of difference in environments, etc.). In the system composed of down-link of high signal transmission speed and up-link of low speed, it is supposed that the latter area is wider than the former area. That is, in area 2, if communication by down-link is disabled, it shows at least communication by up-link is possible.

As in the twenty-sixth embodiment, for the user of the portable electronic device 610, by indicating the data service area, the portable electronic device 610 may be positioned in a better environment for reception condition. That is, the reception field intensity can be improved without requiring any troublesome operation by the user. By indicating separately the area in which all users can receive communication by high speed down-link (area 1) and the area in which some of the users cannot receive (area 2), the data can be provided securely, and the service may be enhanced.

Further, in the narrow down-link channel, by employing the communication system by variable transmission speed for keeping transmission quality by varying the signal transmission speed adaptively depending on the situation of transmission path, data transmission is possible in the narrow down-link channel even in area 2 where some of the users cannot receive. In the communication system by variable transmission speed, the transmission quality is assured by sacrificing the data transmission speed. That is, supposing the bandwidth occupied by the modulation signal to be specific, by lowering the data transmission quantity that can be transmitted in a specific band, a favorable reception characteristic can be obtained in an area low in C/N. Accordingly, data can be transmitted even in an area 2 remote from the antenna 620 of the base station 612.

Also according to the embodiment, by the transmission quality compensation technology such as variable transmission speed, even if the reception quality changes in gradual steps (graceful degradation), the area can be indicated adaptively. That is, by combining the means for indicating the area such as color, sound and step, and indicating the receivable area in plural divided sections, the user of the portable electronic device 610 can easily recognize the graceful degradation.

(Twenty-seventh embodiment)

Figure 43:
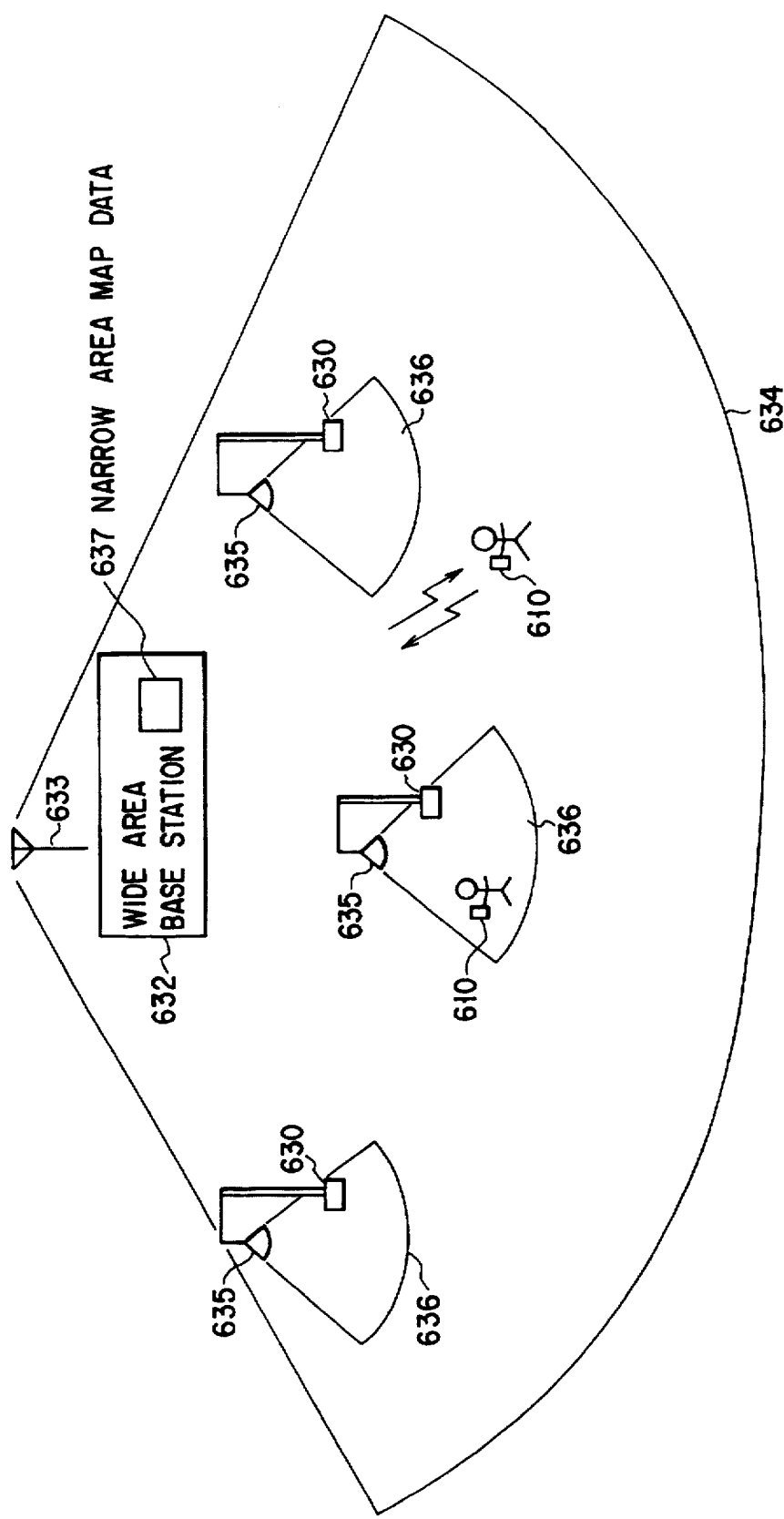
FIG. 43 is a conceptual diagram showing an entire system of a twenty-seventh embodiment according to the present invention.

A radio communication system of a twenty-seventh embodiment of the present invention is described below while referring to FIG. 43. The radio communication system of the twenty-seventh embodiment is composed of base stations 630 (at least comprising down-link channels) of a narrow area for transmitting data mainly (data service area is narrow), base stations 632 of wide area for transmitting mainly control signal and data (comprising up-link channels and down-link channels), and portable electronic devices 610 used by plural users.

A wide area base station 632 covers a wide area 634 by a wide area antenna 633. Plural narrow area base stations 630 are installed in this wide area 634. Each narrow area base station 630 covers a narrow area 636 by a narrow area antenna 635.

The wide area base station 632 comprises a narrow area map data 637 including the data indicating each narrow area base station 630. The narrow area map data 637 includes the data indicating the position of narrow area existing in the wide area 634 covered by the wide area base station 632. The user of the portable electronic device 610 operates the portable electronic device 610 as specified in order to see the data is serviced in which area, when receiving presentation of service from the narrow area base station 630, and instructs transmission of base station map data request.

The portable electronic device 610, when operated as specified, transmits "narrow area map data request signal" to the wide area base station 632, together with the recognition data (ID) for specifying the own portable electronic device, by using the wide area up-link channel. The wide area base station 632, responding to the "narrow area map data request signal," transmits the narrow area map data 637 to the demanding portable electronic device 610 on the basis of the recognition data (ID), by using the wide area down-link channel. The portable electronic device 610 receives the narrow area map data 637 addressed to its own, and the map data indicating the position of narrow area is shown in the display unit (screen) depending on the narrow area map data 637.

In this procedure, the map data showing the area of data service from narrow area base station 630 can be downloaded from the wide area base station 632. Since the map data is shown in the display unit of the portable electronic device 610, the user can easily know the location of presentation of data service.

Moreover, when the portable electronic device 610 transmits "narrow area map data request signal" to the wide area base station 632, by transmitting by adding data classification required by the user, the wide area base station 632 can transmit the finely classified map data depending on the data classification, to the portable electronic device 610 that has transmitted the data request.

Or, by detecting the position of the portable electronic device 610 that has transmitted "narrow area map data request signal" at the base station side, it may be designed to transmit to the portable electronic device 610 by adding to the map data. The portable electronic device 610, according to the position data, shows the own position in the map data indicating the position of the narrow area. When the position is detected at the portable electronic device 610 side, it may be displayed together with the map data.

(Twenty-eighth embodiment)

A radio communication system by a twenty-eighth embodiment of the present invention is described by reference to FIG. 44. The radio communication system of the twenty-eighth embodiment is composed of portable electronic devices 610 used by plural users, and infrared beacons 640 for transmitting data (including base station map data) and control signal to the portable electronic devices 610 and simultaneously receiving signals from the portable electronic devices 610.

The portable electronic device 610 comprises a radio communication device capable of connecting with at least one down-link channel and at least one up-link channel, and a bi-directional infrared communication interface for communicating with the infrared beacons 640.

Figure 44:
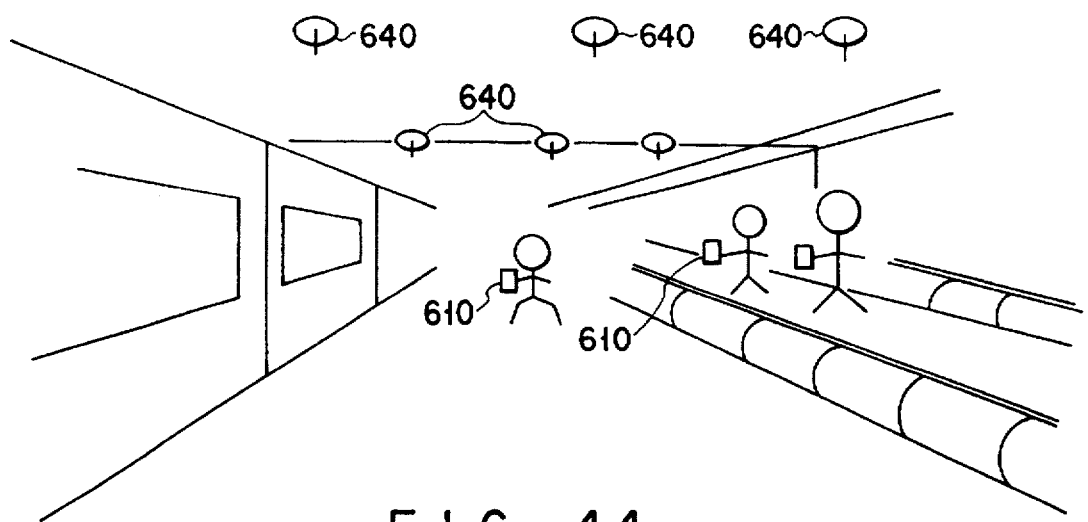
FIG. 44 is a conceptual diagram showing an entire system of a twenty-eighth embodiment according to the present invention.

FIG. 44 shows the installation of plural infrared beams 640 in the ceiling at specific intervals in a passage having a moving walk. The user of the portable electronic device 610 operates the portable electronic device 610 as specified in order to know the area of data presentation service, and instructs transmission of base station map data request.

After the base station map data is requested, the user holding the portable electronic device 610 walks or moves on the moving walk, and when the signal from the infrared beacon 640 is received in the portable electronic device 610, responding to the reception, "base station map data request signal" is transmitted to the infrared beacon 640. The infrared beacon 640, when receiving the "base station map data request signal" from the portable electronic device 610, transmits the base station map data.

Since the area of bi-directional communication by infrared beacon 640 is narrow, communication failure possibly occurs. If communication fails with the infrared beacon 640, if multiple infrared beacons 640 are installed, as the user walks or moves on the moving walk, the portable electronic device 610 can communicate with any infrared beacon 640 again, and any base station map data can be obtained.

Alternatively, instead of sending the base station map data from the infrared beacon 640 corresponding to the "base station map data request signal" from the portable electronic device 610, the data may be transmitted one-way from the infrared beacon 640 (transmission device by infrared ray). That is, by installing multiple infrared beacons 640, it is designed to function to transmit always specific data (base station map data). In this case, instead of performing bi-directional communication between the portable electronic device 610 and infrared beacons 640, the portable electronic device 610 is set always ready to receive signals from the infrared beacons 640, so that the base station map data is noticed from any one of the infrared beacons 640 only by moving around.

The portable electronic device 610 receiving the data from the infrared beacon 640 notices to the user by executing specific function expressing the reception of the base station map data, by using light emitting device, sound generator, vibrating element or the like provided in the portable electronic device 610.

(Twenty-ninth embodiment)

Figure 45:
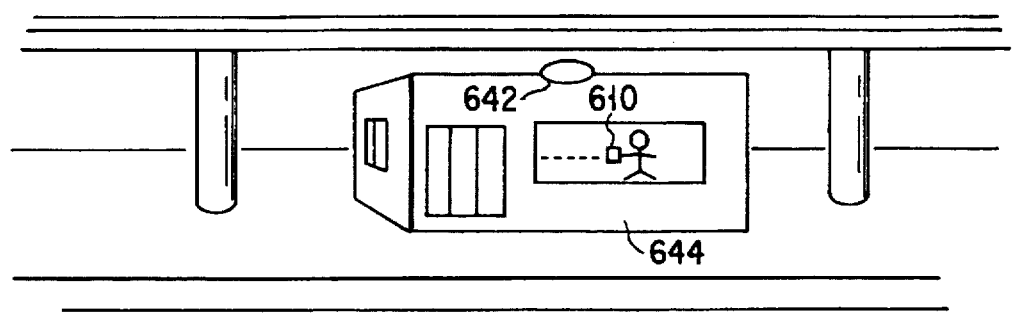
FIG. 45 is a conceptual diagram showing an entire system of a twenty-ninth embodiment according to the present invention.

A radio communication system according to a twenty-ninth embodiment of the present invention is described while referring to FIG. 45. The radio communication system of the twenty-ninth embodiment is composed of portable electronic devices 610 used by plural users, and a base station apparatus 642 for transmitting data and control signal to the portable electronic devices 610 and simultaneously receiving signals from the portable electronic devices 610.

In the data service for providing various data from the base station side to the portable electronic devices 610, it is necessary to transmit a huge volume of data instantly, and hence a wide frequency bandwidth is needed. To enhance the frequency utility efficiency, it is necessary to multiplex the modulation signal and increase the data transmission quantity per unit frequency. To simplify the structure of the portable electronic device 610, however, easier demodulation is preferred. Accordingly, instead of narrowing the occupation band, the frequency repeating distance is shortened, and the same frequency band is reused. The frequency band used in high speed transmission is quasi-microwave band or millimeter wave band.

To shorten the frequency repeating distance, it requires to suppress the interference between adjacent channels occurring when the wave of one station leaks out to other station.

FIG. 45 shows an example of radio communication system installed on a railway station platform. As shown in FIG. 45, the area of data service from the base station apparatus 642 is indicated by the building structure. In such a radio communication system, owing to the reason mentioned above, it is necessary to prevent radio wave leak to other station, and it is shut off for this purpose. According to the constitution of the twenty-ninth embodiment, the area indicating means and the shut-off object can be shared, and an inexpensive system can be realized.

(Thirtieth embodiment)

Figure 46:
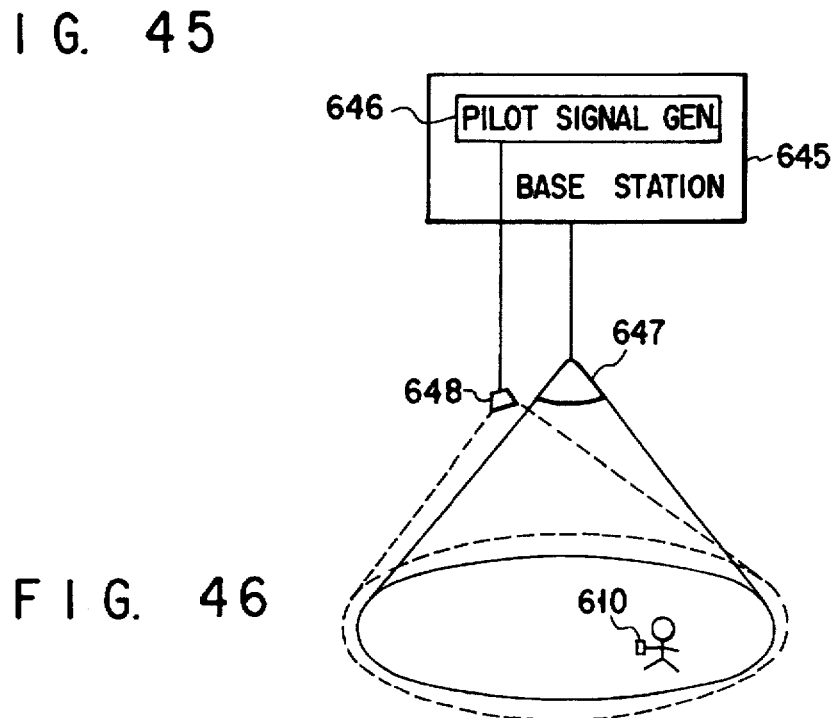
FIG. 46 is a conceptual diagram showing an entire system of a thirtieth embodiment according to the present invention.

A radio communication system of a thirtieth embodiment of the present invention is described in FIG. 46. The radio communication system of the thirtieth embodiment is composed of portable electronic devices 610 used by plural users, a base station 645 for transmitting data and control signal to the portable electronic devices 610 and receiving signals from the portable electronic devices 610, and a pilot signal generator 646 for indicating the area capable of receiving the service provided from the base station 645 by the portable electronic device 610. The pilot signal generator 646 is provided inside of the base station 645.

As shown in FIG. 46, the data service area covered by the base station 645 by using the narrow area antenna 647 is same as the area covered by the pilot signal generator 646 by using an area indicating antenna 648. The area indicating antenna 648 is installed near the narrow area antenna 647. The pilot signal transmitted from the area indicating antenna 648 is a narrow band frequency signal, and being located within the data service area is noticed to the portable electronic device 610 existing in the area covered by the narrow area antenna 647. The user of the portable electronic device 610 turns on the power source of the portable electronic device 610 in order to receive data service from the base station 645. At the same time, to know whether it is located within the data service area or not, the portable electronic device 610 begins to monitor about reception of the pilot signal. Since the pilot signal is a signal of narrow band frequency, only this band should be monitored.

The reception intensity of the pilot signal by the portable electronic device 610 becomes stronger as approaching geographically the base station 645 (narrow area antenna 647). The portable electronic device 610, when detecting that the intensity of the pilot signal has reached the specific value showing it is located within the data service area, notices the user that it has entered the data service area, by functioning the vibrating element, sound generator, or light emitting device provided in the portable electronic device 610. Moreover, the portable electronic device 610, depending on the intensity of the pilot signal, can indicate the area of data service by gradually changing the vibrating element, sound generator or light emitting device.

According to the thirtieth embodiment of the present invention, by indicating the area depending on the reception of the pilot signal transmitted out from the area indicating antenna 648, interruption of reception of data service or the nearest position of the base station 645 offering data service can be reported to the use of the portable electronic device 610. Therefore, it is expected that the user may be urged to move to a better environment for reception. Furthermore, by adding the type of data of service to the pilot signal, and noticing the type of data in the portable electronic device 610 according to such data, the user can classify the type of data.

As described above, according to the twenty-third to thirtieth embodiments, the area of sufficient reception field intensity capable of receiving data service presentation is indicated and this area is easily recognized by the user, so that it is possible to move into the area of high field intensity. Therefore, without increasing the transmission power of the base station, and omitting the circuit for improving the reception field intensity of the portable electronic device so as to be smaller in size and lowered in power consumption, it is possible to receive service securely through radio communication.

According to the above embodiments, the radio communication system comprises a portable terminal device having a receiving circuit, and a base station for receiving a signal from the portable terminal device and transmitting a signal to the terminal device. In this system, there are provided a down-link channel for transmitting the signal from the base station to the terminal device at a first transmission speed and an up-link channel for transmitting the signal from the terminal device to the base station at a second transmission speed slower than the first speed. The system further comprises means for clarifying a receivable area of the terminal device.

The user of the portable electronic apparatus can recognize securely the guaranteed region of reception of waves, or the information service coverage area. Therefore, to improve the reception environments, it is expected that the user may deliberately move to a secure region for receiving signals by the portable electronic apparatus.

Since the user can deliberately improve the reception environments, the circuit for enhancing the reception gain of the portable electronic apparatus (such as equalizer and diversity reception circuit) can be omitted, and the circuit structure of the portable electronic apparatus can be simplified. Besides, it is not necessary to raise the reception field intensity more than necessary by increasing the transmission power of the base station side.

According to the present invention, there is provided a radio communication system of large capacity and wide range that can be applied to both systems of portable radio telephone system and radio communication system between computers (radio LAN). Further, there is provided a radio communication system capable of acquiring necessary information, without particular consciousness, by automatically receiving transmission of information and acquiring information, when moving to an information obtainable area, only by presetting request of desired information. Moreover, a radio communication system capable of saving power consumption, and reducing in size and weight and a radio communication system capable of receiving information service securely through radio communication by positioning a portable terminal device in a simple structure in an area of high reception field intensity are provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the above embodiments may be combined as necessary.

What is claimed is:

1. A radio communication system, comprising:

a base station connected to a network; and a radio terminal connected to the base station through a radio channel, wherein said radio channel comprises a first channel making bi-directional communication, and a second channel making only down-link communication at higher speed than in the first channel, and said radio terminal comprises a first interface for said first channel, a second interface for said second channel, and communication control means for setting the first channel by using said first interface, transmitting a protocol necessary for said second interface to the network through the first channel, and receiving data from the network through the second channel, and wherein said first channel is a one-to-one telephone type channel, said second channel is a one-to-multiplicity computer network type channel, said first interface comprises a first physical address including a serial number of the terminal, and a first logical address including a subscriber's telephone number, and the protocol required in said second interface includes a second physical address which is a physical address of a hardware used for communication between computers, and a second logical address corresponding to the second physical address.

2. A system according to claim 1, wherein said communication control means comprises:

means for originating a call to a first base station for a first channel;

means for connecting the first channel to said first base station, using said first physical address and first logical address as identifiers;

means for transmitting said second physical address and second logical address to the network through said first channel;

means for making the network ready to connect the second channel; and means for receiving the data from a second base station for a second channel connected to the network through the second channel.

3. A system according to claim 1, wherein said communication control means comprises:

means for connecting the first channel with a first base station for the first channel, when a call is originated from said first base station, using said first physical address and first logical address as identifiers;

means for transmitting said second physical address and second logical address to the network through said first channel;

means for making the network ready to connect the second channel; and means for receiving data from a second base station for a second channel connected to the network through the second channel.

4. A system according to claim 1, wherein said communication control means comprises:

means for transmitting said second physical address and second logical address to the network through the first channel at a time of location registration; and means for making the network ready to connect the second channel.

5. A system according to claim 1, wherein said base station comprises:

means for storing the protocol necessary for said second interface and transmitted from said radio terminal for a specific period, and means for transmitting a protocol request to said radio terminal when a communication request is transmitted from said radio terminal and if the protocol necessary for said second interface is not stored, and wherein said communication control means transmits the protocol to the network if the protocol request is transmitted from said base station.

6. A communication method for a radio communication system comprising a base station connected to a network, and a radio terminal connected to said base station through a radio channel composed of a first channel for making bi-directional communication and a second channel for making only down-link communication at higher speed than the first channel, and having a first interface for said first channel and a second interface for said second channel, the method comprising the steps of:

connecting the first channel by using said first interface;

transmitting a protocol necessary for said second interface to the network through the first channel; and receiving data from the network through the second channel, wherein said first channel is a one-to-one telephone type channel, said second channel is a one-to-multiplicity computer network type channel, said first interface comprises a first physical address including a serial number of the terminal, and a first logical address including a subscriber's telephone number, and the protocol required for said second interface is a second physical address which is a physical address of a hardware used for communication between computers, and a second logical address corresponding to the second physical address.

* * * * *